(12) United States Patent
Kawauchi et al.

(10) Patent No.: US 8,139,664 B2
(45) Date of Patent: Mar. 20, 2012

(54) RECEPTION APPARATUS, RECEPTION METHOD AND PROGRAM

(75) Inventors: Hidetoshi Kawauchi, Kanagawa (JP); Takashi Yokokawa, Kanagawa (JP); Takashi Horiguti, Kanagawa (JP); Naoki Yoshimochi, Tokyo (JP); Hiroyuki Kamata, Kanagawa (JP); Ryoji Ikegaya, Tokyo (JP); Yasuhiro Iida, Tokyo (JP)

(73) Assignee: Sony Corporation, Tokyo (JP)

( * ) Notice: Subject to any disclaimer, the term of this patent is extended or adjusted under 35 U.S.C. 154(b) by 576 days.

(21) Appl. No.: 12/323,650

(22) Filed: Nov. 26, 2008

(65) Prior Publication Data

US 2009/0135931 A1    May 28, 2009

(30) Foreign Application Priority Data

Nov. 28, 2007 (JP) ................ P2007-306806
Sep. 5, 2008 (JP) .................. 2008-228162

(51) Int. Cl.
*H04K 1/10* (2006.01)
(52) U.S. Cl. .................... 375/260; 375/350
(58) Field of Classification Search .......... 375/260, 375/285, 350, 346, 348, 229; 370/208–210
See application file for complete search history.

(56) References Cited

U.S. PATENT DOCUMENTS

| | | | | |
|---|---|---|---|---|
| 5,056,117 A * | 10/1991 | Gitlin et al. | ........... | 375/234 |
| 6,370,188 B1 * | 4/2002 | Wu et al. | ........... | 375/222 |
| 2003/0215029 A1 * | 11/2003 | Limberg | ........... | 375/321 |
| 2004/0101068 A1 * | 5/2004 | Wang et al. | ........... | 375/324 |
| 2005/0175114 A1 * | 8/2005 | Jones et al. | ........... | 375/260 |
| 2007/0121718 A1 * | 5/2007 | Wang et al. | ........... | 375/233 |
| 2008/0123767 A1 * | 5/2008 | Cho et al. | ........... | 375/267 |
| 2008/0224793 A1 * | 9/2008 | Babanezhad | ........... | 333/18 |

FOREIGN PATENT DOCUMENTS

| | | |
|---|---|---|
| JP | 3 289271 | 12/1991 |
| JP | 2004 166267 | 6/2004 |
| JP | 2004 343546 | 12/2004 |
| JP | 2006 140917 | 6/2006 |
| JP | 2006 140938 | 6/2006 |
| JP | 2007 6067 | 1/2007 |

* cited by examiner

*Primary Examiner* — Emmanuel Bayard
(74) *Attorney, Agent, or Firm* — Frommer Lawrence & Haug LLP; William S. Frommer; Thomas F. Presson

(57) ABSTRACT

Disclosed herein is a reception apparatus, including, an orthogonal frequency division multiplexing signal reception section, a first filter section, a subtraction section, a second filter section, a coefficient production section, and a Fast Fourier Transformation mathematic operation section.

12 Claims, 33 Drawing Sheets

ERROR SIGNAL $S_5$
×
REFERENCE SIGNAL $S_6$

↓

SAMPLE CORRELATION VALUE

ERROR SIGNAL $S_5$
×
REFERENCE SIGNAL $S_6$

↓

SAMPLE CORRELATION VALUE

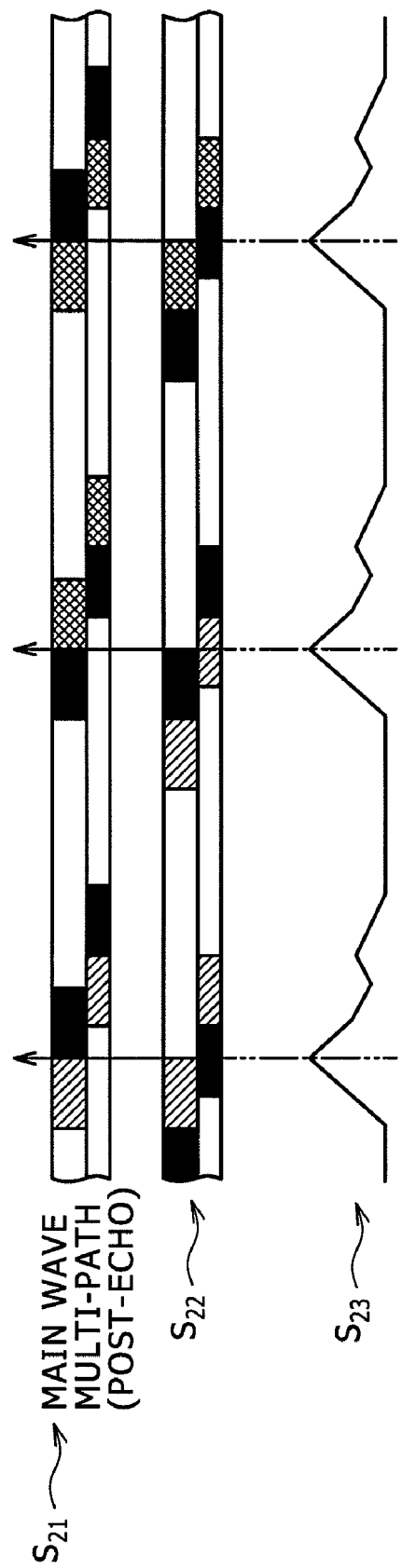

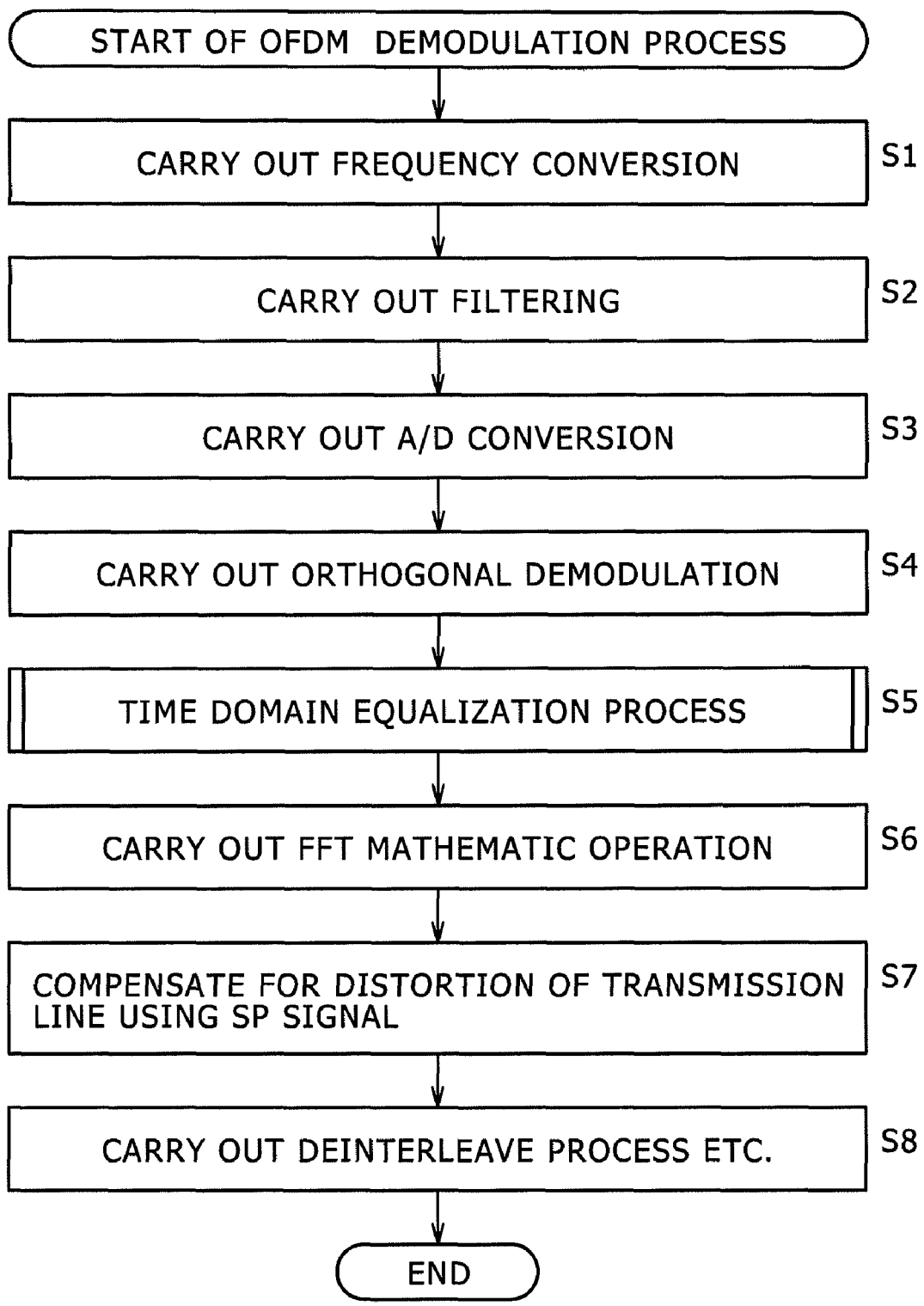

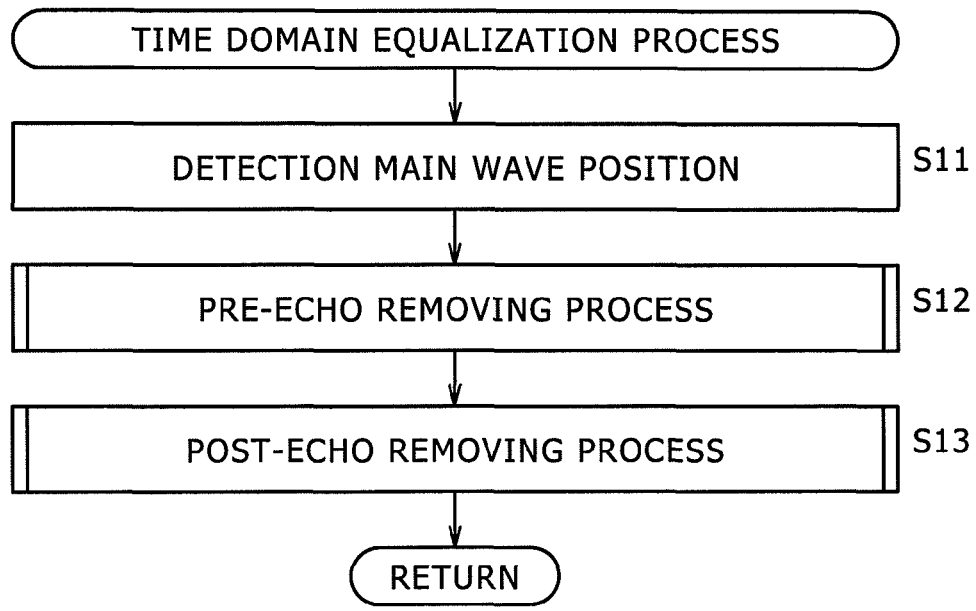
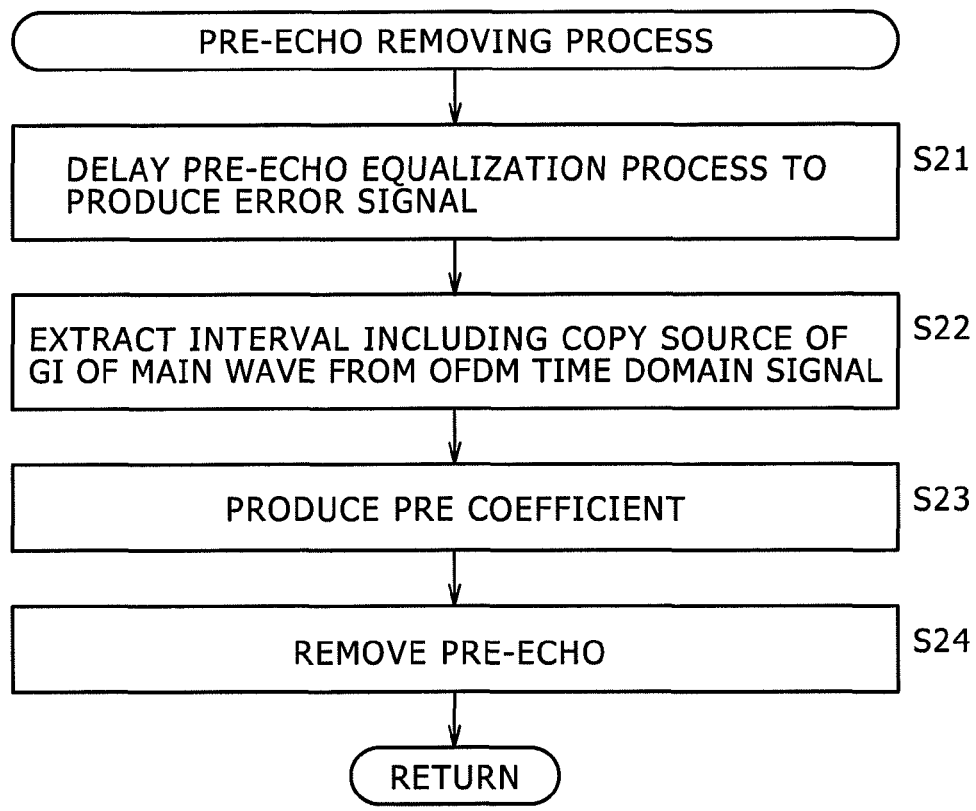

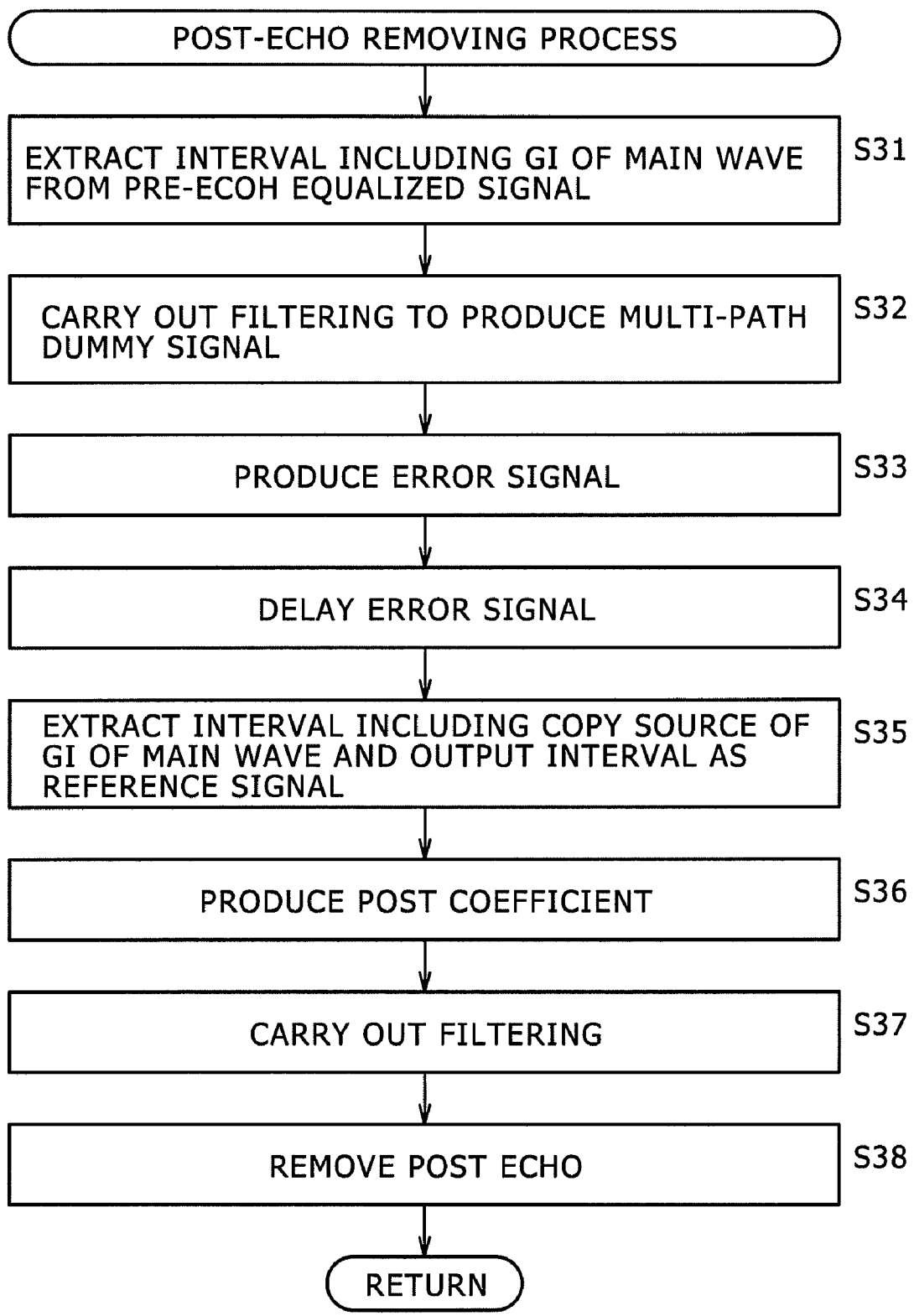

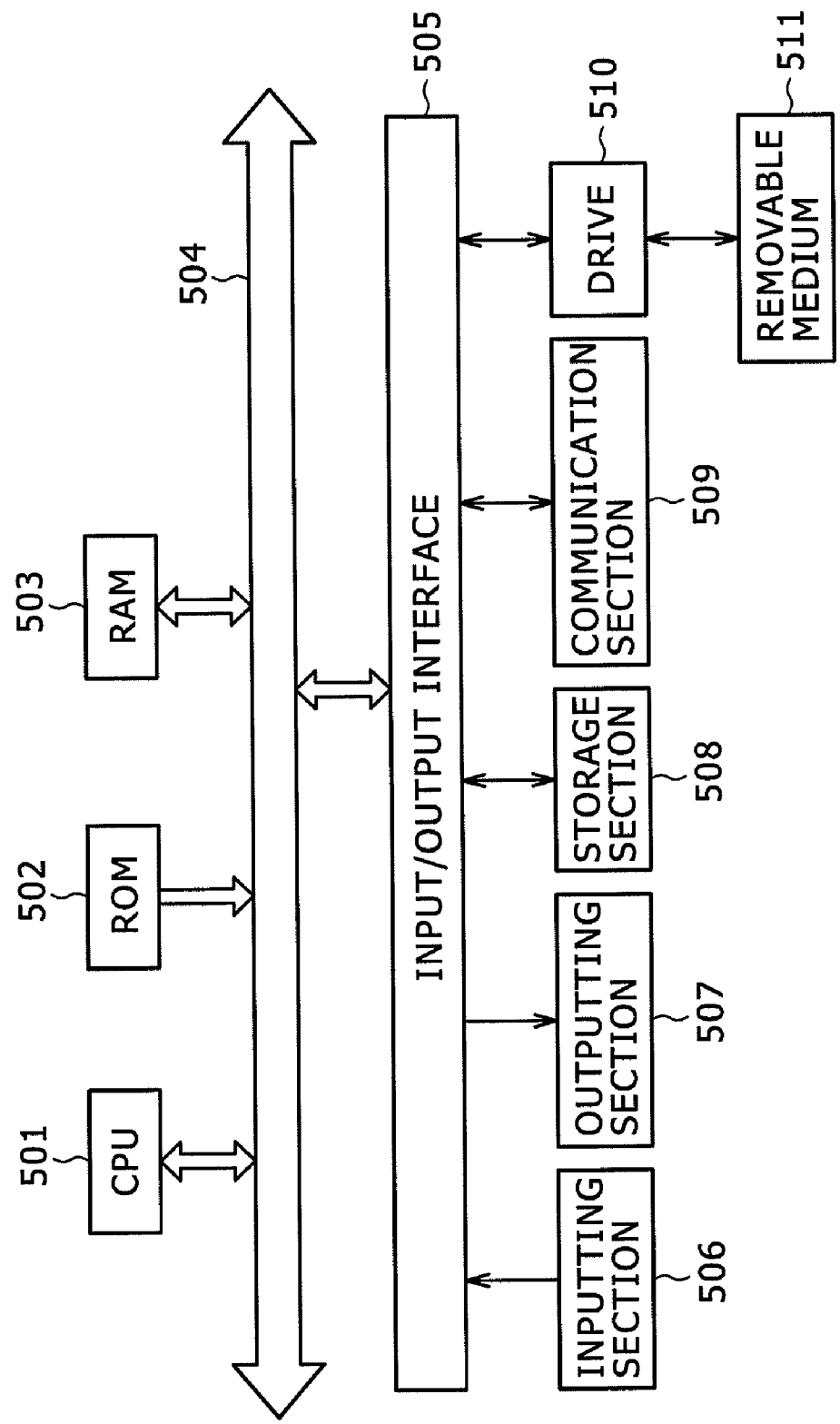

RECEPTION APPARATUS, RECEPTION METHOD AND PROGRAM

CROSS REFERENCES TO RELATED APPLICATIONS

The present invention contains subject matter related to Japanese Patent Applications JP 2008-228162 and 2007-306806 filed in the Japan Patent Office on Sep. 5, 2008 and Nov. 28, 2007, respectively, the entire contents of which being incorporated herein by reference.

BACKGROUND OF THE INVENTION

1. Field of the Invention

This invention relates to a reception apparatus, a reception method and a program, and more particularly to a reception apparatus, a reception method and a program wherein a coefficient of an adaptive equalization filter used for demodulation of an OFDM signal can be readily produced with the OFDM time domain signal.

2. Description of the Related Art

A modulation method called orthogonal frequency division multiplexing (OFDM) method is known as a modulation method for ground wave digital broadcasting.

According to the OFDM method, a large number of orthogonal subcarriers are provided in a transmission band and data are allocated to the amplitude and the phase of the individual subcarriers and digitally modulated by phase shift keying (PSK) or Quadrature amplitude modulation (QAM).

The OFDM method is characterized in that, since the entire transmission band is divided by a large number of subcarriers, the bandwidth of one subcarrier is narrow and the transmission speed is low, but the total transmission speed is similar to that of conventional modulation methods. Further, the OFDM method is characterized in that the multi-path withstanding property can be improved by providing a guard interval hereinafter described.

Further, the OFDM system is characterized in that, since data are allocated to a plurality of subcarriers, a transmission circuit can be configured using an inverse fast Fourier transform (IFFT) mathematic operation circuit which carries out inverse Fourier transform upon modulation, and a reception circuit can be configured using a fast Fourier transform (FFT) mathematic operation circuit which carries out Fourier transform upon demodulation.

From such characteristics as described above, the OFDM method is frequently applied to ground wave digital broadcasting which is influenced strongly by a multi-path disturbance. As standards for ground wave digital broadcasting which adopt the OFDM method, such standards as, for example, the DVB-T (Digital Video Broadcasting-terrestrial), ISDB-T (Integrated Services Digital Broadcasting-Terrestrial) and ISDB-TSB are available.

FIG. 1 illustrates an OFDM symbol.

In the OFDM system, transmission of a signal is carried out in a unit called OFDM symbol.

Referring to FIG. 1, one OFDM symbol is composed of an effective symbol which is a signal interval within which IFFT is carried out upon transmission, and a guard interval (hereinafter referred to sometimes as GI) in which a waveform of part of a rear half of the effective symbol is copied. The GI is inserted to a position preceding to the effective symbol on the time axis.

According to the OFDM system, the GI is inserted so that interference of an OFDM symbol which occurs under a multi-path environment can be prevented.

A plurality of such OFDM symbols are gathered together to form one OFDM transmission frame. For example, according to the ISDB-T standards, one OFDM transmission frame is formed from 204 OFDM symbols. The insertion position of a pilot signal is defined with reference to a unit of the OFDM transmission frame.

In the OFDM system wherein a QAM type modulation system is used as a modulation system for subcarriers, since the subcarriers are influenced by multi-path interference or the like upon transmission, each subcarrier upon reception becomes different in amplitude and phase from the subcarrier upon transmission. Therefore, it is necessary to carry out signal equalization on the reception side so that the amplitude and the phase of a reception signal become equal to those of the transmission signal.

In the OFDM system, the transmission side inserts a pilot signal of a predetermined amplitude and a predetermined phase discretely into a transmission symbol. On the other hand, the reception side determines a frequency characteristic of the transmission line based on the amplitude and the phase of the pilot signal and equalizes the reception signal based on the determined characteristic of the transmission line.

The pilot signal used for calculation of a transmission line in this manner is called scattered pilot signal (hereinafter referred to as SP signal). FIG. 2 shows an arrangement pattern in OFDM symbols of an SP signal adopted by the DVB-T standards or the ISDE-T standards. In FIG. 2, the vertical direction is a time direction and the horizontal direction is a frequency direction.

FIG. 3 shows an example of a configuration of a conventional OFDM reception apparatus.

Referring to FIG. 3, the OFDM reception apparatus 1 shown includes a reception antenna 11, a tuner 12, a band-pass filter (BPF) 13, an analog to digital (A/D) conversion circuit 14, an orthogonal demodulation circuit 15, an FFT (Fast Fourier Transformation) circuit 16, an SP utilization equalization circuit 17 and an error correction circuit 18.

The reception antenna 11 receives a broadcasting wave broadcast from a broadcasting station and outputs an RF (radio frequency) signal to the tuner 12.

The tuner 12 includes a multiplication circuit 21 and a local oscillator 22, and frequency converts an RF signal received by the reception antenna 11 into an IF (intermediate frequency) signal and outputs the IF signal to the BPF 13.

The BPF 13 applies filtering to the IF signal supplied thereto from the tuner 12 and outputs a signal obtained by the filtering to the A/D conversion circuit 14.

The A/D conversion circuit 14 carries out A/D conversion for the signal supplied thereto from the BPF 13 and outputs a digital IF signal to the orthogonal demodulation circuit 15.

The orthogonal demodulation circuit 15 carries out orthogonal demodulation using a carrier signal of a predetermined frequency, that is, of a carrier frequency, to acquire an OFDM signal of a baseband from the IF signal supplied thereto from the A/D conversion circuit 14. This baseband OFDM signal is a signal in the time domain before FFT mathematic operation is applied.

A baseband OFDM signal before FFT mathematic operation is applied is hereinafter referred to as OFDM time domain signal. When the OFDM time domain signal is orthogonally demodulated, it becomes a complex signal which includes a real component (I-channel signal) and an imaginary component (Q-channel signal). The orthogonal demodulation circuit 15 outputs the time domain OFDM signal to the FFT circuit 16.

The FFT circuit 16 removes a signal within a range of a GI from the signal of one OFDM symbol to extract a signal within a range of an effective symbol length. The FFT circuit 16 carries out FFT mathematic operation for the extracted OFDM time domain signal to extract data orthogonally modulated in individual subcarriers.

The FFT circuit 16 outputs the OFDM signal representative of the extracted data to the SP utilization equalization circuit 17. The OFDM signal outputted from the FFT circuit 16 is a signal in the frequency domain after FFT mathematic operation is carried out. In the following description, an OFDM signal for which FFT mathematic operation has been carried out is referred to as OFDM frequency region signal.

The SP utilization equalization circuit 17 uses the SP signal arranged in such a manner as seen in FIG. 2 to calculate a transmission line characteristic of all of the subcarriers and compensates for a distortion of the OFDM frequency domain signal by the transmission line based on the calculated transmission line characteristics. The SP utilization equalization circuit 17 outputs the signal obtained by the compensation for the distortion by the transmission line as an equalization signal to the error correction circuit 18.

The error correction circuit 18 carries out a deinterleave process for the signal interleaved on the transmission side and further carries out such processes as depuncture, Viterbi decoding, spread signal removal and RS (Reed-Solomon) decoding. The error correction circuit 18 outputs data obtained by such various processes as decoded data to a circuit at the succeeding stage.

The OFDM system is characterized in that, by inserting a GI prior to an effective symbol, a demodulation process can be carried out without interference between symbols even in a multi-path environment within which a delay spread fits in a GI.

However, in such an environment wherein there is the possibility that long delay multi-paths may be produced as a single frequency network (SFN), the delay spread sometimes exceeds the GI. In this instance, inter-symbol interference or inter-carrier interference appears, and this deteriorates the reception performance significantly.

In order to solve this problem an OFDM reception apparatus 2 having such a configuration as shown in FIG. 4 and an OFDM reception apparatus 3 having such a configuration as shown in FIG. 5 have been proposed. In FIGS. 4 and 5, like elements to those of the OFDM reception apparatus 1 of FIG. 3 are denoted by like reference numerals.

The OFDM reception apparatus 2 of FIG. 4 includes, in addition to the components of the OFDM reception apparatus 1 shown in FIG. 3, an adaptive equalization filter 31 at a stage preceding to the FFT circuit 16. In the OFDM reception apparatus 2, the coefficient of the adaptive equalization filter 31 is adaptively controlled to remove multi-path components included in the OFDM time domain signal. The configuration of the adaptive equalization filter 31 is hereinafter described.

Meanwhile, the OFDM reception apparatus 3 includes, in addition to the components of the OFDM reception apparatus 1 shown in FIG. 3, an interference removing circuit 41 at a stage preceding to the FFT circuit 16.

The interference removing circuit 41 includes an adaptive equalization filter 51, a replica production apparatus 52 and a synthesis circuit 53. An OFDM time domain signal outputted from the orthogonal demodulation circuit 15 is inputted to the adaptive equalization filter 51 and the synthesis circuit 53.

The adaptive equalization filter 51 applies filtering to the OFDM time domain signal supplied from the orthogonal demodulation circuit 15 to remove multi-path components from the OFDM time domain signal and outputs the resulting OFDM time domain signal to the replica production apparatus 52.

The replica production apparatus 52 reproduces, based on the OFDM time domain signal supplied thereto from the adaptive equalization filter 51, the removed multi-path components and outputs a signal of the reproduced multi-path components to the synthesis circuit 53.

The synthesis circuit 53 removes inter-symbol interference components and inter-carrier interference components included in the FFT interval from the OFDM time domain signal supplied thereto from the orthogonal demodulation circuit 15 using the multi-path components reproduced by the replica production apparatus 52. The synthesis circuit 53 outputs the OFDM time domain signal from which the inter-symbol interference components and the inter-carrier interference components included in the FFT interval are removed to the FFT circuit 16.

A technique of reproducing a replica to remove interference components in this manner is disclosed in Japanese Patent Laid-Open No. 2007-6067.

Here, the adaptive equalization filter 31 shown in FIG. 4 is described.

FIG. 6 shows an example of a configuration of the adaptive equalization filter 31.

Referring to FIG. 6, the adaptive equalization filter 31 shown includes a variable coefficient filter 61, an SP extraction circuit 62, an IFFT circuit 63 and a main wave component removing circuit 64. The OFDM time domain signal outputted from the orthogonal demodulation circuit 15 is inputted to the variable coefficient filter 61, and the OFDM frequency domain signal outputted from the FFT circuit 16 is inputted to the SP extraction circuit 62.

The variable coefficient filter 61 applies filtering to the OFDM time domain signal supplied thereto from the orthogonal demodulation circuit 15 using a coefficient set based on a signal supplied from the main wave component removing circuit 64 to remove multi-path components included in the OFDM time domain signal. The variable coefficient filter 61 outputs the OFDM time domain signal from which the multi-path components are removed to the FFT circuit 16.

The SP extraction circuit 62 extracts an SP signal inserted at such a position as illustrated in FIG. 2 from the OFDM frequency domain signal supplied thereto from the FFT circuit 16 to remove modulation components to calculate a transmission path characteristic in the frequency domain. The SP extraction circuit 62 outputs the calculated transmission path characteristic to the IFFT circuit 63.

The IFFT circuit 63 carries out IFFT mathematic operation to convert the transmission path characteristic in the frequency domain into an impulse response characteristic of the transmission line in the time domain. The IFFT circuit 63 outputs the impulse response characteristic of the transmission line in the time domain to the main wave component removing circuit 64.

The main wave component removing circuit 64 removes a main wave component from the impulse response in the time domain calculated by the IFFT circuit 63 while leaving only the multi-path components and outputs a signal of the multi-path components to the variable coefficient filter 61. The variable coefficient filter 61 sets a coefficient corresponding to the amplitude and the phase of the multi-path components acquired by the main wave component removing circuit 64 to a tap corresponding to the delay time of the multi-path components to remove the multi-path components by filtering.

FIG. 7 shows an example of a configuration of the variable coefficient filter 61 shown in FIG. 6.

Referring to FIG. 7, the variable coefficient filter 61 includes a variable coefficient FIR (Finite-duration Impulse Response) filter 71 and a variable coefficient IIR (Infinite-duration Impulse Response) filter 72. Also a coefficient updating circuit not shown and some other circuits are provided in the variable coefficient filter 61. An OFDM time domain signal is inputted to the variable coefficient FIR filter 71.

The variable coefficient FIR filter 71 carries out filtering using a coefficient produced by the coefficient updating circuit not shown to remove or suppress multi-path (hereinafter referred to as pre-echo) components arriving earlier than the main wave.

The variable coefficient FIR filter 71 outputs a pre-echo equalized signal, which is an OFDM time domain signal whose pre-echo components are removed or suppressed, to the variable coefficient IIR filter 72. Since it is difficult to fully reduce pre-echo components, not only a signal from which pre-echo components are removed but also a signal within which pre-echo signals are suppressed are regarded as pre-echo equalized signal.

The variable coefficient IIR filter 72 includes a variable coefficient FIR filter 81 and a subtraction circuit 82 as shown in FIG. 7. The pre-echo equalized signal supplied from the variable coefficient FIR filter 71 is inputted to the subtraction circuit 82.

The variable coefficient FIR filter 81 applies filtering to the signal outputted from the subtraction circuit 82 using a coefficient produced by the coefficient updating circuit not shown and outputs a resulting signal to the subtraction circuit 82.

The subtraction circuit 82 subtracts the signal supplied thereto from the variable coefficient FIR filter 81 from the pre-echo equalized signal to remove multi-path (hereinafter referred to as post-echo) components arriving later than the main wave. Then, the subtraction circuit 82 outputs an equalization time domain signal obtained by removing the post-echo components. The equalization time domain signal outputted from the subtraction circuit 82 is inputted to the subtraction circuit 82 and also to the FFT circuit 16.

Also the adaptive equalization filter 51 shown in FIG. 5 has a configuration similar to that of the variable coefficient filter 61 described.

Like the OFDM reception apparatus 2 of FIG. 4 and the OFDM reception apparatus 3 of FIG. 5, an apparatus which removes multi-path components in the time domain includes a variable coefficient FIR filter and removes multi-path components by controlling the coefficient of the variable coefficient FIR filter.

Accordingly, if the coefficient is not appropriate, then multi-path components cannot be removed fully, and besides, a different multi-path component which has, as delay time, a time period equal to integral multiples of the delay time of an actually existing multi-path is added. This appears conspicuously particularly in such a case that updating of the coefficient cannot fully follow up the fluctuation by a Doppler effect or the like.

Since it is a practice to extract an SP signal from an OFDM frequency domain signal and estimate a transmission line characteristic based on the SP signal, such an algorithm as described above is an algorithm to which a delay profile is applied.

Meanwhile, as an adaptive algorithm which does not apply a delay profile, the least mean square (LMS) algorithm which minimizes a mean square error (MSE) is known. The LMS algorithm is a method which uses a known reference signal and is utilized most widely due to such characteristics that the adaptability performance is high and that the computation amount is small.

FIG. 8 shows an example of a circuit configuration to which the LMS algorithm is applied.

Referring to FIG. 8, the circuit shown includes a variable coefficient FIR filter 91 and a coefficient calculation circuit 92. Where the input signal is represented by x[k], the LMS algorithm is applied in order to reproduce a desired signal d[k] by filtering the input signal x[k] by means of the variable coefficient FIR filter 91.

The variable coefficient FIR filter 91 applies filtering to the input signal x[k] using a coefficient calculated by the coefficient calculation circuit 92 and outputs a resulting signal as an output signal y[k]. The output signal y[k] is outputted to the outside and also to the coefficient calculation circuit 92.

The coefficient calculation circuit 92 calculates a coefficient using the LMS algorithm and outputs the calculated coefficient to the variable coefficient FIR filter 91. Also the input signal x[k] is inputted to the coefficient calculation circuit 92.

In the example of FIG. 8, the coefficient calculation circuit 92 includes a subtraction circuit 101, a multiplication circuit 102, another multiplication circuit 103, an integration circuit 104, and a shift register 105.

The subtraction circuit 101 subtracts the desired signal d[k] from the output signal y[k] outputted from the variable coefficient FIR filter 91 to produce an error signal e[k]. The desired signal d[k] is a known signal, and the LMS algorithm can be applied where a known signal is available in this manner.

The multiplication circuit 102 is formed from a plurality of multipliers, which individually multiply the error signal e[k] and signals x[k−i] obtained by delaying the input signal x[k] by means of respective delay elements of the shift register 105. The multiplication circuit 102 outputs sample correlation values which are results of the multiplication by the individual multipliers to the multiplication circuit 103.

The multiplication circuit 103 is formed from a plurality of multipliers, which individually multiply the sample correlation values calculated by the multiplication circuit 102 by a step size μ and output results of the multiplication to the integration circuit 104.

The integration circuit 104 is formed from a plurality of integrators, which individually integrate the multiplication results of the multiplication circuit 103 to produce coefficients. The integration circuit 104 produces, for example, coefficients which cancel the sample correlation values representative of correlations of the error signals e[k] and the input signal x[k]. The integration circuit 104 sets the produced coefficients to respective taps of the variable coefficient FIR filter 91.

The processes described above which are carried out by the coefficient calculation circuit 92 can be represented by the following expressions. It is to be noted that γj[k] of the expression (1) given below represents a coefficient set to each tap of the variable coefficient FIR filter 91.

$$y[k] = \sum_{j=0}^{L-1} \gamma j[k] * x[k-j] \quad (1)$$

$$e[k] = y[k] - d[k] \quad (2)$$

$$\gamma j[k+1] = \gamma j[k] + \mu \cdot e[k] \cdot x[k-j] \quad (3)$$

As a variation to such an LMS algorithm as described above, also a Leaky-LMS algorithm is known wherein, when an integration process is carried out by the integration circuit 104, the integration process is carried out in a form wherein a Leak component is included in order to suppress the divergence of the coefficient or for a like object. The Leaky-LMS algorithm can be represented by the following expression (4) using a parameter λ:

$$\gamma j[k+1]=(1-\lambda)\cdot\gamma j[k]+\mu\cdot e[k]\cdot x[k-j] \quad (4)$$

Also the VSS (Variable Step Size)-LMS algorithm is known wherein the step size μ is variable in response to an error signal in order to improve the follow-up performance. As an updating algorithm for the step size μ, such an algorithm as represented by the following expressions (5) and (6) is known:

$$\mu[k+1]=(1-\epsilon)\cdot\mu[k]+\nu\cdot\|e[k]\|^2 \quad (5)$$

$$\mu[k+1]=(1-\epsilon)\cdot\mu[k]+\nu\cdot\rho[k]^2$$

$$\rho[k+1]=(1-\eta)\cdot\rho[k]+\eta\cdot e[k-1]\cdot e[k] \quad (6)$$

As described above, in a circuit which uses the LMS algorithm, a sample correlation value between the error signal e[k] and the input signal x[k] is determined and updated in a direction in which it is canceled. Therefore, the coefficient finally converges to a value with which the error signal e[k] and the input signal x[k] have no correlation.

SUMMARY OF THE INVENTION

Since the accuracy of the coefficient of the variable coefficient FIR has a significant influence on the reception performance, the algorithms described above wherein an adaptive equalization filter is used to remove a multi-path component in the time domain have a characteristic that the reception performance is deteriorated if an error occurs with the coefficient.

Further, in order to cope with a rapid fluctuation of the transmission line, it is preferable also for the coefficient to follow up the fluctuation of the transmission line as quickly as possible. However, generally the follow-up performance and the stability of the coefficient have a tradeoff relationship, and if it is tried to improve the follow-up performance of the coefficient, then the stability is deteriorated.

Incidentally, such an algorithm as adopted by the OFDM reception apparatus 2 of FIG. 6 wherein a delay profile is estimated and applied to the coefficient of the movable coefficient filter 61 has a problem that the reception performance depends much upon the estimation accuracy of the delay profile.

Although the LMS algorithm is available as a method for solving the problem just described, it can be applied only where a known signal is involved.

Accordingly, the LMS algorithm cannot be applied as it is to the ground wave digital broadcasting standards such as the DVB-T or the ISDB-T because the OFDM time domain signal does not include a known signal.

Therefore, it is demanded to provide a reception apparatus and method by which, for example, even where an OFDM signal does not include a known signal, a coefficient of an adaptive equalization filter used for demodulation of the OFDM signal can be produced readily from the OFDM signal in the time domain.

According to an embodiment, there is provided a reception apparatus including an OFDM signal reception section configured to receive an OFDM signal, a first filter section having a predetermined number of taps to which a variable first coefficient is set for applying an adaptive filter to the OFDM signal in the time domain received by the OFDM signal reception section to remove a pre-echo component from the OFDM signal to produce a pre-echo equalized signal, a subtraction section configured to subtract a signal of a post-echo component from the pre-echo equalized signal produced by the first filter section to produce an equalized signal, a second filter section having a predetermined number of taps to which a variable second coefficient is set for applying an adaptive filter to the equalized signal produced by the subtraction section, a coefficient production section configured to produce the first and second coefficients based on the OFDM signal in the time domain received by the OFDM signal reception section and the pre-echo equalized signal produced by the first filter section, and an FFT mathematic operation section configured to carry out FFT mathematic operation for the equalized signal produced by the subtraction section to produce an OFDM signal in the frequency domain.

The coefficient production section may include a first extraction section configured to extract a signal within an interval which includes a GI of a main wave from the pre-echo equalized signal produced by the first filter section, a third filter section configured to apply an adaptive filter to the signal extracted by the first extraction section using a coefficient same as the second coefficient to produce a dummy signal of a post-echo component, an error signal production section configured to subtract the dummy signal produced by the third filter section from the pre-echo equalized signal to produce an error signal representative of an error of the second coefficient, a second extraction section configured to extract a signal within an interval which includes a copy source of the GI of the main wave from the pre-echo equalized signal and outputting the extracted signal as a reference signal, and a post-echo coefficient updating section configured to update the second coefficient based on a correlation value between the error signal produced by the error signal production section and the reference signal extracted by the second extraction section.

In this instance, the coefficient production section may further include a third extraction section configured to extract a signal within the interval which includes the copy source of the GI of the main wave from the OFDM signal in the time domain and outputting the extracted signal as a reference signal, and a pre-echo coefficient updating section configured to update the first coefficient based on a correlation value between the reference signal extracted by the third extraction section and the signal within the period which includes the GI of the main signal from within the pre-echo equalized signal.

Or, the coefficient production section may include a delay profile estimation section configured to estimate a delay profile based on the OFDM signal in the time domain, a post-echo detection section configured to detect a predetermined position of the post-echo based on the delay profile estimated by the delay profile estimation section, a first extraction section configured to extract a signal within a period which includes a GI of a main wave from the pre-echo equalized signal, a third filter section configured to apply an adaptive filter to the signal extracted by the first extraction section using a coefficient same as the second coefficient to produce a dummy signal of a post-echo component, an error signal production section configured to subtract the dummy signal produced by the third filter section from a signal within an interval which includes a GI of the post-echo extracted from the pre-echo equalized signal in accordance with the position detected by the post error detection section to produce an error signal representative of an error of the second coefficient, a second extraction section configured to extract a signal within an interval which includes a copy source of the GI of the main signal from the pre-echo equalized signal and outputting the extracted signal as a reference signal, and a post-echo coefficient updating section configured to update the second coefficient based on a correlation value between the error signal produced by the error signal production section and the reference signal extracted by the second extraction section.

In this instance, the coefficient production section may further include a pre-echo detection section configured to detect a predetermined position of the pre-echo based on the delay profile estimated by the delay profile estimation section, a third extraction section configured to extract a signal within an interval which includes a copy source of the GI of the main wave and outputting the extracted signal as a reference signal, a fourth extraction section configured to extract a signal within the interval which includes the GI of the pre-echo from the pre-echo equalized signal in accordance with the position detected by the pre-echo detection section, and a pre-echo coefficient updating section configured to update the first coefficient based on a correlation value between the reference signal extracted by the third extraction section and the signal extracted by the fourth extraction section.

The reception apparatus may be configured such that the post-echo detection section further detects the power of the post-echo and the delay time of the post-echo with respect to the main wave while the pre-echo detection section further detects the power of the pre-echo and the delay time of the pre-echo with respect to the main wave, and the reception apparatus further includes a calculation section configured to calculate the amount of interference of the post-echo included in the FFT interval based on the position and the power of the post-echo and the delay time of the echo with respect to the main wave detected by the post-echo detection section and calculating the amount of interference of the pre-echo included in the FFT interval based on the position and the power of the pre-echo and the delay time of the pre-echo with respect to the main wave detected by the pre-echo detection section, and a selection section configured to select at least one of the post-echo and the pre-echo which exhibits a comparatively great one of the amounts of interference calculated by the calculation section as a multi-path of an object of removal of interference.

In this instance, the reception apparatus may further include an estimation section configured to estimate the FFT interval from a configuration of a path, the calculation section calculating the amount of interference of the post-echo and the amount of the pre-echo included in the FFT period estimated by the estimation section.

In this instance, the reception apparatus may be configured such that the estimation section estimates, where the configuration of the path is formed from the pre-echo and the main wave, an interval which is earliest in time within a range within which any other symbol transmitted by the main wave does not interfere and which has a length equal to that of the FFT interval.

Or, the reception apparatus may be configured such that the estimation section estimates, where the configuration of the path is formed from the post-echo and the main wave, an interval which is latest in time within a range within which any other symbol transmitted by the main wave does not interfere and which has a length equal to that of the FFT interval.

Or else, the reception apparatus may be configured such that the estimation section estimates, where the configuration of the path is formed from the pre-echo, main wave and post-echo, an interval which is earliest in time within a range within which any other symbol transmitted by the main wave does not interfere and which has a length equal to that of the FFT interval and an interval which is latest in time within a range within which any other symbol transmitted by the main wave does not interfere and which has a length equal to that of the FFT interval.

The calculation section may calculate the amount of interference of the post-echo and the amount of interference of the pre-echo included in the FFT interval conveyed from the FFT mathematic operation section.

According to another embodiment of the present invention, there are provided a reception method and a program for causing a computer to execute a process which include the steps of receiving an OFDM signal, applying an adaptive filter having a predetermined number of taps to which a variable first coefficient is set to the received OFDM signal in the time domain to remove a pre-echo component from the OFDM signal to produce a pre-echo equalized signal, subtracting a signal of a post-echo component from the produced pre-echo equalized signal to produce an equalized signal, applying an adaptive filter having a predetermined number of taps to which a variable second coefficient is set to the produced equalized signal, producing the first and second coefficients based on the received OFDM signal in the time domain and the pre-echo equalized signal, and carrying out FFT mathematic operation for the produced equalized signal to produce an OFDM signal in the frequency domain.

In the reception apparatus and method and the program, an OFDM signal is received, and an adaptive filter having a predetermined number of taps to which a variable first coefficient is set is applied to the received OFDM signal in the time domain to remove a pre-echo component of the OFDM signal to produce a pre-echo equalized signal. A signal of a pre-echo component is subtracted from the produced pre-echo equalized signal to produce an equalized signal. Another adaptive filer having a predetermined number of taps to which a variable second coefficient is set is applied to the produced equalized signal to produce a signal of the post-echo component. Then, the first and second coefficients are produced based on the received OFDM signal in the time domain and the pre-echo equalized signal, and FFT mathematic operation is carried out for the produced equalized signal to produce an OFDM signal in the frequency domain.

With the reception apparatus and method and the program, a coefficient of an adaptive equalization filter to be used for demodulation of an OFDM signal can be produced readily from the OFDM signal in the time domain.

The above and other objects, features and advantages of the present invention will become apparent from the following description and the appended claims, taken in conjunction with the accompanying drawings in which like parts or elements denoted by like reference symbols.

BRIEF DESCRIPTION OF THE DRAWINGS

FIG. 18 is a diagrammatic view illustrating an example of a signal used for detection of a main wave position;

FIG. 19 is a flow chart illustrating an OFDM demodulation process of the OFDM reproduction apparatus of FIG. 9;

FIG. 20 is a flow chart illustrating a time domain equalization process carried out at step S5 of FIG. 19;

FIG. 21 is a flow chart illustrating a pre-echo removing process carried out at step S12 of FIG. 20;

FIG. 22 is a flow chart illustrating a post-echo removing process carried out at step S13 of FIG. 20;

FIG. 35 is a block diagram showing an example of a hardware configuration of a computer.

DETAILED DESCRIPTION OF THE PREFERRED EMBODIMENT

Figure 9:
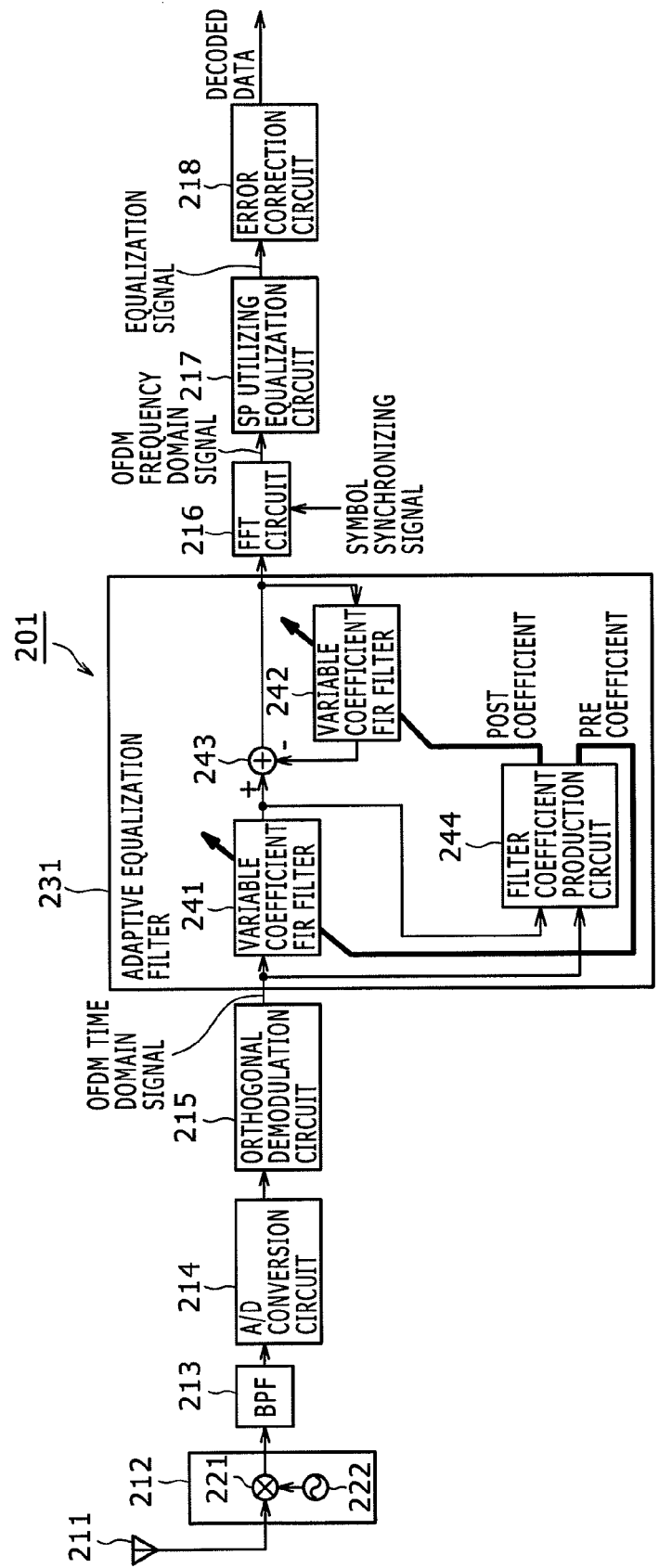
FIG. 9 is a block diagram showing an example of a configuration of an OFDM reception apparatus to which an embodiment of the present invention is applied.

Referring to FIG. 9, there is shown an example of a configuration of an OFDM reception apparatus to which the present invention is applied.

Referring to FIG. 9, the OFDM reception apparatus 201 shown includes a reception antenna 211, a tuner 212, a BPF 213, an A/D conversion circuit 214, an orthogonal demodulation circuit 215, an adaptive equalization filter 231, an FFT circuit 216, an SP utilization equalization circuit 217 and an error correction circuit 218.

The reception antenna 211 receives a broadcasting wave broadcast from a broadcasting station and outputs an RF signal of the received broadcasting wave to the tuner 212.

The tuner 212 includes a multiplication circuit 221 and a local oscillator 222, and frequency converts the RF signal received by the reception antenna 211 into an IF signal and outputs the IF signal to the BPF 213.

The BPF 213 applies filtering to the IF signal supplied thereto from the tuner 212 and outputs a resulting signal to the A/D conversion circuit 214.

The A/D conversion circuit 214 carries out A/D conversion for the signal supplied thereto from the BPF 213 and outputs a resulting digital IF signal to the orthogonal demodulation circuit 215.

The orthogonal demodulation circuit 215 carries out orthogonal demodulation using a carrier signal of a predetermined frequency, that is, a carrier frequency, to acquire an OFDM signal of a baseband from the IF signal supplied thereto from the A/D conversion circuit 214. The orthogonal demodulation circuit 215 outputs an OFDM time domain signal to the adaptive equalization filter 231.

The adaptive equalization filter 231 includes a pair of variable coefficient FIR filters 241 and 242, a subtraction circuit 243 and a filter coefficient production circuit 244. The OFDM time domain signal outputted from the orthogonal demodulation circuit 215 is inputted to the variable coefficient FIR filter 241 and the filter coefficient production circuit 244.

It is to be noted that, where the profile assumed by the OFDM reception apparatus 201 is, for example, only a post-echo, the variable coefficient FIR filter 241 may not be provided in the adaptive equalization filter 231.

The variable coefficient FIR filter 241 applies filtering to the OFDM time domain signal supplied thereto from the orthogonal demodulation circuit 215 using a pre coefficient which is a coefficient for pre-echo equalization produced by the filter coefficient production circuit 244 to carry out removal or suppression of pre-echo components included in the OFDM time domain signal. The variable coefficient FIR filter 241 outputs a pre-echo equalized signal to the subtraction circuit 243 and the filter coefficient production circuit 244.

The variable coefficient FIR filter 242 applies filtering to the OFDM time domain signal supplied thereto from the subtraction circuit 243 using a post coefficient which is a coefficient for post-echo equalization produced by the filter coefficient production circuit 244. The variable coefficient FIR filter 242 outputs a signal of post-echo components obtained by the filtering to the subtraction circuit 243.

The subtraction circuit 243 subtracts the signal supplied thereto from the variable coefficient FIR filter 242 from the pre-echo equalized signal to remove post-echo components included in the pre-echo equalized signal and outputs a resulting OFDM time domain signal. The signal outputted from the subtraction circuit 243 is inputted to the FFT circuit 216 and also to the variable coefficient FIR filter 242 so that a signal to be used for removal of post-echo components at a succeeding timing is produced.

The filter coefficient production circuit 244 produces a pre coefficient and a post coefficient based on the OFDM time domain signal prior to pre-echo removal supplied from the orthogonal demodulation circuit 215 and the pre-echo equalized signal supplied from the variable coefficient FIR filter 241. The filter coefficient production circuit 244 outputs the produced pre coefficient to the variable coefficient FIR filter 241 and outputs the post coefficient to the variable coefficient FIR filter 242. Details of the filter coefficient production circuit 244 are hereinafter described.

The FFT circuit 216 extracts a signal within the range of an effective symbol length by removing a signal within the range of a GI from within a signal of one OFDM symbol in accordance with a symbol synchronizing signal and carries out FFT mathematic operation for the extracted OFDM time domain signal. The FFT circuit 216 outputs an OFDM frequency domain signal obtained by the FFT mathematic operation to the SP utilization equalization circuit 217.

The SP utilization equalization circuit 217 calculates a transmission characteristic of all subcarriers using the SP signal and compensates for a distortion of the OFDM frequency domain signal by the transmission line based on the calculated transmission line characteristics. The SP utilization equalization circuit 217 outputs a signal obtained by the compensation for the distortion by the transmission line as an equalized signal to the error correction circuit 218.

The error correction circuit 218 carries out a deinterleave process for the signal interleaved by the transmission side and further carries out such processes as depuncture, Viterbi decoding, spread signal removal and RS decoding for the signal. The error correction circuit 218 outputs data obtained by such various processes as decoded data to a circuit at a succeeding stage.

Figure 1:
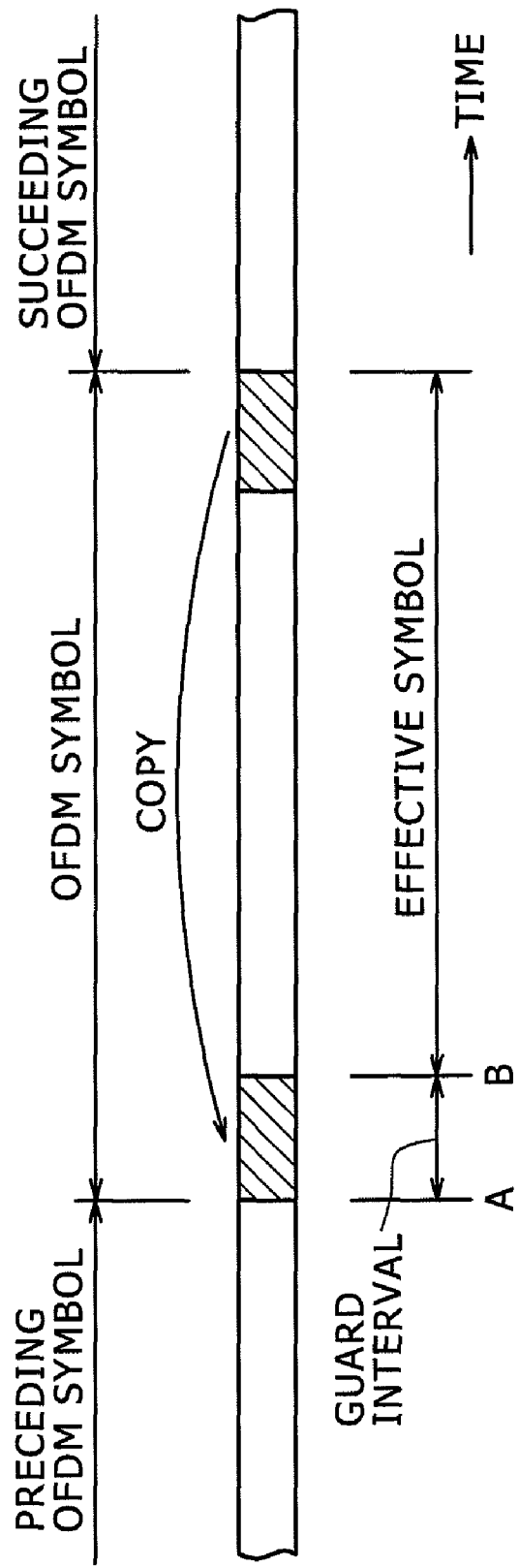
FIG. 1 is a diagrammatic view illustrating an OFDM symbol.
Figure 2:
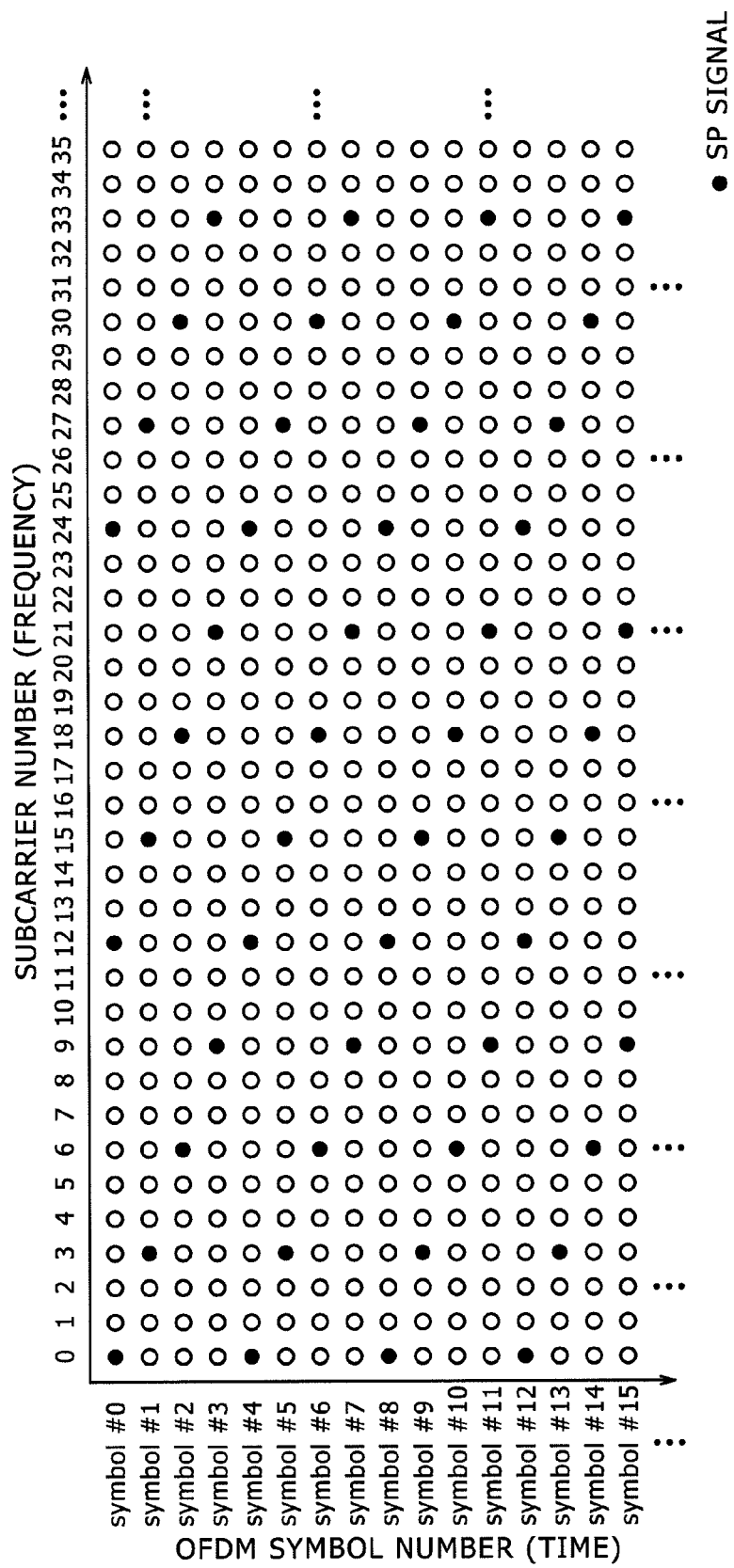
FIG. 2 is a schematic view illustrating an arrangement pattern of an SP signal in an OFDM symbol.
Figure 3:
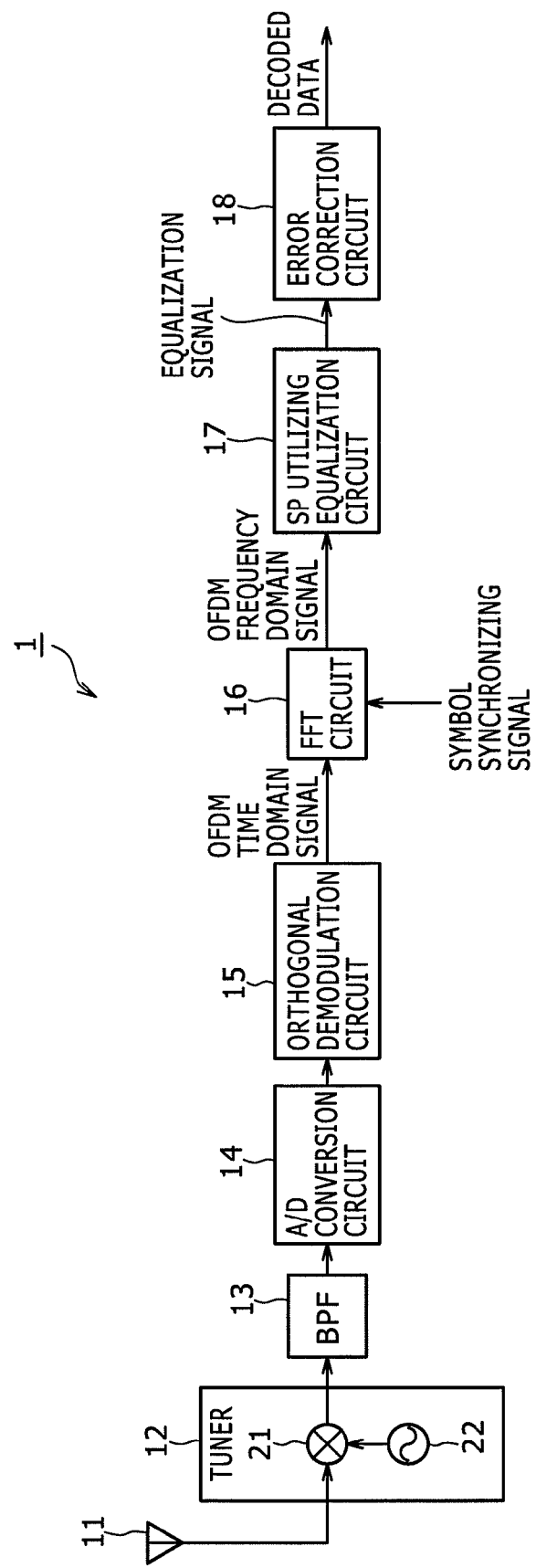
FIGS. 3, 4 and 5 are block diagrams showing different examples of a configuration of a conventional OFDM reception apparatus.
Figure 4:
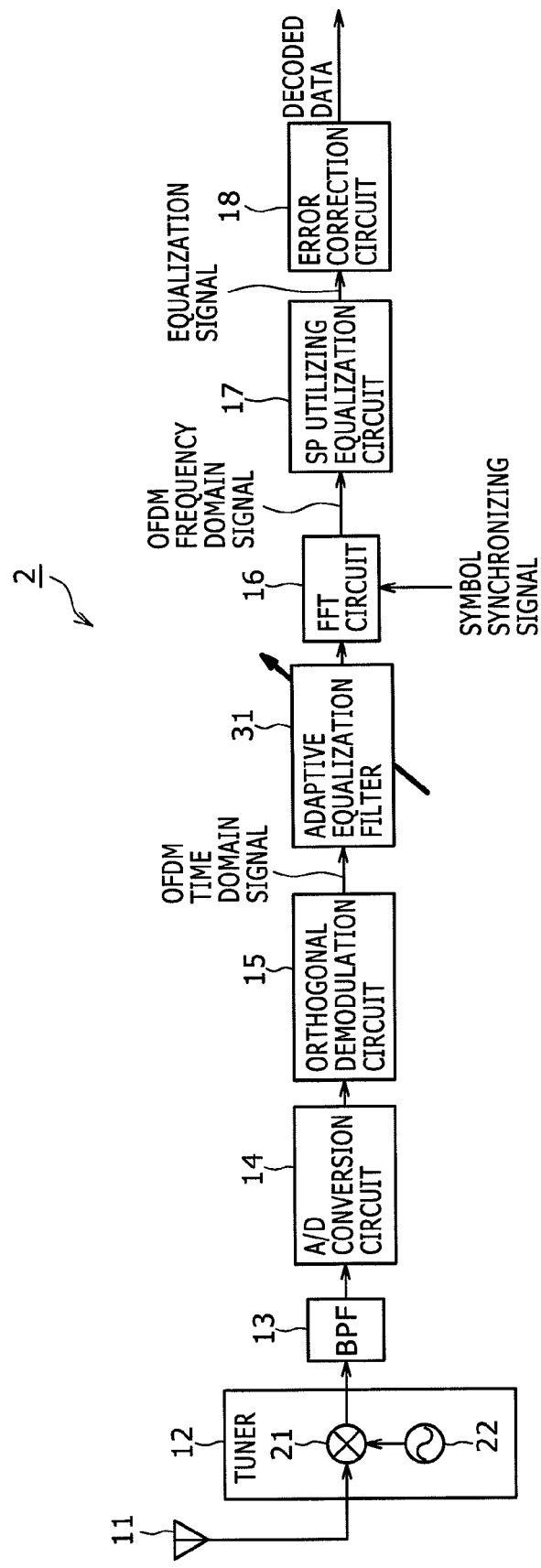
Figure 5:
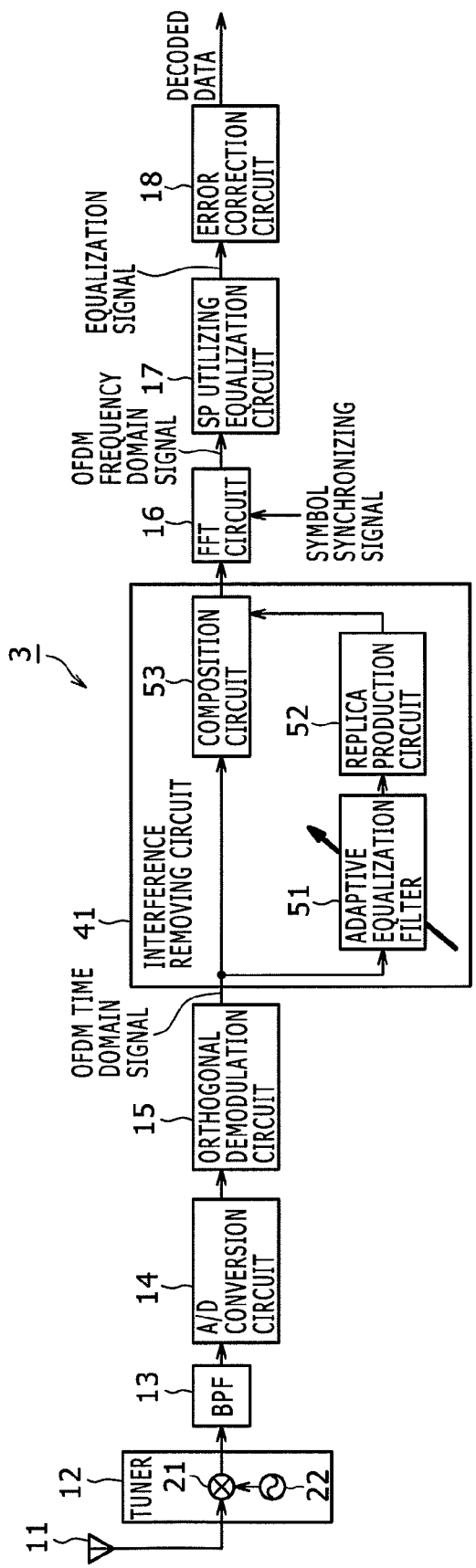

In the example of FIG. 9, only the adaptive equalization filter 231 is provided at a stage preceding to the FFT circuit 216. However, a removing circuit including an adaptive equalization filter for removing multi-path interference may be provided in such a manner as seen in FIG. 5.

Figure 10:
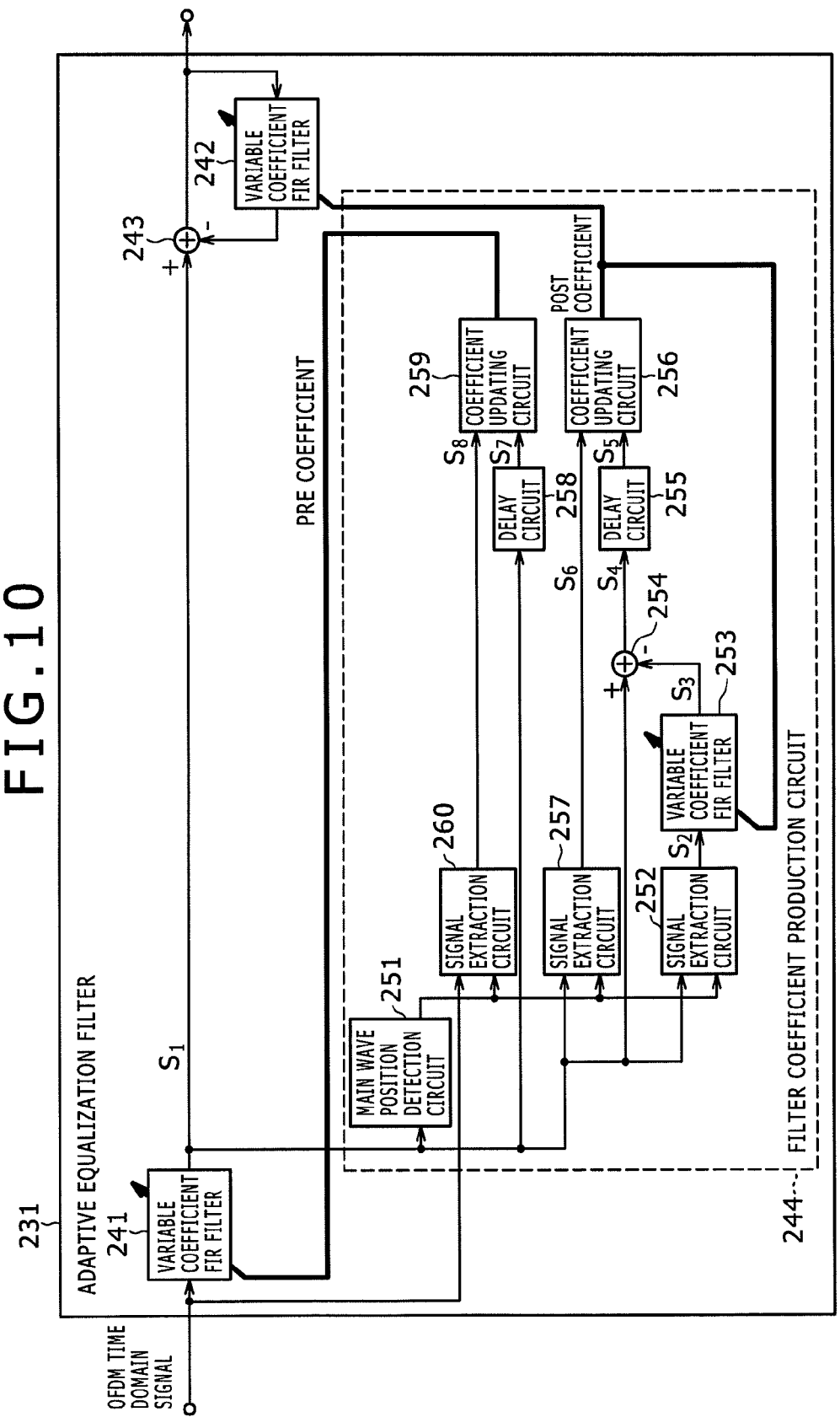
FIG. 10 is a block diagram showing an example of a configuration of an adaptive equalization filter shown in FIG. 9.

FIG. 10 shows an example of a configuration of the adaptive equalization filter 231 shown in FIG. 9.

Referring to FIG. 10, the filter coefficient production circuit 244 of the adaptive equalization filter 231 includes a main wave position detection circuit 251, a signal extraction circuit 252, a variable coefficient FIR filter 253, a subtraction circuit 254, a delay circuit 255, a coefficient updating circuit 256, a signal extraction circuit 257, a delay circuit 258, a coefficient updating circuit 259 and a signal extraction circuit 260. The OFDM time domain signal outputted from the orthogonal demodulation circuit 215 is inputted to the signal extraction circuit 260, and a pre-echo equalized signal outputted from the variable coefficient FIR filter 241 is inputted to the main wave position detection circuit 251, signal extraction circuit 252, subtraction circuit 254, signal extraction circuit 257 and delay circuit 258.

Here, production of a coefficient by the filter coefficient production circuit 244 is described suitably with reference to FIGS. 1 to 14. For the convenience of description, production of a post coefficient is described first, and then production of a pre coefficient is described.

The production of a post coefficient is carried out basically by the main wave position detection circuit 251, signal extraction circuit 252, variable coefficient FIR filter 253, subtraction circuit 254, delay circuit 255, coefficient updating circuit 256 and signal extraction circuit 257.

As described hereinabove with reference to FIG. 7, the process of removing a post echo is frequently carried out using an IIR filter. However, where a configuration which carries out a coefficient calculation process is incorporated in a feedback route of an IIR filter, there is the possibility that a local optimum point may be entered, and it is necessary to take a countermeasure with such possibility taken into consideration.

In the configuration of FIG. 10, where a line from the variable coefficient FIR filter 241 toward the FFT circuit 216 through the subtraction circuit 243 is referred to as online, calculation of a coefficient is carried out offline by using the variable coefficient FIR filter 253 separately from the variable coefficient FIR filter 242. Also it is possible to incorporate such a configuration for carrying out a coefficient calculation process as described above into a variable coefficient IIR filter which is formed from a variable coefficient FIR filter and a subtraction circuit.

The main wave position detection circuit 251 detects a predetermined position or time of the main wave which becomes a reference such as a start position of a GI of the main wave from within the pre-echo equalized signal supplied thereto from the variable coefficient FIR filter 241. The configuration of the main wave position detection circuit 251 and the detection of the position are hereinafter described with reference to FIGS. 17 and 18. The main wave position detection circuit 251 outputs a signal representative of the detected position to the signal extraction circuit 252, signal extraction circuit 257 and signal extraction circuit 260.

The signal extraction circuit 252 extracts a signal within an interval including a GI of the main wave from within the pre-echo equalized signal supplied from the variable coefficient FIR filter 241 in accordance with the position detected by the main wave position detection circuit 251. The signal extraction circuit 252 outputs a signal of the extracted interval which includes a GI of the main wave to the variable coefficient FIR filter 253.

Figure 11:
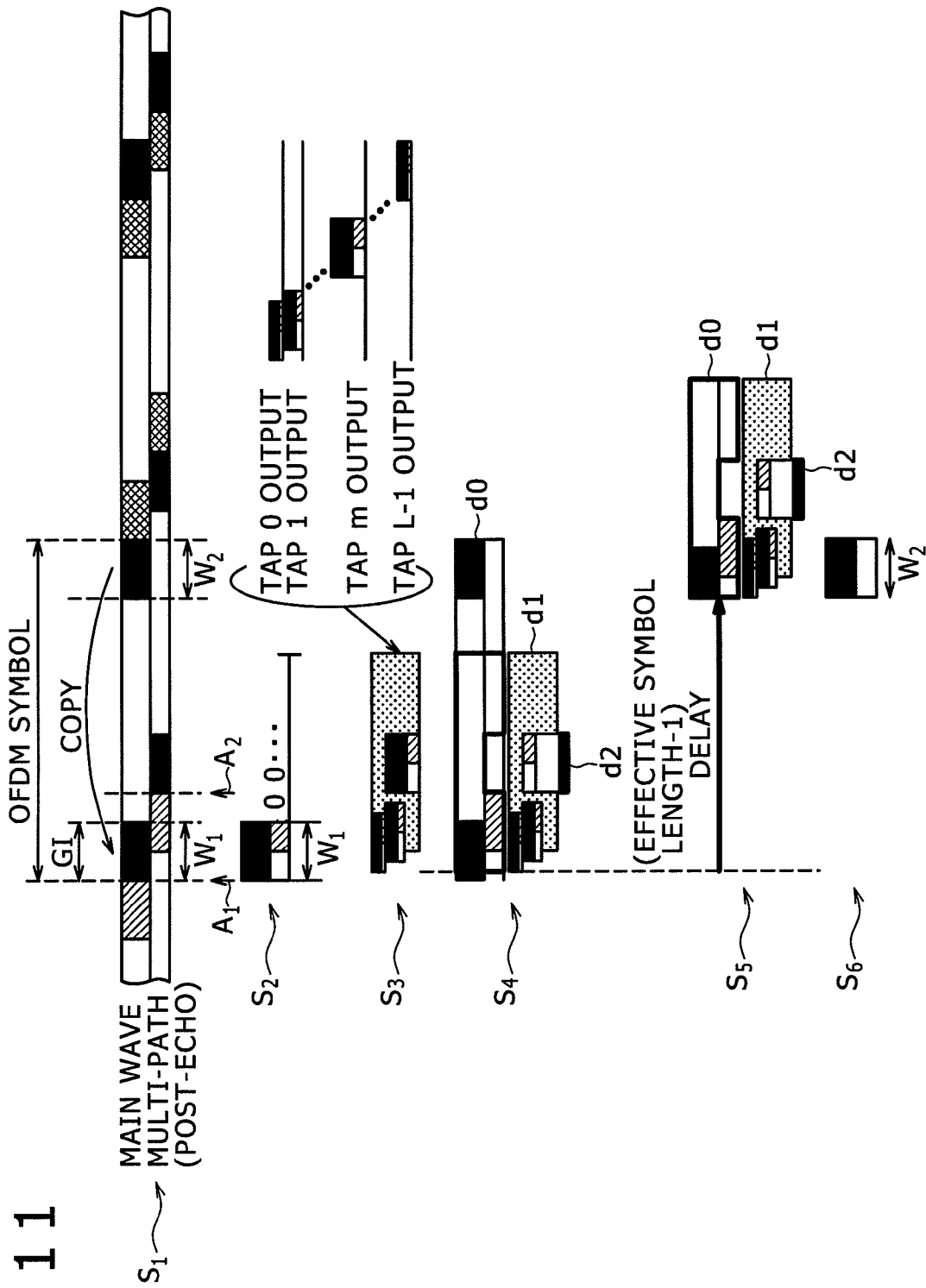
FIG. 11 is a diagrammatic view illustrating an example of signals used for production of a post coefficient.

FIG. 11 illustrates an example of the signals produced by various components.

The signal $S_1$ shown at the uppermost stage in FIG. 11 is the pre-echo equalized signal in an initial state (in a state wherein no post coefficient is produced) obtained in a two-wave environment. The pre-echo equalized signal $S_1$ includes a main wave component and a post-echo component. The upper side zone of the pre-echo equalized signal $S_1$ represents the main wave, and the zone on the lower side represents the post echo.

In FIG. 11, that the width of the zone representative of the post echo is smaller than the width of the zone representative of the main wave represents that the amplitude of the post echo is smaller than the amplitude of the main wave. The horizontal direction of FIG. 11 represents the time direction. In the example illustrated in FIG. 11, a delay by time corresponding to the distance from an arrow mark $A_1$ to another arrow mark $A_2$ occurs. If attention is paid to one OFDM symbol indicated by a double-sided arrow mark shown in FIG. 11, the start position of the OFDM symbol which is transmitted by the main wave and to which attention is paid is the position of the arrow mark $A_1$, and the start position of the OFDM symbol which is transmitted by the post echo and to which attention is paid is the position of the arrow mark $A_2$.

The signal S2 shown at the second stage from above in FIG. 11 is a signal obtained by adding a predetermined number of 0s to a signal within an interval $W_1$ which is extracted from the pre-echo equalized signal $S_1$ by the signal extraction circuit 252 and includes a GI of the main wave. The addition of 0s to the sequence within the interval $W_1$ is carried out, for example, by the signal extraction circuit 252. This signal $S_2$ is supplied from the signal extraction circuit 252 to the variable coefficient FIR filter 253. By adding 0s, the signal $S_2$ becomes a signal longer then the GI length on the time axis.

Referring back to FIG. 10, the variable coefficient FIR filter 253 applies filtering to the signal supplied thereto from the signal extraction circuit 252. In the initial state, a predetermined coefficient produced by the coefficient updating circuit 256 is used for the filtering. The variable coefficient FIR filter 253 outputs a signal obtained by the filtering as a multi-path dummy signal to the subtraction circuit 254.

The signal $S_3$ shown at the third stage from above in FIG. 11 is the multi-path dummy signal produced by the variable coefficient FIR filter 253. As seen in FIG. 11, the multi-path dummy signal $S_3$ is represented as a signal obtained by multiplying the signal $S_2$ whose position is successively displaced in the time direction by the tap coefficients corresponding to the respective positions to convert the amplitude and the phase of the signals $S_2$ and summing the signals having the amplitudes and the phases obtained by the conversion.

Figure 8:
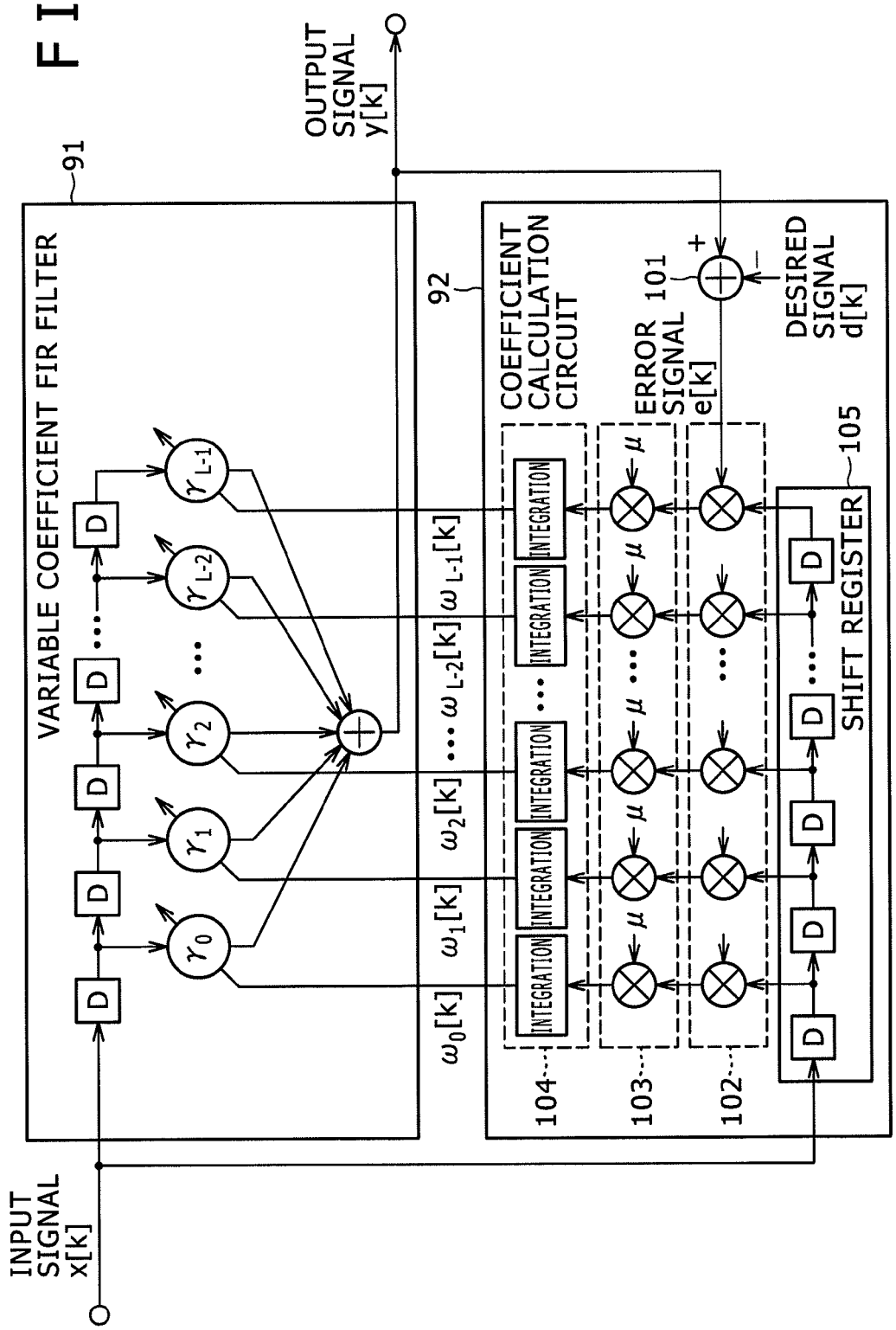
FIG. 8 is a block diagram showing an example of a circuit configuration to which the LMS algorithm is applied.

The signal represented as "tap 0 output" in FIG. 11 represents a signal outputted from the tap from the tap number 0 of the variable coefficient FIR filter 253, and the signal represented as "tap 1 output" represents a signal outputted from the tap of the tap number 1 of the variable coefficient FIR filter 253. Also the variable coefficient FIR filter 253 has a configuration similar to that of the variable coefficient FIR filter 91 shown in FIG. 8. Where it is assumed that one tap is formed from one delay element and one multiplier, the taps shown in FIG. 8 are, from the tap on the left side in FIG. 8, the tap of the tap number 0, the tap of the tap number 1, the tap of the tap number 2, . . . .

The multi-path dummy signal $S_3$ represented in such a form as described above is supplied from the variable coefficient FIR filter 253 to the subtraction circuit 254.

The subtraction circuit 254 subtracts the multi-path dummy signal from the pre-echo equalized signal to produce an error signal. The subtraction circuit 254 outputs the produced error signal to the delay circuit 255.

The signal $S_4$ shown at the fourth stage from above in FIG. 11 represents an error signal obtained by subtracting the multi-path dummy signal $S_3$ from the signal within the range of one OFDM signal from within the pre-echo equalized signal $S_1$. The error signal $S_4$ is formed principally from three signal components of terms d0 to d2.

The term d0 is a term obtained by removing the GI of the post echo from the pre-echo equalized signal $S_1$.

The term d1 is a term which appears where the coefficient of any tap which does not have a multi-path or post echo is non-zero.

Here, the tap which has a multi-path signifies a tap which carries out multiplication, by a coefficient, of a signal delayed by time corresponding to delay time of a multi-path by a delay element of an FIR filter. A tap having no multi-path is a tap any other than those taps which have a multi-path from among the taps of the FIR filter.

The term d2 is a term obtained by multiplying, where a tap coefficient of a tap having a multi-path and an optimum coefficient corresponding to the amplitude and the phase of an actual multi-path have a difference therebetween, the difference between the coefficients by the GI of the main wave. Since the error signal $S_4$ includes this term d2, it is a signal representative of the difference between the coefficient of the tap having a multi-path and the optimum coefficient corresponding to the amplitude and the phase of the actual multi-path.

The error signal $S_4$ including such components as described above is supplied from the subtraction circuit 254 to the delay circuit 255.

The delay circuit 255 delays the error signal supplied thereto from the subtraction circuit 254 by time corresponding to an interval shorter by one sample length from the effective symbol length with reference to the position later by one sample distance from the start position of the OFDM symbol of the main wave. Then, the delay circuit 255 outputs the delayed error signal to the coefficient updating circuit 256. The position to be used as the reference for delay and the time corresponding to one sample are suitably set in accordance with the characteristic of the transmission line and so forth.

The signal $S_5$ shown at the fifth stage from above in FIG. 11 represents the error signal $S_4$ delayed by the delay circuit 255. As regards the term d0, a range having an equal length to that of the term d1 indicated by a thick line is extracted. The start position of the signal $S_5$ coincides with the start position of an interval of the copy source of the GI of the main wave.

Meanwhile, the signal extraction circuit 257 to which the pre-echo equalized signal outputted from the variable coefficient FIR filter 241 is inputted extracts a signal within an interval including the copy source of the GI of the main wave from the pre-echo equalized signal in accordance with the position detected by the main wave position detection circuit 251. The signal extraction circuit 257 outputs the signal of the interval including the copy source of the GI of the main wave as a reference signal to the coefficient updating circuit 256 in synchronism with outputting of a signal from the delay circuit 255.

The signal $S_6$ shown at the sixth state from above in FIG. 11 is a reference signal extracted by the signal extraction circuit 257. In the example of FIG. 11, a signal within an interval $W_2$ including the copy source of the GI of the main wave is extracted from the pre-echo equalized signal $S_1$.

The coefficient updating circuit 256 produces a post coefficient based on the error signal supplied from the delay circuit 255 and the reference signal supplied from the signal extraction circuit 257 and outputs the produced post coefficient to the variable coefficient FIR filter 242 and the variable coefficient FIR filter 253.

Figure 12:
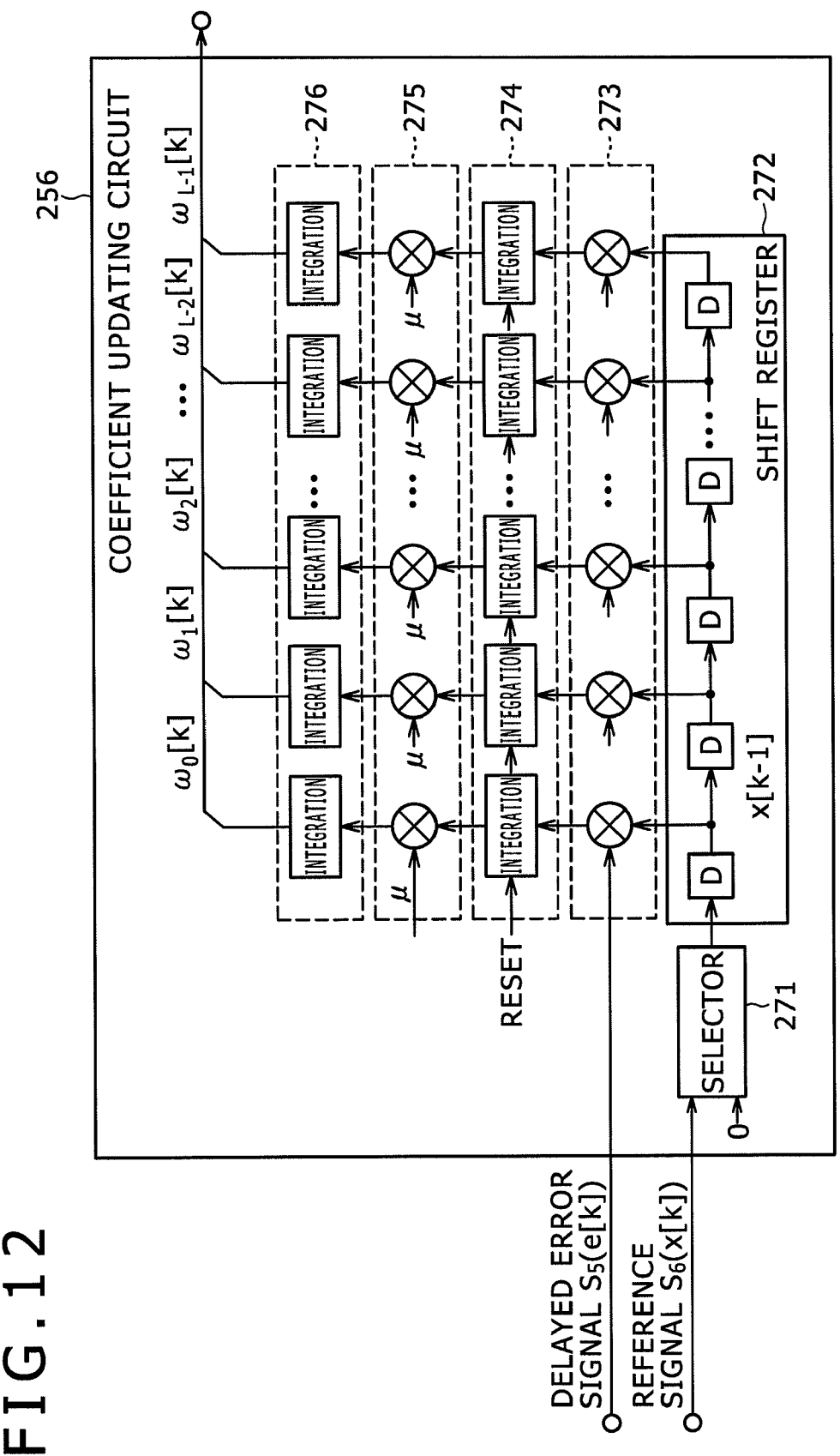
FIG. 12 is a block diagram showing an example of a configuration of a coefficient updating circuit shown in FIG. 10.

FIG. 12 shows an example of a configuration of the coefficient updating circuit 256.

Referring to FIG. 12, the coefficient updating circuit 256 includes a selector 271, a shift register 272, a multiplication circuit 273, an integration circuit 274, a multiplication circuit 275, and another integration circuit 276. An error signal outputted from the delay circuit 255 is inputted to multipliers of the multiplication circuit 273, and a reference signal outputted from the signal extraction circuit 257 is inputted to the selector 271.

The selector 271 adds a predetermined number of 0s to the rear half or the like of the reference signal so that the reference signal may have a length equal to that of the delay signal. The selector 271 outputs the reference signal having 0s added thereto to the shift register 272.

The shift register 272 is formed from a plurality of delay elements, which successively delay the reference signal supplied thereto from the selector 271. Data stored in the individual delay elements are used for updating of the coefficients of the corresponding taps.

The multiplication circuit 273 is formed from a plurality of multipliers, which individually multiply the error signals and the reference signals individually delayed by the delay elements of the shift register 272 to calculate sample correlation values. The multiplication circuit 273 outputs the calculated sample correlation values to the integration circuit 274.

The integration circuit 274 is formed from a plurality of integrators, which individually integrate the sample correlation values calculated by the multiplication circuit 273 corresponding to an interval of the reference signal. The integration circuit 274 outputs results of the integration of the sample correlation values to the multiplication circuit 275. By carrying out the integration process in this manner, the accuracy of the sample correlation values can be improved. The integration results by the integration circuit 274 are reset every time the object OFDM symbol changes over.

The multiplication circuit 275 is formed from a plurality of multipliers, which individually multiply the integration results of the sample correlation values calculated by the integration circuit 274 by the step size μ and output results of the multiplication as coefficient updating values to the integration circuit 276.

The integration circuit 276 is formed from a plurality of integrators, which individually integrate the coefficient updating values calculated by the multiplication circuit 275 and output results of the integration as post coefficients.

For example, the multiplier at the left end of the multiplication circuit 273, the integrator at the left end of the integration circuit 274, the multiplier at the left end of the multiplication circuit 275 and the integrator at the left end of the integration circuit 276 produce a coefficient for the tap of the tap number 0 of the variable coefficient FIR filters 242 and 253. Meanwhile, the second multiplier from the left of the multiplication circuit 273, the second integrator from the left of the integration circuit 274, the second multiplier from the left of the multiplication circuit 275 and the second integrator from the left of the integration circuit 274 produce a coefficient for the tap of the tap number 1 of the variable coefficient FIR filters 242 and 253. The multipliers and integrators are provided in accordance with the number of the taps.

A process of production (updating) of a coefficient carried out by the coefficient updating circuit 256 having such a configuration described hereinabove is described with reference to FIGS. 13 and 14.

The production of a coefficient is carried out making use of a fact of an OFDM time domain signal that, where a predetermined interval of an OFDM time domain signal is one sample, although a sample in an interval in a GI and another sample in an interval in a copy source of the GI have a high correlation, the correlation between other samples is very low. Since a GI and a copy source of the GI are the same signal, the correlation is determined in such a manner as described above.

Figure 13:
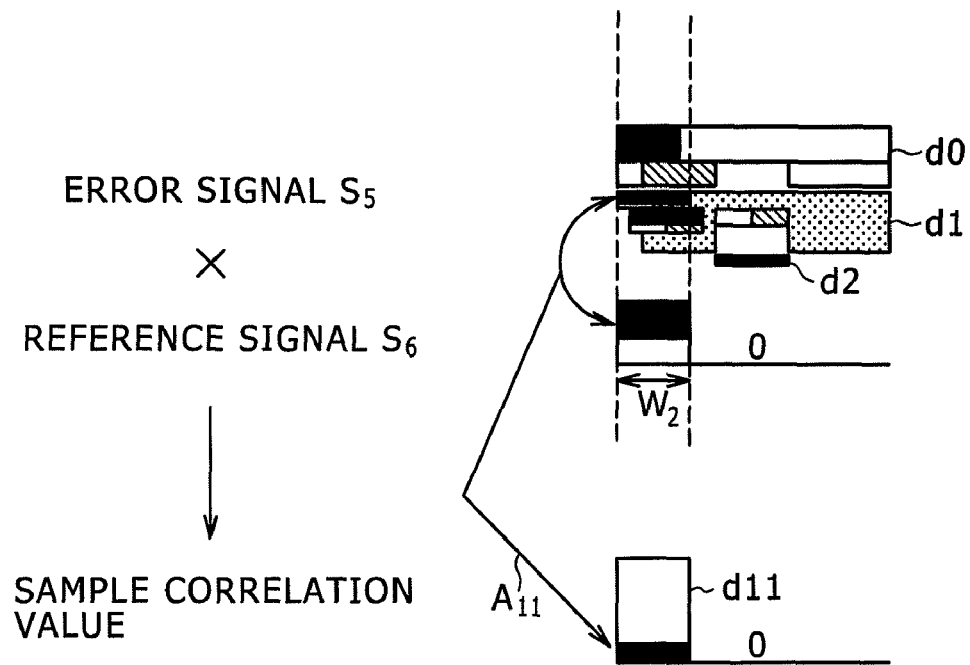
FIG. 13 is a diagrammatic view illustrating an example of a signal used for production of a coefficient of a tap which does not have a multi-path.

FIG. 13 illustrates an example of a signal used for production of a coefficient of a tap which does not have a multi-path.

Referring to FIG. 13, where the tap of the tap number 0 has no multi-path and besides the coefficient set to the tap is non-zero, a correction corresponding to the component of the term d1 of the error signal $S_5$ occurs between the error signal $S_5$ and the reference signal $S_6$ as indicated by the top of an arrow mark $A_{11}$.

The other terms than the term d1 of the error signal $S_5$ can be regarded as noise terms whose correlation with the reference signal $S_6$ is 0 in average. The term d11 represents the correlation between the noise terms and the signal $S_6$.

The sample correlation value determined in this manner is processed by the multiplication circuit 273, integration circuit 274, multiplication circuit 275 and integration circuit 276 to produce a coefficient of the tap of the tap number 0.

Since the tap of the tap number 0 does not have a multi-path, the coefficient is updated in a direction in which the sample correlation value is canceled similarly as in the LMS algorithm. In other words, the coefficient of the tap of the tap number 0 is controlled so as to normally approach 0.

The coefficient not only of the tap of the tap number 0 but also of all of the other taps which do not have a multi-path is updated in a similar manner.

Figure 14:
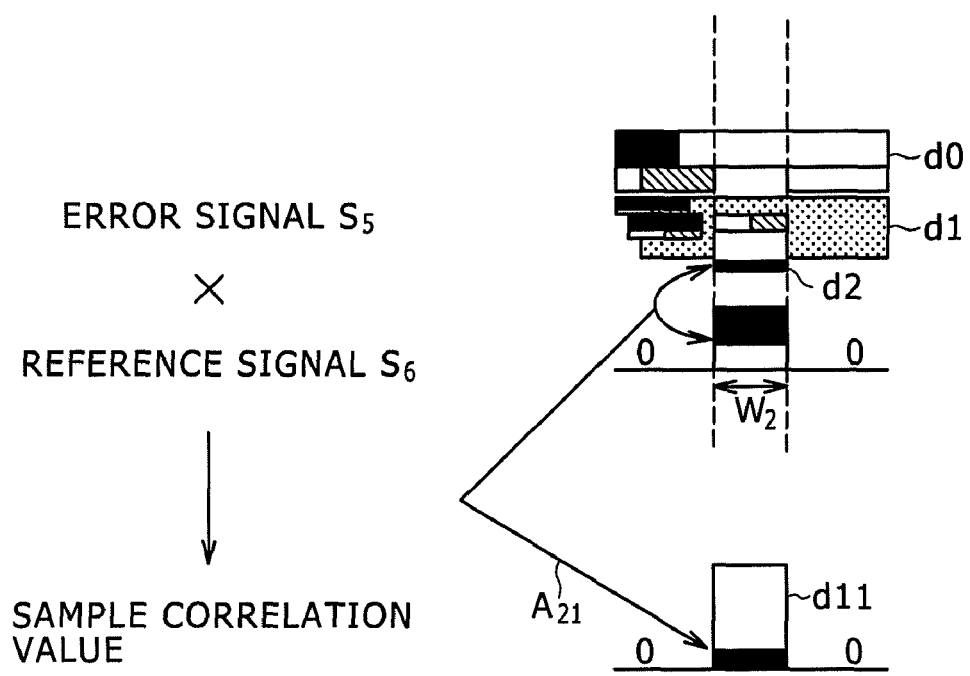
FIG. 14 is a diagrammatic view illustrating an example of a signal used for production of a coefficient of a tap which has a multi-path.

FIG. 14 illustrates an example of a signal used for production of a coefficient of a tap having a multi-path.

FIG. 14 is different from FIG. 13 in that, between the error signal $S_5$ and the reference signal $S_6$, a correlation according to the component of the term d2 which relies upon the difference between the coefficient according to the amplitude and the phase of an actual multi-path and the set coefficient as indicated by the head of an arrow mark $A_{21}$ illustrated in FIG. 14 is produced.

The sample correlation value determined in this manner is processed by the multiplication circuit 273, integration circuit 274, multiplication circuit 275 and integration circuit 276 to update the coefficient in a direction in which the correlation between the term d2 and the signal $S_6$ is canceled. Finally, a coefficient corresponding to the amplitude and the phase of the actual multi-path is produced.

The coefficients successively produced in this manner are supplied to both of the variable coefficient FIR filter 242 and the variable coefficient FIR filter 253 so as to be updated thereby to implement such an operation as to gradually raise the accuracy of the coefficients while the process of removing post echoes is carried out.

Now, production of a pre coefficient is described.

The production of a pre coefficient is carried out basically by the main wave position detection circuit 251, delay circuit 258, coefficient updating circuit 259 and signal extraction circuit 260.

Also a pre coefficient is produced by a procedure similar to that for a post coefficient. While two variable coefficient FIR filters including the variable coefficient FIR filter 253 which is a filter for coefficient production and the variable coefficient FIR filter 242 which is a filter for multi-path removal are provided as a configuration which relates to a post coefficient, since only the variable coefficient FIR filter 241 is provided as a configuration which relates to a pre coefficient, the procedure for production of a post coefficient is different from that of a pre coefficient.

Since the output signal of the variable coefficient FIR filter 241 is used for production of a coefficient, it can be regarded that the variable coefficient FIR filter 241 shown in FIG. 10 shares an FIR filter both for coefficient production and multi-path (pre-echo) removal. Also it is possible to produce, similarly to a post coefficient, a pre coefficient offline using a separate variable coefficient FIR filter for coefficient production.

Figure 7:
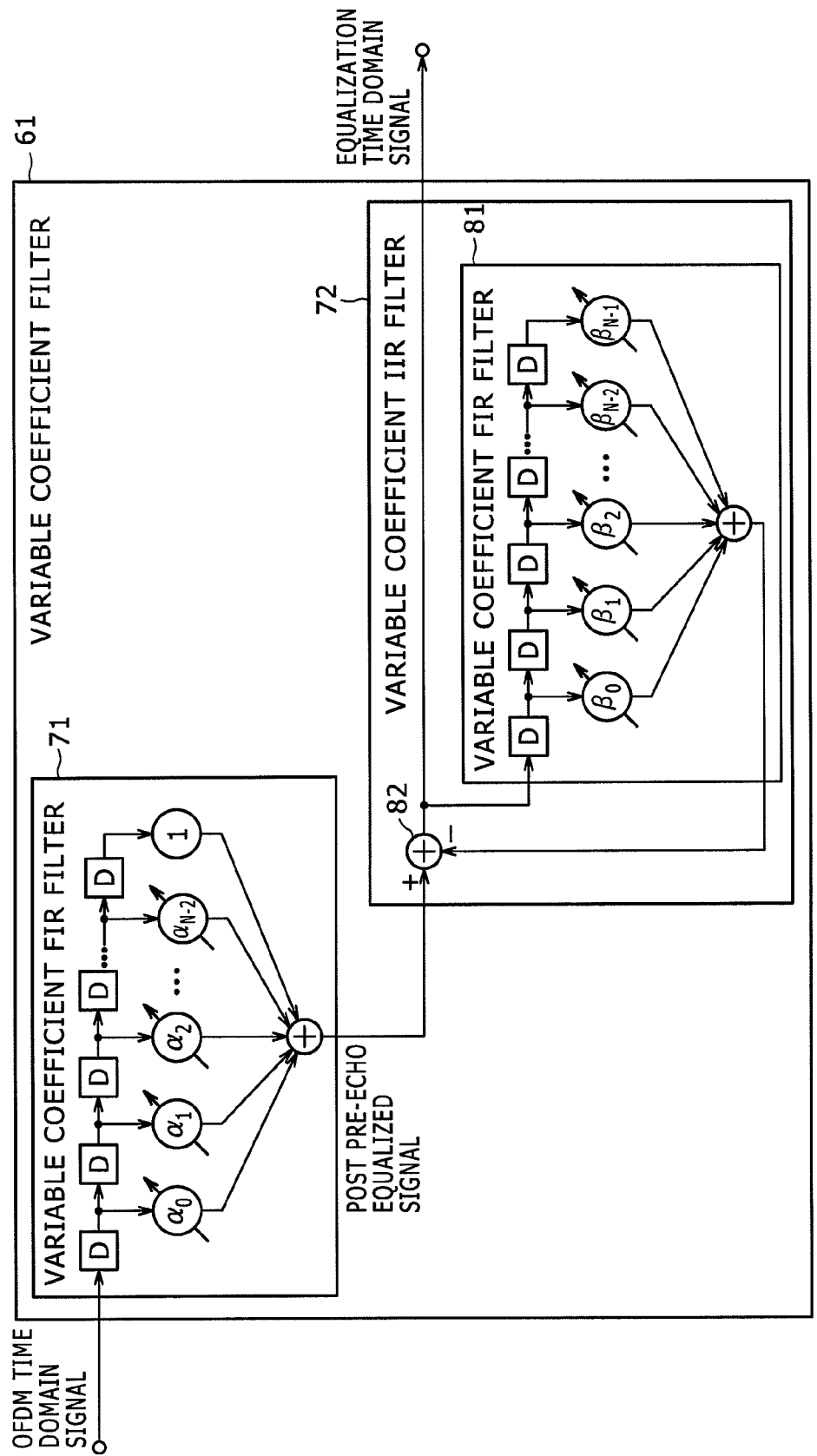
FIG. 7 is a block diagram showing an example of a configuration of a variable coefficient filter shown in FIG. 6.

The variable coefficient FIR filter 241 has a configuration similar to that of the variable coefficient FIR filter 71 shown in FIG. 7. The coefficient of the last tap is 1, and a coefficient with which a pre-echo component included in a signal outputted from the last tap is removed is produced.

In order to remove or suppress a pre-echo component included in a signal outputted from the last tap, the signals are synthesized in order beginning with the signal of the last tap after the amplitudes of the main wave of signals in the future individually by time intervals equal to the delay time intervals are set equal to the amplitude of the multi-paths. Consequently, in place of the fact that pre-echo components can be removed or suppressed, attenuated multi-path components having delay time periods equal to twice the delay time periods of the actual multi-paths are produced.

Accordingly, the newly produced multi-path components must be removed by the taps of the variable coefficient FIR filter 241 which are intended for signals delayed by time periods equal to twice the delay time periods of actual multi-paths by the delay elements.

Taking the foregoing into consideration, an output of the variable coefficient FIR filter 241 is described with reference to FIG. 15.

The signal $S_{11}$ is an OFDM time domain signal including a pre-echo component. The OFDM time domain signal $S_{11}$ is inputted to the variable coefficient FIR filter 241. The zone at the upper stage represents the pre-echo, and the zone at the lower stage represents the main wave.

The signal $S_{12}$ represents an output of a tap intended for a signal delayed by a time period equal to twice the delay time of a multi-path by the delay element, and the signal $S_{13}$ represents an output of a tap which has a multi-path.

The signal $S_{14}$ represents an output signal of the last tap of the variable coefficient FIR filter 241. Since the coefficient of the last tap of the variable coefficient FIR filter 241 is 1, the output of the last tap merely is a delayed signal of the OFDM time domain signal $S_{11}$. An arrow mark $A_{31}$ illustrated in FIG. 15 represents that the OFDM time domain signal $S_{11}$, is delayed by all of the delay elements of the variable coefficient FIR filter 241.

The signal $S_{15}$ represents an output where the coefficient of a tap which does not have a multi-path is non-zero.

Figure 15:
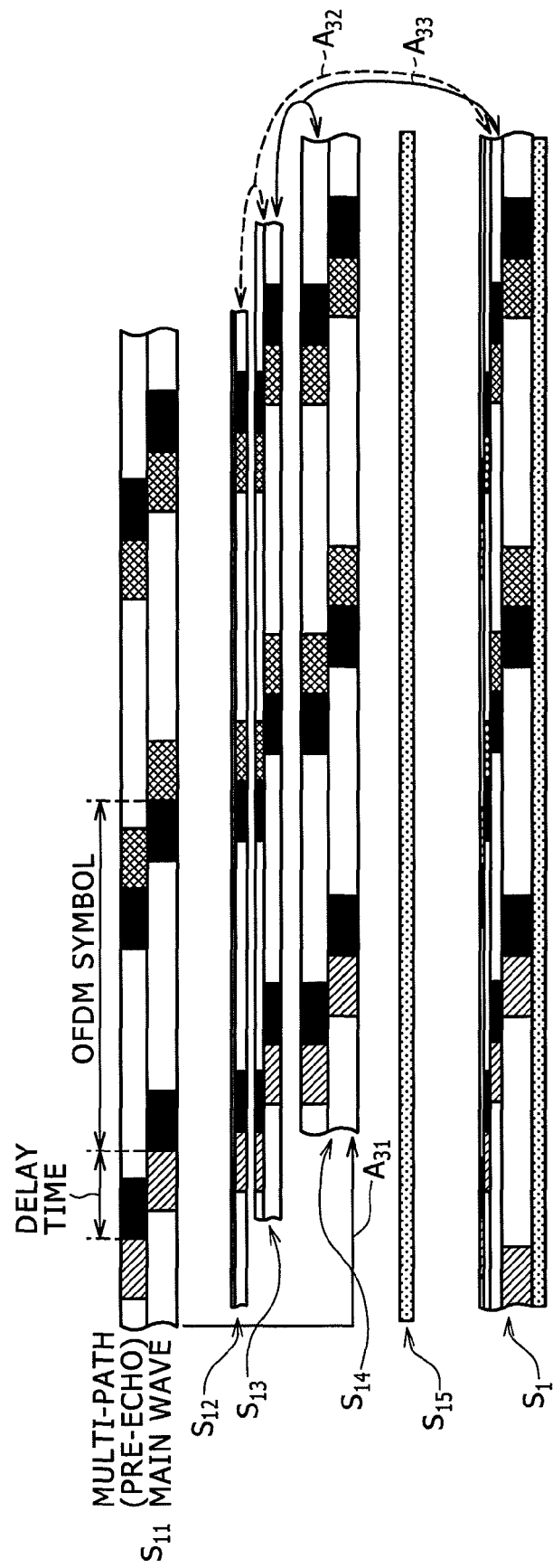
FIG. 15 is a diagrammatic view illustrating an example of a pre-echo equalized signal.

The signal shown at the lowermost stage of FIG. 15 represents the pre-echo equalized signal $S_1$. The pre-echo equalized signal $S_1$ is a result of synthesis of the signals of the taps after the amplitudes of the main wave of signals in the future by time periods equal to the delay time periods are set equal in order beginning with the signal of the last tap. Arrow marks $A_{32}$ and $A_{33}$ in FIG. 15 represent synthesis of the main wave and multi-paths.

The pre-echo equalized signal $S_1$ includes a component of the main wave, multi-path components remaining as a result of failure in full removal of the same, multi-path components having, as delay time periods, time periods equal to twice the delay time periods of multi-path components which have not been removed and components which appear where the coefficient of a tap which does not have a multi-path is non-zero.

The pre-echo equalized signal $S_1$ having such components as described above is inputted as a signal to be used for production of a pre coefficient to the main wave position detection circuit 251, delay circuit 258 and signal extraction circuit 260. Also the OFDM time domain signal outputted from the orthogonal demodulation circuit 215 is inputted to the signal extraction circuit 260.

The main wave position detection circuit 251 detects a predetermined position of the main wave as described hereinabove. A signal representative of the position detected by the main wave position detection circuit 251 is inputted to the signal extraction circuit 260.

The delay circuit 258 delays the pre-echo equalized signal supplied form the variable coefficient FIR filter 241 so that the start point of a number of data equal to the number of taps of the variable coefficient FIR filter 241 which is determined with reference to a GI of the main wave, that is, a number of sample data equal to the number of taps, may become the same time point as the start point of a signal within an interval which includes the copy source of the GI of the main wave extracted by the signal extraction circuit 260. The delay circuit 258 outputs the delayed pre-echo equalized signal to the coefficient updating circuit 259.

The coefficient updating circuit 259 handles the range of a number of data equal to the number of taps of the variable coefficient FIR filter 241 which is determined with reference to the start position of the GI of the main wave from within the delayed pre-echo equalized signal as an error signal. Since the start position of the GI of the main wave is detected by the main wave position detection circuit 251 using the pre-echo equalized signal, in order to extract a range to be determined as an error signal from the pre-echo equalized signal, such adjustment by the delay time of the variable coefficient FIR filter 241 is required.

The signal extraction circuit 260 extracts a signal within the interval which includes the copy source of the GI of the main wave in accordance with the position detected by the main wave position detection circuit 251 from the OFDM time domain signal supplied thereto from the orthogonal demodulation circuit 215. The signal extraction circuit 260 outputs the signal within the period which includes the copy source of the GI of the main wave as a reference signal to the coefficient updating circuit 259.

The coefficient updating circuit 259 has a configuration similar to that of the coefficient updating circuit 256 shown in FIG. 12. The coefficient updating circuit 259 calculates a sample correlation value between an error signal within the range of a number of data equal to the number of taps of the variable coefficient FIR filter 241 determined with reference to the start position of the GI of the main wave and the reference signal supplied thereto from the signal extraction circuit 260 to produce a pre coefficient. When the range of the error signal is to be extracted from the pre-echo equalized signal, the position detected by the main wave position detection circuit 251 may be referred to as occasion demands.

In particular, the coefficient updating circuit 259 produces, for each of those taps which have a multi-path and those taps which have delay periods multiplied by a fixed number, a coefficient which cancels a multi-path component. Further, for any other tap, since a correlation appears where the coefficient which must be zero is actually non-zero, the coefficient updating circuit 259 updates the coefficient in a direction in which it is canceled so that the coefficient is converged to zero.

The coefficient updating circuit 259 outputs the produced pre coefficient to the variable coefficient FIR filter 241.

Figure 16:
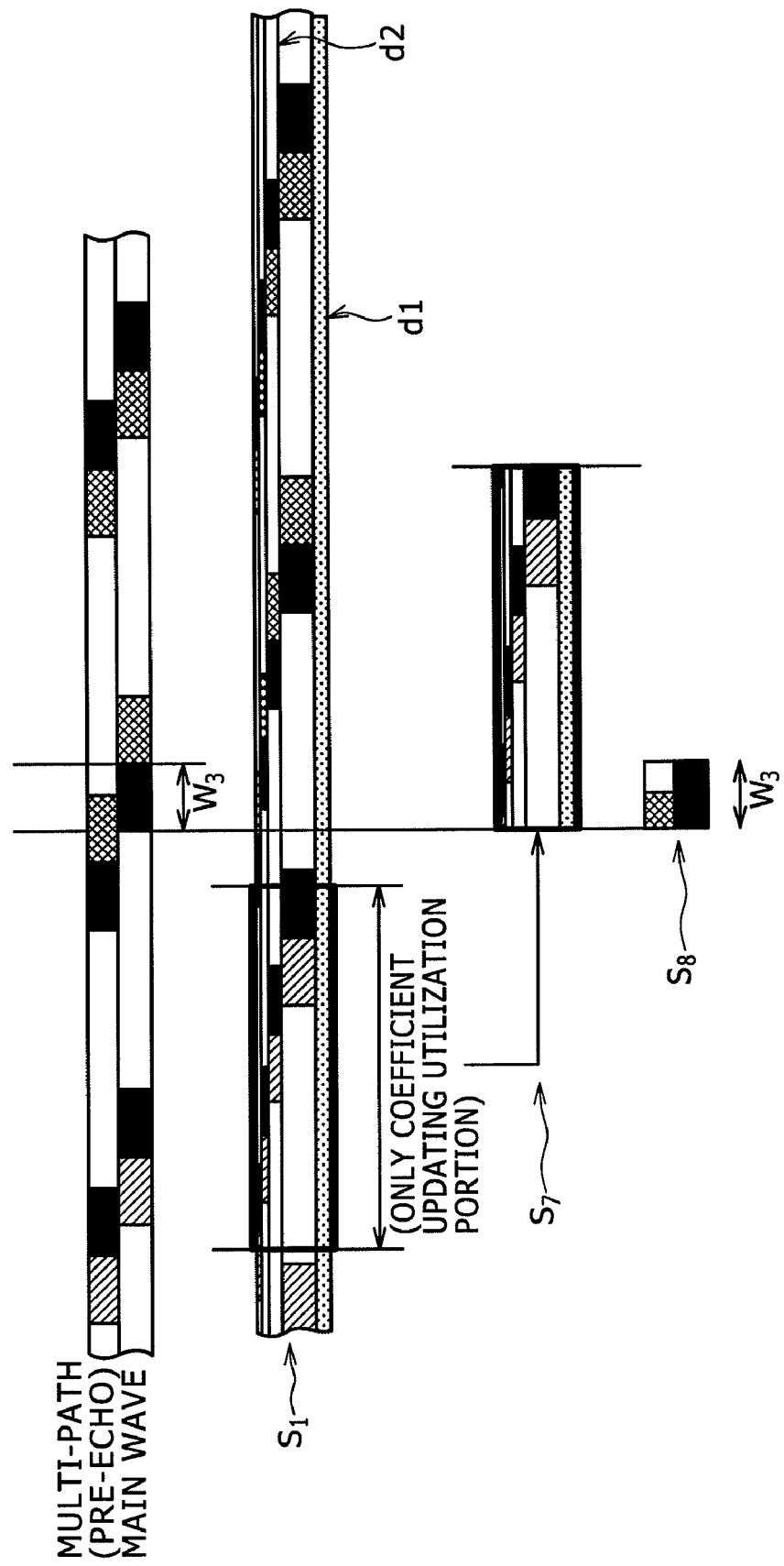
FIG. 16 is a diagrammatic view illustrating an example of a signal used for production of a pre coefficient.

FIG. 16 illustrates an example of signals used for production of a pre coefficient.

The signal shown at the uppermost stage of FIG. 16 is an OFDM time domain signal. The signal extraction circuit 260 extracts a signal within an interval which includes the copy source of a GI of the main wave from the OFDM time domain signal. In the example of FIG. 16, a range indicated by an interval $W_3$ is extracted, and a signal within the interval $W_3$ is inputted as a reference signal to the coefficient updating circuit 259. The signal $S_8$ shown at the lowermost stage in FIG. 16 is the reference signal.

The signal shown at the second stage from above in FIG. 16 is the pre-echo equalized signal $S_1$. The delay circuit 258 delays the pre-echo equalized signal $S_1$, and the coefficient updating circuit 259 handles a number of data equal to the number of taps of the variable coefficient FIR filter 241 from within the delayed pre-echo equalized signal $S_1$ as an error signal.

The signal $S_7$ shown at the third stage from above in FIG. 16 is an error signal. In the present example, the range of a number of data equal to the number of taps of the variable coefficient FIR filter 241 at a position preceding to a reference which is a position in time preceding by one sample distance from the end position of the GI of the main wave is an error signal.

The production of a pre coefficient is carried out in such a manner as described above.

Figure 17:
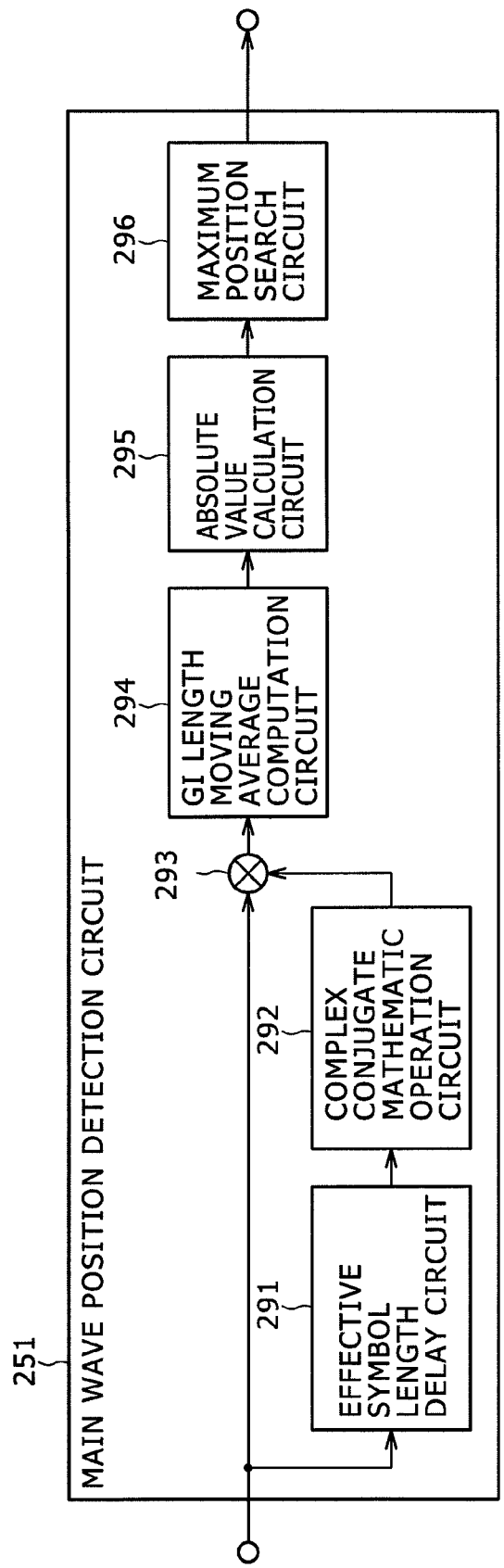
FIG. 17 is a block diagram showing an example of a configuration of a main wave position detection circuit shown in FIG. 10.

FIG. 17 shows an example of a configuration of the main wave position detection circuit 251. Detection of the start position of the GI of the main wave is described suitably with reference to FIG. 18.

Referring to FIG. 17, the main wave position detection circuit 251 includes an effective symbol length delay circuit 291, a complex conjugate mathematic operation circuit 292, a multiplication circuit 293, a GI length moving average computation circuit 294, an absolute value calculation circuit 295 and a maximum position search circuit 296. The pre-echo equalized signal outputted from the variable coefficient FIR filter 241 is inputted to the effective symbol length delay circuit 291 and the multiplication circuit 293.

The effective symbol length delay circuit 291 delays the pre-echo equalized signal inputted thereto from the variable coefficient FIR filter 241 by a period of time corresponding to the effective symbol length and outputs the delayed pre-echo equalized signal to the complex conjugate mathematic operation circuit 292.

The signal $S_{21}$ shown at the uppermost stage in FIG. 18 represents the pre-echo equalized signal which is inputted to the effective symbol length delay circuit 291 and includes a component of the main wave and post-echo components. FIG. 18 illustrates an example of the signals in a two-wave environment.

The signal $S_{22}$ shown at the second stage from above in FIG. 18 represents the pre-echo equalized signal delayed by the effective symbol length.

The complex conjugate mathematic operation circuit 292 calculates a conjugate complex number using the pre-echo equalized signal supplied thereto from the effective symbol length delay circuit 291 and outputs the calculated conjugate complex number to the multiplication circuit 293.

The multiplication circuit 293 multiplies the pre-echo equalized signal by the conjugate complex number calculated by the complex conjugate mathematic operation circuit 292 to determine an autocorrelation for each sample of the input signal of the main wave position detection circuit 251. The multiplication circuit 293 outputs the autocorrelation value for each sample to the GI length moving average computation circuit 294.

The GI length moving average computation circuit 294 calculates a moving average of the GI length among the autocorrelations of the samples. The GI length moving average computation circuit 294 has a window of the GI length set therein.

The signal $S_{23}$ shown at the third stage from above in FIG. 18 indicates the moving average of the GI length among the autocorrelation values of the samples calculated by the GI length moving average computation circuit 294. In this manner, the moving average of the GI length among the autocorrelations of the samples is determined as a signal of synthesis of triangular waves.

The GI length moving average computation circuit 294 outputs the calculated moving average to the absolute value calculation circuit 295.

The absolute value calculation circuit 295 calculates an absolute value of the moving average supplied thereto from the GI length moving average computation circuit 294. The absolute value calculation circuit 295 outputs the calculated absolute value to the maximum position search circuit 296.

The GI length moving average computation circuit 294 detects a point at which the autocorrelation has a maximum value based on the absolute value of the moving average supplied thereto from the absolute value calculation circuit 295. The detected position represents the start position of the GI of the main wave, that is, a boundary position of the OFDM symbol. The maximum position search circuit 296 outputs a signal representative of the detected position to the associated circuits.

The position represented by the signal outputted from the maximum position search circuit 296 is used for production of a post coefficient and a pre coefficient.

Here, operation of the OFDM reception apparatus 201 having such a configuration as described above is described.

First, an OFDM demodulation process of the OFDM reception apparatus 201 is described with reference to a flow chart of FIG. 19. Processes at steps are executed suitably in parallel to some other process or sequentially to other process. This similarly applies also to processes at steps in FIGS. 20 to 22 hereinafter described.

First at step S1, the tuner 212 frequency converts an RF signal received by the reception antenna 211 into an IF signal and outputs the IF signal to the BPF 213.

At step S2, the BPF 213 applies filtering to an IF signal and outputs a resulting signal to the A/D conversion circuit 214.

At step S3, the A/D conversion circuit 214 carries out A/D conversion for the signal supplied thereto from the BPF 213 and outputs a resulting digital IF signal to the orthogonal demodulation circuit 215.

At step S4, the orthogonal demodulation circuit 215 carries out orthogonal demodulation to produce an OFDM time domain signal and outputs the produced OFDM time domain signal to the adaptive equalization filter 231.

At step S5, the adaptive equalization filter 231 carries out a time domain equalization process. An OFDM time domain signal obtained by the time domain equalization process is outputted from the adaptive equalization filter 231 to the FFT circuit 216. The time domain equalization process is hereinafter described with reference to FIG. 20.

At step S6, the FFT circuit 216 carries out FFT mathematic operation for the OFDM time domain signal supplied thereto from the adaptive equalization filter 231 and outputs a resulting OFDM frequency domain signal to the SP utilization equalization circuit 217.

At step S7, the SP utilization equalization circuit 217 calculates the transmission line characteristic of all subcarriers using an SP signal to compensate for the distortion by the transmission line included in the OFDM frequency domain signal. The SP utilization equalization circuit 217 outputs an equalization signal obtained by the compensation for the distortion by the transmission line to the error correction circuit 218.

At step S8, the error correction circuit 218 carries out various processes such as a deinterleave process for the equalization signal supplied thereto from the SP utilization equalization circuit 217 and outputs resulting decoded data to the circuit at the succeeding stage. The series of processes described above are carried out repetitively while reception of an OFDM signal is carried out by the OFDM reception apparatus 201.

Now, the time domain equalization process carried out at step S5 of FIG. 19 is described with reference to FIG. 20.

At step S11, the main wave position detection circuit 251 detects a predetermined position of the main wave from the pre-echo equalized signal supplied thereto from the variable coefficient FIR filter 241 and outputs a signal representative of the detected position to the signal extraction circuit 252, signal extraction circuit 257 and signal extraction circuit 260.

At step S12, a pre-echo removing process is carried out. The pre-echo removing process is hereinafter described with reference to FIG. 21.

At step S13, a post-echo removing process is carried out. The post-echo removing process is hereinafter described with reference to FIG. 22. After the post-echo removing process ends, the processing returns to step S5 of FIG. 19 so that the processes at the succeeding steps are carried out subsequently.

The pre-echo removing process carried out at step S12 of FIG. 20 is described with reference to FIG. 21.

At step S21, the delay circuit 258 of the filter coefficient production circuit 244 delays the pre-echo equalized signal supplied thereto from the variable coefficient FIR filter 241 and outputs the delayed pre-echo equalized signal to the coefficient updating circuit 259. Of the pre-echo equalized signals outputted from the delay circuit 258, the signal within a predetermined range with reference to the start position of a GI of the main wave is handled as an error signal by the coefficient updating circuit 259.

At step S22, the signal extraction circuit 260 extracts the signal within the interval including the copy source of the GI of the main wave from within the OFDM time domain signal supplied thereto from the orthogonal demodulation circuit 215 and outputs the extracted signal to the coefficient updating circuit 259.

At step S23, the coefficient updating circuit 259 calculates a sample correlation value of the error signal and the reference signal and produces a pre coefficient so as to update the sample correlation value in a direction in which the sample correlation value is canceled. The coefficient updating circuit 259 outputs the pre coefficient to the variable coefficient FIR filter 241.

At step S24, the variable coefficient FIR filter 241 applies filtering to the OFDM time domain signal using the pre coefficient produced by the coefficient updating circuit 259 to carry out removal or suppression of a pre-echo component included in the OFDM time domain signal. The variable coefficient FIR filter 241 outputs the resulting OFDM time domain signal. Thereafter, the processing returns to step S12 of FIG. 20 so that the processes at the succeeding steps are executed subsequently.

The post-echo removing process carried out at step S13 of FIG. 20 is described with reference to FIG. 22.

At step S31, the signal extraction circuit 252 of the filter coefficient production circuit 244 extracts the signal within the interval including the GI of the main wave from within the pre-echo equalized signal in accordance with the position detected by the main wave position detection circuit 251. The signal extraction circuit 252 outputs the extracted signal to the variable coefficient FIR filter 253.

At step S32, the variable coefficient FIR filter 253 applies filtering to the signal supplied thereto from the signal extraction circuit 252 to produce a multi-path dummy signal. The variable coefficient FIR filter 253 outputs the multi-path dummy signal to the subtraction circuit 254.

At step S33, the subtraction circuit 254 subtracts the multi-path dummy signal from the pre-echo equalized signal to produce an error signal. The subtraction circuit 254 outputs the produced error signal to the delay circuit 255.

At step S34, the delay circuit 255 delays the error signal and outputs the delayed error signal to the coefficient updating circuit 256.

At step S35, the signal extraction circuit 257 extracts the signal within the interval which includes the copy source of the GI of the main wave from the pre-echo equalized signal in accordance with the position detected by the main wave position detection circuit 251. The signal extraction circuit 257 outputs the extracted signal as a reference signal to the coefficient updating circuit 256.

At step S36, the coefficient updating circuit 256 produces a post coefficient based on the error signal and the reference signal and outputs the produced post coefficient to the variable coefficient FIR filter 242 and the variable coefficient FIR filter 253.

At step S37, the variable coefficient FIR filter 242 applies filtering to the OFDM time domain signal supplied thereto from the subtraction circuit 243 using the post coefficient and outputs a resulting signal to the subtraction circuit 243.

At step S38, the subtraction circuit 243 subtracts the signal supplied thereto from the variable coefficient FIR filter 242 from the pre-echo equalized signal to remove a post-echo component from the pre-echo equalized signal. The subtraction circuit 243 outputs the resulting OFDM time domain signal. Thereafter, the processing returns to step S13 of FIG. 20 to thereafter carry out the processes at the succeeding steps.

By the processes described above, a coefficient for the adaptive equalization filter having high accuracy can be produced readily without estimating a delay profile and without using a known signal required by the LMS algorithm.

Further, by applying the coefficient to the adaptive equalization filter, multi-path components of an OFDM signal in the time domain can be removed stably and with a high degree of accuracy. Consequently, the reception performance can be improved.

It is to be noted that the circuitry described above is not limited to the configuration described above, but the configuration can be altered suitably. Here, several examples of a variation to the configuration are described.

First, a variation to the detection of the start position of the GI of the main wave is described.

While, in the example described above, a pre-echo equalized signal is used to detect the start position of the GI of the main wave, the signal to be used for detection of the position is not limited to the pre-echo equalized signal.

In particular, only if time adjustment is carried out taking delay time periods of the component circuits into consideration, the main wave position detection circuit 251 having the configuration described hereinabove with reference to FIG. 17 can detect the start position of the GI of the main wave from any OFDM time domain signal.

Also it is possible to use not an OFDM time domain signal but an OFDM frequency domain signal to detect the position.

Figure 6:
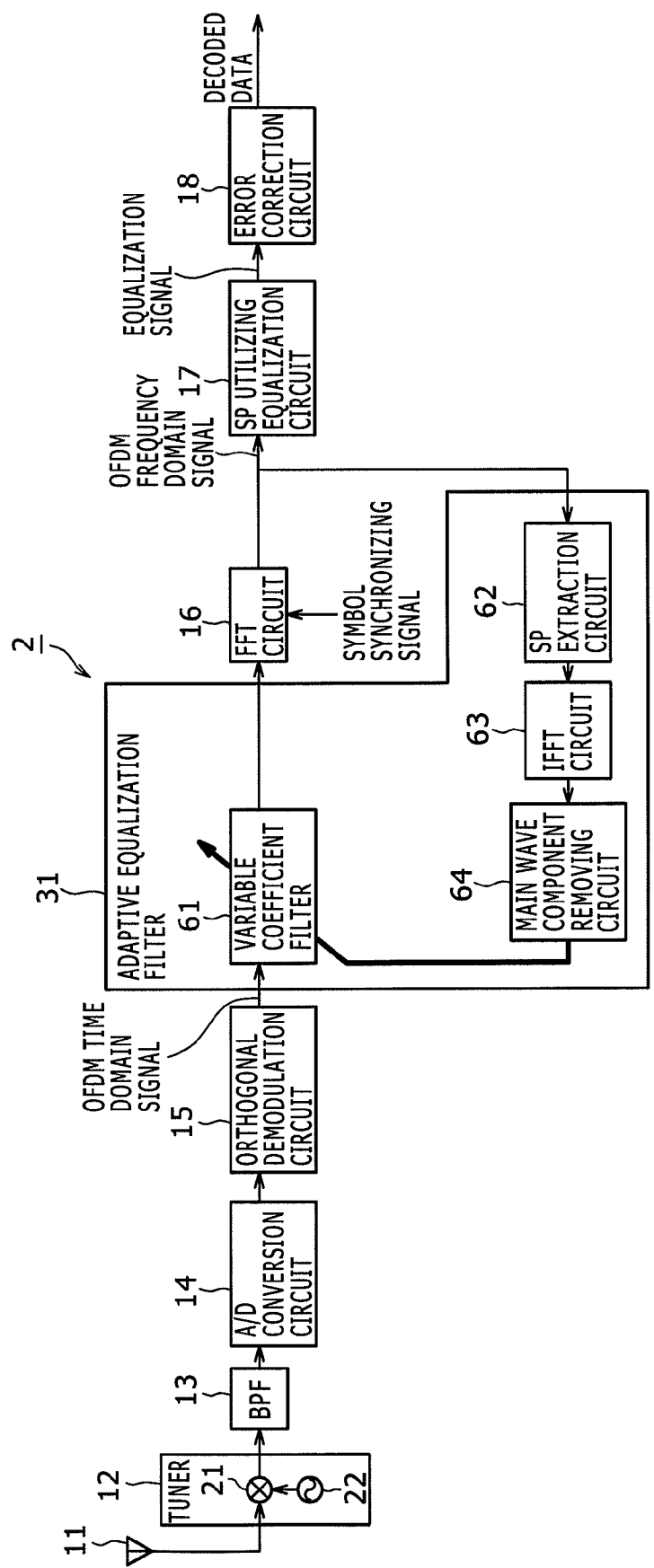
FIG. 6 is a block diagram showing an example of a configuration of an adaptive equalization filter.

In this instance, for example, as described hereinabove with reference to FIGS. 6 and 7, by removing a modulation component of an SP signal extracted from an OFDM frequency domain signal, a transmission line characteristic in the frequency domain is estimated. Further, by carrying out IFFT mathematic operation for the estimated main scanning line characteristic, an impulse response of the transmission line in the time domain is calculated, and detection of the start position of the GI of the main wave is carried out by searching for the position at which the impulse response is maximum.

Figure 23:
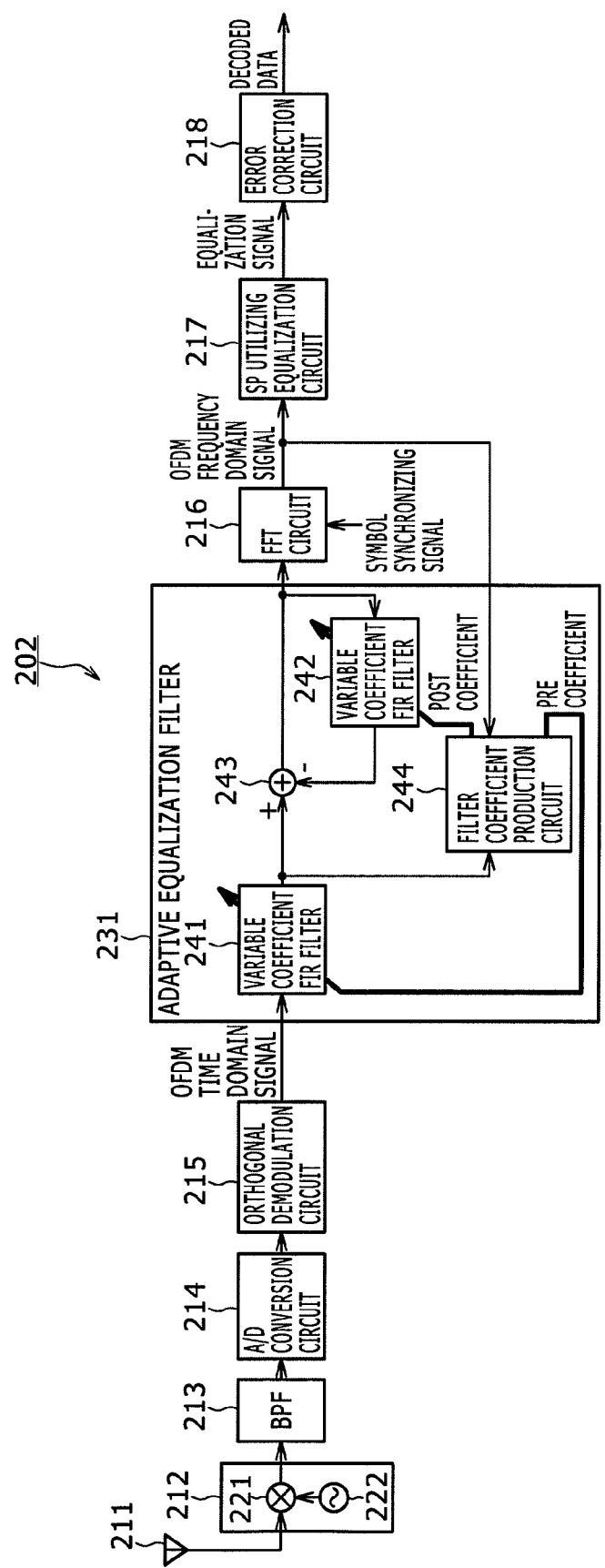
FIG. 23 is a block diagram showing an example of a configuration of another OFDM reception apparatus to which an embodiment of the present invention is applied.

A configuration of an OFDM reception apparatus 202 which uses an OFDM frequency domain signal to detect the start position of a GI of the main wave to produce a pre coefficient and a post coefficient is shown in FIG. 23. In the example of FIG. 23, an OFDM frequency domain signal obtained by FFT mathematic operation carried out by the FFT circuit 216 is inputted to the filter coefficient production circuit 244 of the adaptive equalization filter 231.

A variation to the extraction of a signal within an interval which includes the copy source of the GI and which is used as a reference signal for updating of a pre coefficient and a post coefficient is described.

In the foregoing, it is described that, upon updating of a pre coefficient, a signal within an interval which includes the copy source of a GI is extracted from an OFDM time domain signal before removal of pre-echoes is carried out and, upon updating of a post coefficient, a signal of the interval including the copy source of the GI is extracted from a pre-echo equalized signal. However, since this is intended to calculate a sample correlation value with GI components included in an error signal, a signal within an interval which includes the copy source of a GI may be extracted from a signal at any point of time only if it includes the copy source of the GI.

A variation to the production of a multi-path dummy signal to be used for updating of a post coefficient is described.

While, in the foregoing description, a value obtained by adding 0s to a signal within an interval which includes a GI of the main wave and which is extracted by the signal extraction circuit 252 is used as an input signal to the variable coefficient FIR filter 253, 0s need not necessarily be added, but the pre-echo equalized signal may be used as it is. Thereupon, since the noise term included in the sample coefficient value determined by the coefficient updating circuit 256 is great, a countermeasure against noise such as to reduce the step size μ to be multiplied to the sample correlation value is required.

Further, such production of a coefficient can be applied also to an adaptive equalization filter having another configuration such as, for example, a configuration wherein a coefficient updating section is incorporated in a loop of an equalization filter of the IIR type.

Figure 24:
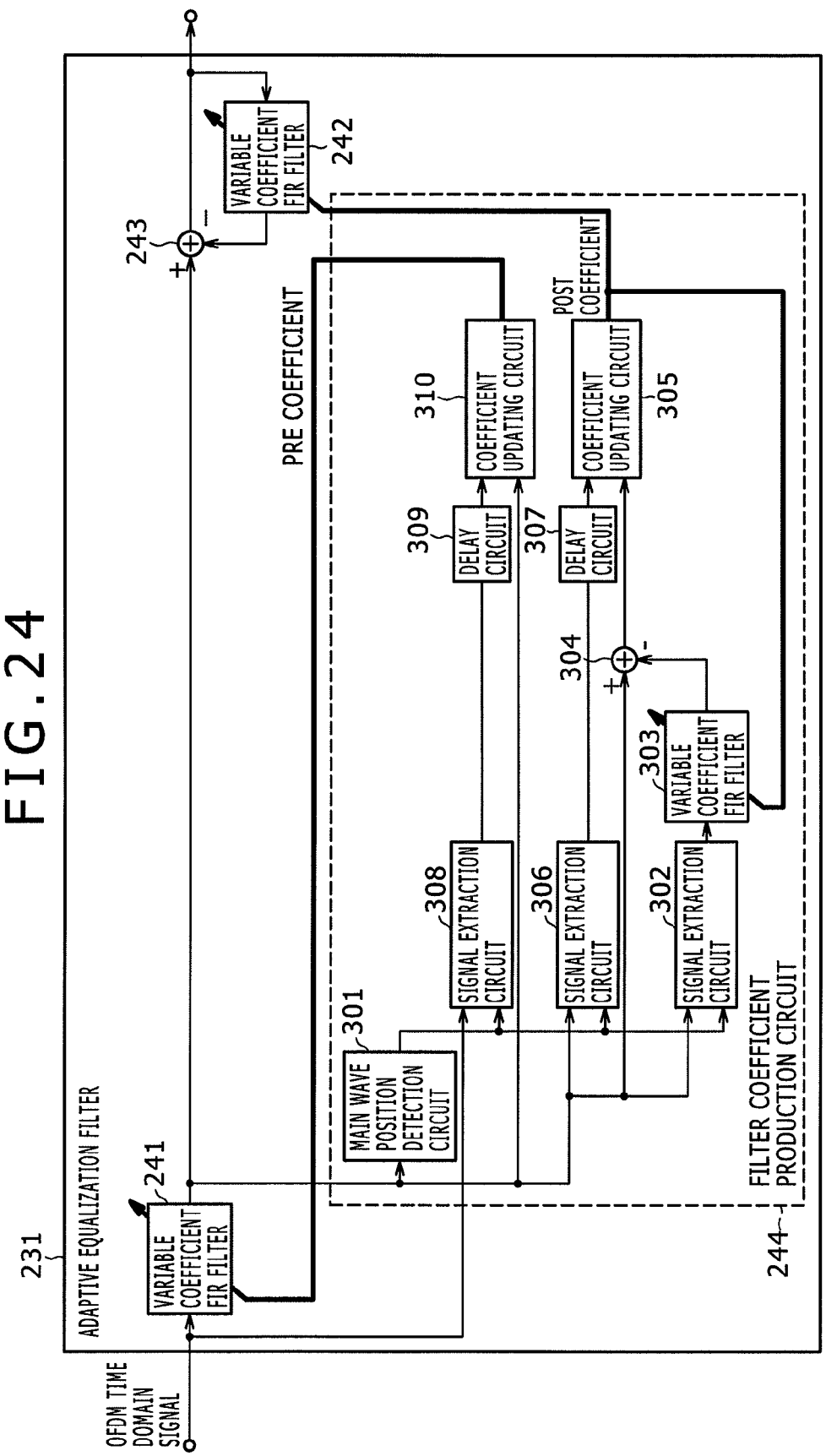
FIGS. 24 and 25 are block diagrams showing different examples of the configuration of the adaptive equalization filter.

FIG. 24 shows another example of a configuration of the adaptive equalization filter 231.

Referring to FIG. 24, the configuration of the filter coefficient production circuit 244 provided in the adaptive equalization filter 231 is different in the position of the delay circuit from the configuration of FIG. 10. In particular, while, in the example of FIG. 10, the delay circuit 255 and the delay circuit 258 are provided at a position at which an error signal is delayed, in the example of FIG. 24, a delay circuit 307 and another delay circuit 309 are provided at a position at which a reference signal is delayed.

In the example of FIG. 10, a signal within an interval which includes a GI of the main wave is utilized to produce an error signal and the signal within an interval which includes the copy source of the GI of the main wave is used as a reference signal to determine a sample correlation to carry out production of a coefficient. However, in the example of FIG. 24, a similar process is implemented by replacing the roles of signals used to determine a sample correlation value.

A main wave position detection circuit 301 detects a predetermined position of the main wave from a pre-echo equalized signal supplied thereto from the variable coefficient FIR filter 241 and outputs a signal representative of the detected position to signal extraction circuits 302, 306 and 308.

The signal extraction circuit 302 extracts a signal within an interval which includes the copy source of a GI of the main wave from the pre-echo equalized signal supplied thereto from the variable coefficient FIR filter 241 in accordance with the position detected by the main wave position detection circuit 301. The signal extraction circuit 302 outputs the extracted signal to a variable coefficient FIR filter 303.

The variable coefficient FIR filter 303 applies filtering to the signal supplied thereto from the signal extraction circuit 302 using a post coefficient set by a coefficient updating circuit 305. The variable coefficient FIR filter 303 outputs a resulting multi-path dummy signal to a subtraction circuit 304.

The subtraction circuit 304 subtracts the multi-path dummy signal from the pre-echo equalized signal to produce an error signal. The subtraction circuit 254 outputs the produced error signal to the coefficient updating circuit 305.

The coefficient updating circuit 305 produces a post coefficient based on the error signal supplied from the subtraction circuit 304 and the delayed reference signal supplied from the delay circuit 307, and outputs the produced post coefficient to the variable coefficient FIR filter 242 and the variable coefficient FIR filter 303. The coefficient updating circuit 305 has a configuration similar to that of the coefficient updating circuit 256 shown in FIG. 12.

The signal extraction circuit 306 extracts the signal within the interval which includes the GI of the main wave from the pre-echo equalized signal in accordance with the position detected by the main wave position detection circuit 301. The signal extraction circuit 306 outputs the extracted signal as a reference signal to the delay circuit 307.

The delay circuit 307 delays the reference signal supplied thereto from the signal extraction circuit 306 by a period of time corresponding to a distance smaller by one sample distance than the effective symbol length with reference to the position later by one sample distance from the start position of the OFDM symbol of the main wave. Then, the delay circuit 307 outputs the delay reference signal to the coefficient updating circuit 305.

The signal extraction circuit 308 extracts the signal within the interval which includes the GI of the main wave from the OFDM time domain signal supplied thereto from the orthogonal demodulation circuit 215 in accordance with the position detected by the main wave position detection circuit 301. The signal extraction circuit 308 outputs the extracted signal as a reference signal to the delay circuit 309.

The delay circuit 309 delays the reference signal supplied thereto from the signal extraction circuit 308 and outputs the delayed reference signal to a coefficient updating circuit 310.

The coefficient updating circuit 310 regards the signal within a predetermined interval including the copy source of the GI from within the pre-echo equalized signal supplied thereto from the variable coefficient FIR filter 241 as an error signal and produces a pre coefficient based on the error signal and the reference signal supplied from the delay circuit 309. The coefficient updating circuit 310 outputs the produced pre coefficient to the variable coefficient FIR filter 241.

It is possible to implement also the adaptive equalization filter 231 having such a configuration as described above in a form having such a variation as described above.

Figure 25:
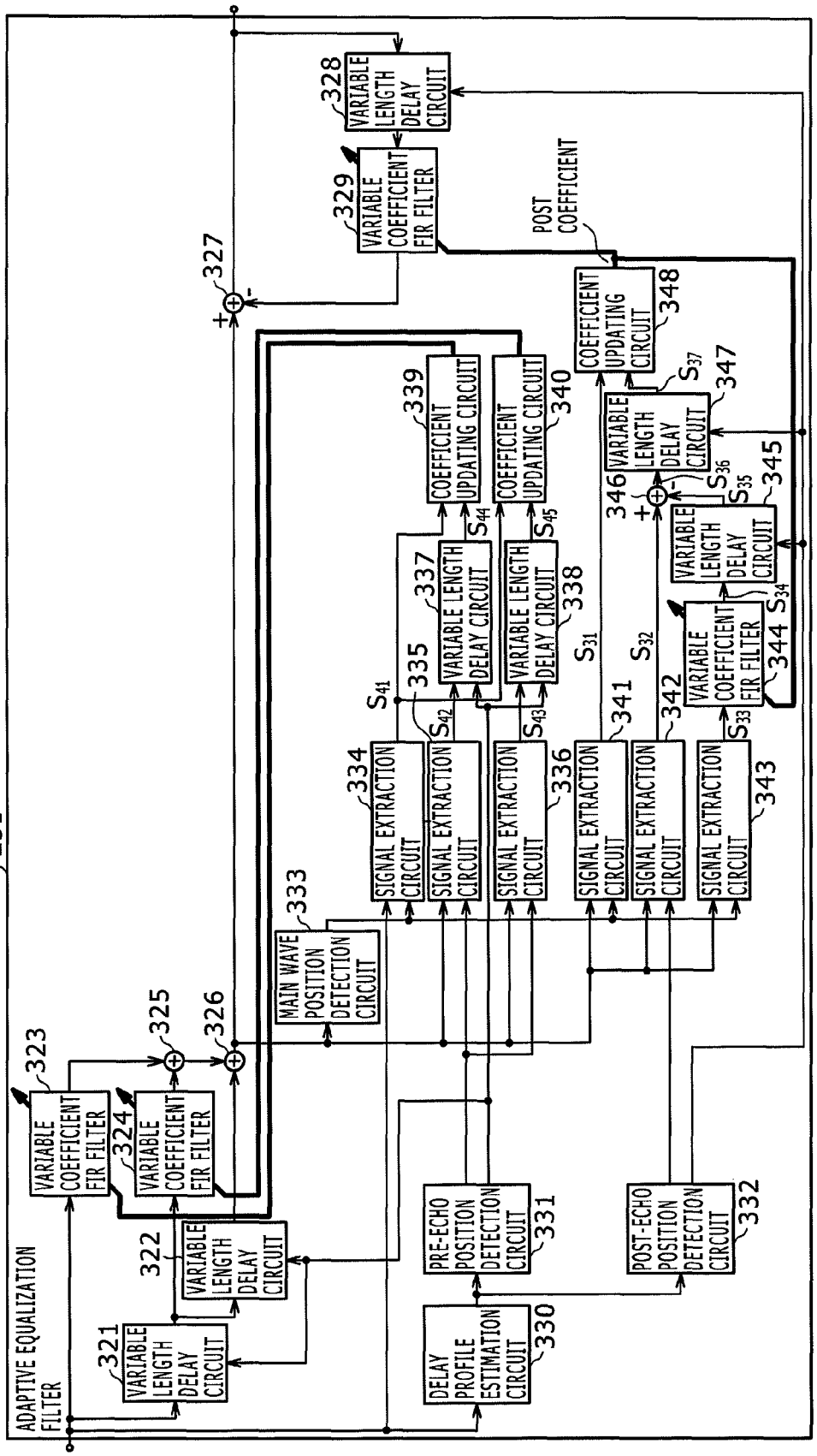

FIG. 25 shows a further example of a configuration of the adaptive equalization filter 231.

Usually, if it is tried to implement demodulation of an OFDM signal using an adaptive equalization filter, then a very great number of taps are required. If it is tried to cope with a multi-path having such a delay time period as exceeds the GI, then the number of taps further increases.

Since, in the variable coefficient FIR filter of the adaptive equalization filter 231 shown in FIG. 10 and so forth, the coefficient of any tap which does not have a multi-path is 0, under certain circumstances, almost all of a great number of taps exhibit an output of zero and may be wasteful. The adaptive equalization filter 231 of FIG. 25 can eliminate such wasteful taps.

It is to be noted that the configuration shown in FIG. 25 is intended to remove a post-echo wave by means of one variable coefficient FIR filter and remove or suppress a pre-echo wave by means of two variable coefficient FIR filters. The number of necessary circuits increases in accordance with the number of estimated multi-paths.

The adaptive equalization filter 231 of FIG. 25 includes a configuration for removing a pre-echo, another configuration for removing a post echo, and a further configuration for producing a coefficient.

The configuration for removing a post echo includes variable length delay circuits 321 and 322, variable coefficient FIR filters 323 and 324, and addition circuits 325 and 326.

The configuration for removing a pre-echo includes a subtraction circuit 327, a variable length delay circuit 328, and a variable coefficient FIR filter 329.

The configuration for producing a coefficient includes a delay profile estimation circuit 330, a pre-echo position detection circuit 331, a post-echo position detection circuit 332, a main wave position detection circuit 333, signal extraction circuits 334, 335 and 336, variable length delay circuits 337 and 338, and coefficient updating circuits 339 and 340.

The configuration for producing a coefficient further includes signal extraction circuits 341, 342 and 343, a variable coefficient FIR filter 344, a variable length delay circuit 345, a subtraction circuit 346, a variable length delay circuit 347 and a coefficient updating circuit 348.

Of the configuration for producing a coefficient, the delay profile estimation circuit 330 estimates a delay profile using the OFDM time domain signal supplied thereto from the orthogonal demodulation circuit 215. As the profile estimation method which uses an OFDM time domain signal, for example, a matched filter which utilizes a GI is known. The delay profile estimation circuit 330 outputs the estimated delay profile to the pre-echo position detection circuit 331 and the post-echo position detection circuit 332.

The pre-echo position detection circuit 331 detects a pre-echo from the delay profile estimated by the delay profile estimation circuit 330 to calculate a predetermined position to be used as a reference such as the start position of a GI and a delay time period of the pre-echo.

The pre-echo position detection circuit 331 outputs the position of the pre-echo to the signal extraction circuits 335 and 336. Further, the pre-echo position detection circuit 331 outputs the delay time period of the pre-echo to the variable length delay circuits 337 and 338 and the variable length delay circuits 321 and 322.

The post-echo position detection circuit 332 detects a post echo from the delay profile estimated by the delay profile estimation circuit 330 to calculate a predetermined position to be used as a reference for the post echo such as the start position of a GI and the delay time period of the post echo.

The post-echo position detection circuit 332 outputs the position of the post echo to the signal extraction circuit 342. Further, the post-echo position detection circuit 332 outputs the delay time period of the post echo to the variable length delay circuits 345, 347 and 328.

In this manner, the adaptive equalization filter 231 of FIG. 25 estimates a delay profile and calculates the position and the delay time regarding each of a pre-echo and a post echo.

The main wave position detection circuit 333 detects a predetermined position of the main wave from the pre-echo equalized signal supplied thereto from the addition circuit 326. The main wave position detection circuit 333 has a configuration, for example, similar to that shown in FIG. 17. The main wave position detection circuit 333 outputs a signal representative of the detected position to the signal extraction circuits 334, 341 and 343.

Figure 26:
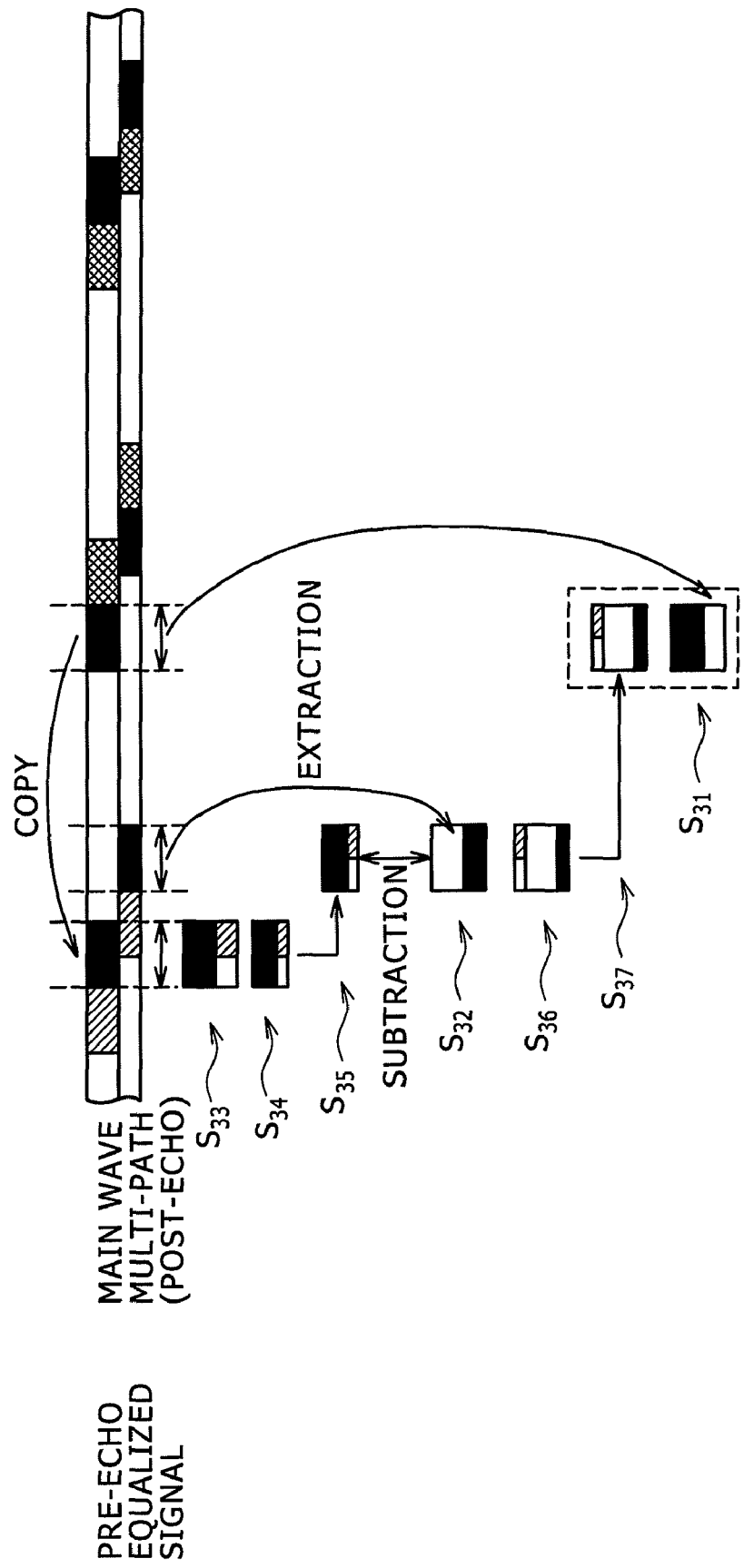
FIG. 26 is a diagrammatic view illustrating an example of a signal used for production of a post coefficient.

The configuration for production of a post coefficient is described suitably with reference to FIG. 26.

The signal extraction circuit 341 extracts a signal within an interval which includes the copy source of a GI of the main wave from the pre-echo equalized signal supplied thereto from the addition circuit 326 in accordance with the position detected by the main wave position detection circuit 333. The signal extraction circuit 341 outputs the extracted signal as a reference signal to the coefficient updating circuit 348.

The signal $S_{31}$ shown at the lowermost stage in FIG. 26 is the reference signal outputted from the signal extraction circuit 341.

The signal extraction circuit 342 extracts the signal within the interval which includes the GI of the post echo from the pre-echo equalized signal supplied thereto from the addition circuit 326 in accordance with the position of the post echo detected by the post-echo position detection circuit 332. The signal extraction circuit 342 outputs the detected signal to the subtraction circuit 346.

The signal $S_{32}$ shown at the fifth stage from above in FIG. 26 is the signal within the interval which includes the GI of the post echo outputted from the signal extraction circuit 342.

The signal extraction circuit 343 extracts the signal within the interval which includes the GI of the main wave from the pre-echo equalized signal supplied thereto from the addition circuit 326 and outputs the extracted signal to the variable coefficient FIR filter 344.

The signal $S_{33}$ indicated at the second stage from above in FIG. 26 is the signal within the interval which includes the GI of the main wave and which is outputted from the signal extraction circuit 343.

The variable coefficient FIR filter 344 uses the post coefficient set by the coefficient updating circuit 348 to apply filtering to the signal supplied thereto from the signal extraction circuit 343.

While the variable coefficient FIR filter 253 shown in FIG. 10 has a number of taps corresponding to an estimated maximum delay time period, the variable coefficient FIR filter 344 has only a sufficiently smaller number of taps. For example, while the variable coefficient FIR filter 253 shown in FIG. 10 has several thousands taps, the number of taps of the variable coefficient FIR filter 344 ranges from several to several tens.

The variable coefficient FIR filter 344 outputs a multi-path dummy signal obtained by the application of the filtering to the variable length delay circuit 345.

The signal $S_{34}$ shown at the third stage from above in FIG. 26 is the multi-path dummy signal outputted from the variable coefficient FIR filter 344. In the example of FIG. 26, the number of taps of the variable coefficient FIR filter 344 is 1.

The variable length delay circuit 345 delays the multi-path dummy signal supplied thereto from the variable coefficient FIR filter 344 in accordance with the delay time period calculated by the post-echo position detection circuit 332 until the signal within the interval which includes the GI of the post echo is outputted from the signal extraction circuit 342 to the subtraction circuit 346. The variable length delay circuit 345 outputs the delayed multi-path dummy signal to the subtraction circuit 346.

The signal $S_{35}$ shown at the fourth stage from above in FIG. 26 is the delayed multi-path dummy signal outputted from the variable length delay circuit 345.

The subtraction circuit 346 subtracts the multi-path dummy signal supplied from the variable length delay circuit 345 from the signal supplied from the signal extraction circuit 342 to produce an error signal. The subtraction circuit 346 outputs the produced error signal to the variable length delay circuit 347.

The signal $S_{36}$ shown at the sixth stage from above in FIG. 26 is the error signal outputted from the subtraction circuit 346.

The variable length delay circuit 347 delays the error signal supplied thereto from the subtraction circuit 346 such that the start point of the reference signal and the start point of the error signal coincide with each other based on the delay time calculated by the post-echo position detection circuit 332. The variable length delay circuit 347 outputs the delayed error signal to the coefficient updating circuit 348.

The signal $S_{37}$ shown at the seventh stage from above in FIG. 26 is the error signal outputted from the variable length delay circuit 347.

The coefficient updating circuit 348 has a configuration similar to that of the coefficient updating circuit 256 shown in FIG. 12 except that it does not include the selector 271. In particular, in the configuration shown in FIG. 25, since the delay time by the variable coefficient FIR filter 344 is sufficiently longer than the GI length, the selector 271 shown in FIG. 12 is not required any more.

The coefficient updating circuit 348 produces a post coefficient using the reference signal supplied thereto from the signal extraction circuit 341 and the error signal supplied thereto from the variable length delay circuit 347 and outputs the produced post coefficient to the variable coefficient FIR filter 329 and the variable coefficient FIR filter 344.

The configuration for removal of a post echo is described below.

The subtraction circuit 327 subtracts a signal for post-echo removal supplied thereto from the variable coefficient FIR filter 329 from the pre-echo equalized signal supplied from the addition circuit 326 to remove post-echo components included in the pre-echo equalized signal. The subtraction circuit 327 outputs a resulting signal to the outside of the adaptive equalization filter 231 and also to the variable length delay circuit 328.

The variable length delay circuit 328 delays the signal supplied thereto from the subtraction circuit 327 by the delay time period calculated by the post-echo position detection circuit 332 and outputs the delayed signal to the variable coefficient FIR filter 329.

The variable coefficient FIR filter 329 uses the post coefficient produced by the coefficient updating circuit 348 to apply filtering to the signal supplied from the variable length delay circuit 328. The variable coefficient FIR filter 329 outputs a resulting signal for post-echo removal to the subtraction circuit 327.

By estimating a delay profile, detecting the position of a post echo based on the delay profile and carrying out processing while focusing only on the detected position of the post echo, the number of taps of the variable coefficient FIR filter can be reduced and simultaneously the scale of the coefficient updating circuit can be reduced.

Figure 27:
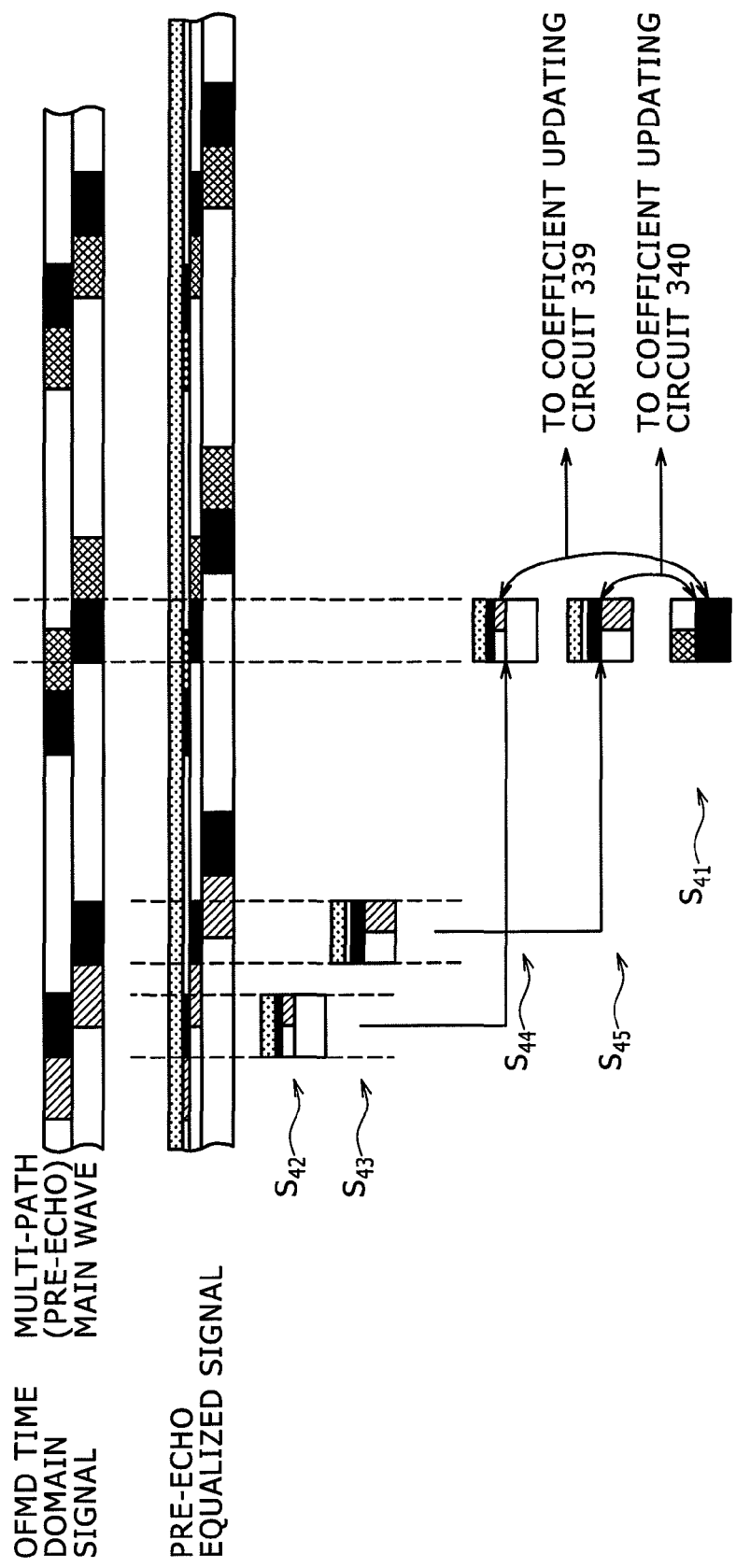
FIG. 27 is a similar view but illustrating an example of a signal used for production of a pre coefficient.

Now, a configuration relating to a pre-echo is described suitably with reference to FIG. 27.

The signal extraction circuit 334 extracts a signal within an interval which includes the copy source of a GI of the main wave from an OFDM time domain signal before pre-echo components are removed therefrom in accordance with the position detected by the main wave position detection circuit 333 similarly to the signal extraction circuit 260 shown in FIG. 10. The signal extraction circuit 334 outputs the extracted signal as a reference signal to the coefficient updating circuits 339 and 340.

The signal $S_{41}$ shown at the lowermost stage in FIG. 27 is the reference signal outputted from the signal extraction circuit 334.

The signal extraction circuit 335 extracts the signal within the interval which includes the GI of the pre-echo from the pre-echo equalized signal supplied thereto from the addition circuit 326 in accordance with the position detected by the pre-echo position detection circuit 331. The signal extraction circuit 335 outputs the extracted signal as an error signal to the variable length delay circuit 337.

The signal $S_{42}$ shown at the third stage from above in FIG. 27 is the error signal outputted from the signal extraction circuit 335.

The signal extraction circuit 336 extracts a signal within the interval which includes the GI of the pre-echo component having a period of time equal to twice the actual delay time as a delay time period from the pre-echo equalized signal supplied from the addition circuit 326 in accordance with the position detected by the pre-echo position detection circuit 331. The signal extraction circuit 336 outputs the extracted signal as an error signal to the variable length delay circuit 338.

The signal $S_{43}$ shown at the fourth stage from above in FIG. 27 is the error signal outputted from the signal extraction circuit 336.

The variable length delay circuit 337 delays the error signal supplied thereto from the signal extraction circuit 335 such that the start point of the error signal becomes the same time point as the start point of the reference signal outputted from the signal extraction circuit 334 in accordance with the delay time calculated by the pre-echo position detection circuit 331. The variable length delay circuit 337 outputs the delayed error signal to the coefficient updating circuit 339.

The signal $S_{44}$ shown at the fifth stage from above in FIG. 27 is the error signal outputted from the variable length delay circuit 337. The error signal $S_{44}$ is inputted to the coefficient updating circuit 339 together with the reference signal $S_{41}$.

The variable length delay circuit 338 delays the error signal supplied thereto from the signal extraction circuit 336 such that the start point of the error signal becomes the same time point as the start point of the reference signal outputted from the signal extraction circuit 334 in accordance with the delay time calculated by the pre-echo position detection circuit 331. The variable length delay circuit 338 outputs the delayed error signal to the coefficient updating circuit 340.

The signal $S_{45}$ shown at the sixth stage from above in FIG. 27 is the error signal outputted from the variable length delay circuit 338. The error signal $S_{45}$ is inputted to the coefficient updating circuit 340 together with the reference signal $S_{41}$.

The coefficient updating circuit 339 has a configuration similar to that of the coefficient updating circuit 256 shown in FIG. 12. The coefficient updating circuit 339 produces a pre coefficient based on the reference signal supplied from the signal extraction circuit 334 and the error signal supplied from the variable length delay circuit 337. The coefficient updating circuit 339 outputs the produced pre coefficient to the variable coefficient FIR filter 323.

Also the coefficient updating circuit 340 has a configuration similar to that of the coefficient updating circuit 256 shown in FIG. 12. The coefficient updating circuit 340 produces a pre coefficient based on the reference signal supplied from the signal extraction circuit 334 and the error signal supplied from the variable length delay circuit 338. The coefficient updating circuit 340 outputs the produced pre coefficient to the variable coefficient FIR filter 324.

In this manner, while, where pre-echoes are removed using the configuration shown in FIG. 10, a number of taps corresponding to a period of time equal to constant multiples of an estimated maximum delay time period are required, where the configuration shown in FIG. 25 is used to remove a pre-echo, the number of taps can be reduced drastically similarly as in the case of post-echoes.

A configuration for removing or suppressing pre-echoes is described.

The variable length delay circuit 321 delays the OFDM time domain signal supplied from the orthogonal demodulation circuit 215 by the delay time calculated by the pre-echo position detection circuit 331 and outputs the delayed OFDM time domain signal to the variable length delay circuit 322 and the variable coefficient FIR filter 324.

The variable length delay circuit 322 further delays the OFDM time domain signal supplied from the variable length delay circuit 321 by the delay time calculated by the pre-echo position detection circuit 331 and outputs the delayed OFDM time domain signal to the addition circuit 326.

The variable coefficient FIR filter 323 applies filtering to the OFDM time domain signal supplied thereto from the orthogonal demodulation circuit 215 using the pre coefficient produced by the coefficient updating circuit 339. The variable length delay circuit 322 outputs a resulting signal to the addition circuit 325.

The variable coefficient FIR filter 324 applies filtering to the OFDM time domain signal supplied thereto from the variable length delay circuit 321 using the pre coefficient produced by the coefficient updating circuit 340. The variable coefficient FIR filter 324 outputs a resulting signal to the addition circuit 325.

The addition circuit 325 adds the signal supplied from the variable coefficient FIR filter 323 and the signal supplied from the variable coefficient FIR filter 324 to remove the remaining part of or suppress the pre-echo and outputs a resulting signal to the addition circuit 326.

The addition circuit 326 adds the signal supplied from the variable length delay circuit 322 and the signal supplied from the addition circuit 325 to remove the remaining part of or suppress the pre-echo and outputs a resulting signal as a pre-echo equalized signal to the addition circuit 326.

By estimating a delay profile, detecting only the position at which a multi-path component exists and the delay time of the multi-path component from an estimated value of the delay profile and configuring a variable coefficient filter which is focused at an object position as described above, the mathematic operation amount and the circuit scale can be reduced.

As described above, the configuration of the adaptive equalization filter 231 shown in FIG. 25 is intended to remove interference of one wave of a pre-echo and one wave of a post-echo. Depending upon the environment, one of the pre-echo and the post-echo may have two or more waves or both of the pre-echo and the post-echo may have two or more waves. In such instances, it is necessary to restrict a multi-push to be determined as an object of removal of interference.

In other words, it is necessary to select the interference of which one of multi-paths should be removed. In order to carry out interference removal efficiently, preferably a multi-path which exhibits high interference is selected so as to remove the component of the same.

Figure 28:
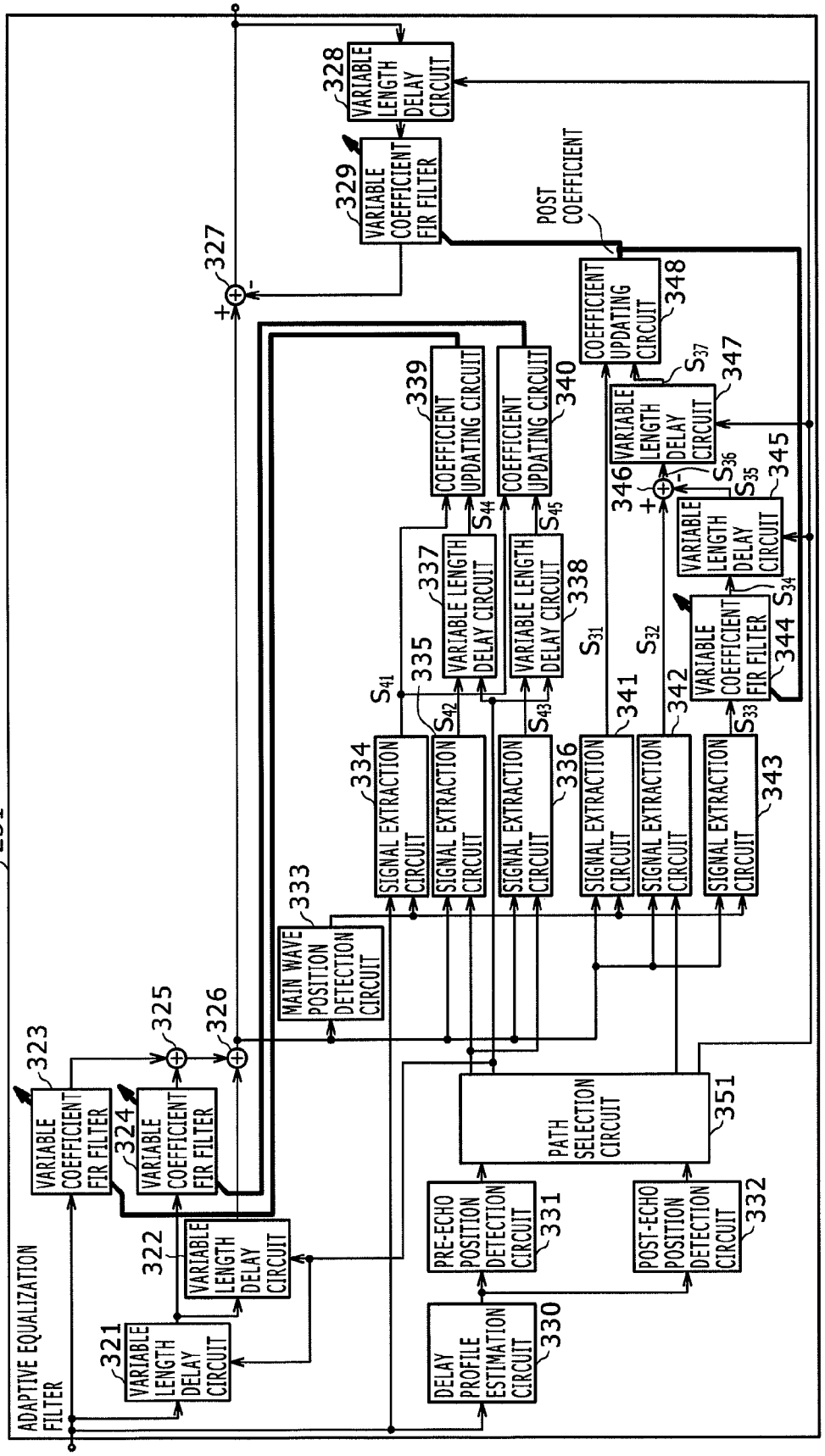
FIG. 28 is a diagrammatic view showing a further different adaptive equalization filter.

FIG. 28 shows an example of a configuration of the adaptive equalization filter 231.

The configuration of the adaptive equalization filter 231 shown in FIG. 28 is a modification to but is different from the configuration of the adaptive equalization filter 231 shown in FIG. 28 in that it additionally includes a path selection circuit 351 provided on the output side of the pre-echo position detection circuit 331 and the post-echo position detection circuit 332.

In the adaptive equalization filter 231 of FIG. 28, where a number of multi-paths greater than the estimated number of multi-paths (one wave of a pre-echo and one wave of a post-echo) exist, that one of the multi-paths which is to be determined as an object of removal of interference is selected, and a coefficient is produced so that interference of the selected multi-path is removed.

A configuration for producing a coefficient is described.

The delay profile estimation circuit 330 estimates a delay profile using the OFDM time domain signal supplied thereto from the orthogonal demodulation circuit 215 and outputs the estimated delay profile to the pre-echo position detection circuit 331 and the post-echo position detection circuit 332.

The pre-echo position detection circuit 331 detects pre-echoes based on the delay profile estimated by the delay profile estimation circuit 330 to calculate the power of the pre-echoes in addition to a predetermined position to be used as a reference for the pre-echoes such as the start position of the GI and the delay time period of the pre-echoes. The pre-echo position detection circuit 331 outputs the positions, delay time periods and powers of the pre-echoes to the path selection circuit 351.

The post-echo position detection circuit 332 detects post-echoes based on the delay profile estimated by the delay profile estimation circuit 330 to calculate the power of the post-echoes in addition to a predetermined position to be used as a reference for the post-echoes such as the start position of the GI and the delay time period of the post-echoes. The post-echo position detection circuit 332 outputs the positions, delay time periods and powers of the post-echoes to the path selection circuit 351.

The path selection circuit 351 selects a pre-echo to be determined as an object of removal of interference based on the positions, delay time periods and powers of the pre-echoes supplied thereto from the pre-echo position detection circuit 331. The path selection circuit 351 outputs the position of the pre-echo selected as an object of removal of interference to the signal extraction circuits 335 and 336, and outputs the delay time of the pre-echo to the variable length delay circuits 331, 332, 337 and 338.

The path selection circuit 351 selects a post-echo to be determined as an object of removal of interference based on the positions, delay time periods and powers of the post-echoes supplied thereto from the post-echo position detection circuit 332. The path selection circuit 351 outputs the position of the post-echo selected as an object of removal of interference to the signal extraction circuit 342 and outputs the delay time to the variable length delay circuits 328, 345 and 347. The selection of a multi path by the path selection circuit 351 is hereinafter described.

The other part of the configuration for producing a coefficient shown in FIG. 28 is basically similar to that described hereinabove.

In particular, the main wave position detection circuit 333 detects the position of the main wave from the pre-echo equalized signal supplied thereto from the addition circuit 326 and outputs a signal representative of the detected position to the signal extraction circuits 334, 341 and 343.

The signal extraction circuit 341 from among the components for carrying out processes relating to an echo extracts an interval which includes the copy source of the GI of the main wave from the pre-echo equalized signal. The signal extraction circuit 341 outputs the extracted signal as a reference signal (signal $S_{31}$ shown in FIG. 26) to the coefficient updating circuit 348.

The signal extraction circuit 342 extracts the signal within the interval which includes the GI of the post-echo from the pre-echo equalized signal in accordance with the position of the post-echo supplied from the path selection circuit 351. The signal extraction circuit 342 outputs the extracted signal (signal $S_{32}$ shown in FIG. 26) to the subtraction circuit 346.

The signal extraction circuit 343 extracts the signal (signal $S_{33}$ shown in FIG. 26) within the period which includes the GI of the main wave from the pre-echo equalized signal and outputs the extracted signal to the variable coefficient FIR filter 344.

The variable coefficient FIR filter 344 applies filtering to the signal supplied from the signal extraction circuit 343 using the post coefficient set by the coefficient updating circuit 348 and outputs a multi-path dummy signal (signal $S_{34}$ of FIG. 26) to the variable length delay circuit 345.

The variable length delay circuit 345 delays the multi-path dummy signal supplied from the variable coefficient FIR filter 344 in accordance with the delay time supplied thereto from the path selection circuit 351 until the signal within the period which includes the GI of the post-echo is outputted from the signal extraction circuit 342 to the subtraction circuit 346. The variable length delay circuit 345 outputs the delayed multi-path dummy signal (signal $S_{35}$ of FIG. 26) to the subtraction circuit 346.

The subtraction circuit 346 subtracts the multi-path dummy signal supplied thereto from the variable length delay circuit 345 from the signal supplied thereto from the signal extraction circuit 342 to produce an error signal (signal $S_{36}$ of FIG. 26) and outputs the error signal to the variable length delay circuit 347.

The variable length delay circuit 347 delays the error signal supplied thereto from the subtraction circuit 346 so that the start of the reference signal and the start point of the error signal may be the same time in accordance with the delay time supplied from the path selection circuit 351. The variable length delay circuit 347 outputs the delayed error signal (signal $S_{37}$ of FIG. 26) to the coefficient updating circuit 348.

The coefficient updating circuit 348 produces a post coefficient using the reference signal supplied from the signal extraction circuit 341 and the error signal supplied from the variable length delay circuit 347 and outputs the produced post coefficient to the variable coefficient FIR filters 329 and 344.

The signal extraction circuit 334 from among the components which carry out processes relating to a pre-echo extracts a signal within the interval which includes the copy source of the GI of the main wave from the OFDM time domain signal before a pre-echo component is removed in accordance with the position of the main wave detected by the main wave position detection circuit 333. The signal extraction circuit 334 outputs the extracted signal as a reference signal (signal $S_{41}$ of FIG. 27) to the coefficient updating circuits 339 and 340.

The signal extraction circuit 335 extracts the signal within the period which includes the GI of the pre-echo from the pre-echo equalized signal in accordance with the position of the pre-echo supplied thereto from the path selection circuit 351. The signal extraction circuit 335 outputs the extracted signal as an error signal (signal $S_{42}$ of FIG. 27) to the variable length delay circuit 337.

The signal extraction circuit 336 extracts the signal within the interval which includes the GI of the pre-echo component having a period of time equal to twice the actual delay time period as a delay time period from the pre-echo equalized signal in accordance with the position of the pre-echo supplied from the path selection circuit 351. The signal extraction circuit 336 outputs the extracted signal as an error signal (signal $S_{43}$ of FIG. 27) to the variable length delay circuit 338.

The variable length delay circuit 337 delays the error signal supplied from the signal extraction circuit 335 so that the start point of the error signal becomes the same time as the start point of the reference signal outputted from the signal extraction circuit 334 in accordance with the delay time of the pre-echo supplied from the path selection circuit 351. The variable length delay circuit 337 outputs the delayed error signal (signal $S_{44}$ of FIG. 27) to the coefficient updating circuit 339.

The variable length delay circuit 338 delays the error signal supplied from the signal extraction circuit 336 so that the start point of the error signal becomes the same time as the start point of the reference signal outputted from the signal extraction circuit 334 in accordance with the delay time of the pre-echo supplied from the path selection circuit 351. The variable length delay circuit 337 outputs the delayed error signal (signal $S_{45}$ of FIG. 27) to the coefficient updating circuit 340.

The coefficient updating circuit 339 produces a pre coefficient based on the reference signal supplied from the signal extraction circuit 334 and the error signal supplied from the variable length delay circuit 337 and outputs the pre coefficient to the variable coefficient FIR filter 323.

The coefficient updating circuit 340 produces a pre coefficient based on the reference signal supplied from the signal extraction circuit 334 and the error signal supplied from the variable length delay circuit 338 and outputs the pre coefficient to the variable coefficient FIR filter 324.

Here, selection of a multi-path to be used as an object of interference removal is described.

As described hereinabove, information of the positions, delay time periods and powers of the pre-echoes is supplied from the pre-echo position detection circuit 331 to the path selection circuit 351. Meanwhile, information of the positions, delay time periods and powers of the post-echoes is supplied from the post-echo position detection circuit 332 to the path selection circuit 351.

The path selection circuit 351 estimates an inter-symbol interference amount estimated to remain after FFT mathematic operation when interference removal is not carried out for each pre-echo based on the position, delay time period and power of the pre-echo.

Further, for each post-echo, an inter-symbol interference amount estimated to remain after FFT mathematic operation where interference removal is not carried out is estimated based on the position, delay time period and power of the post-echo. Further, a post-echo to be determined as an object of interference is selected with reference to the interference amount.

The interference amount of each multi-path (pre-echo, post-echo) with the main wave is represented by the following expression:

(interference amount of each multi-path)=(interval of preceding and succeeding symbols which enter FFT interval)×(power)

The interval of the preceding and the succeeding symbols which enter the FFT interval is specified from the position and the delay time of the multi-paths.

Figure 29:
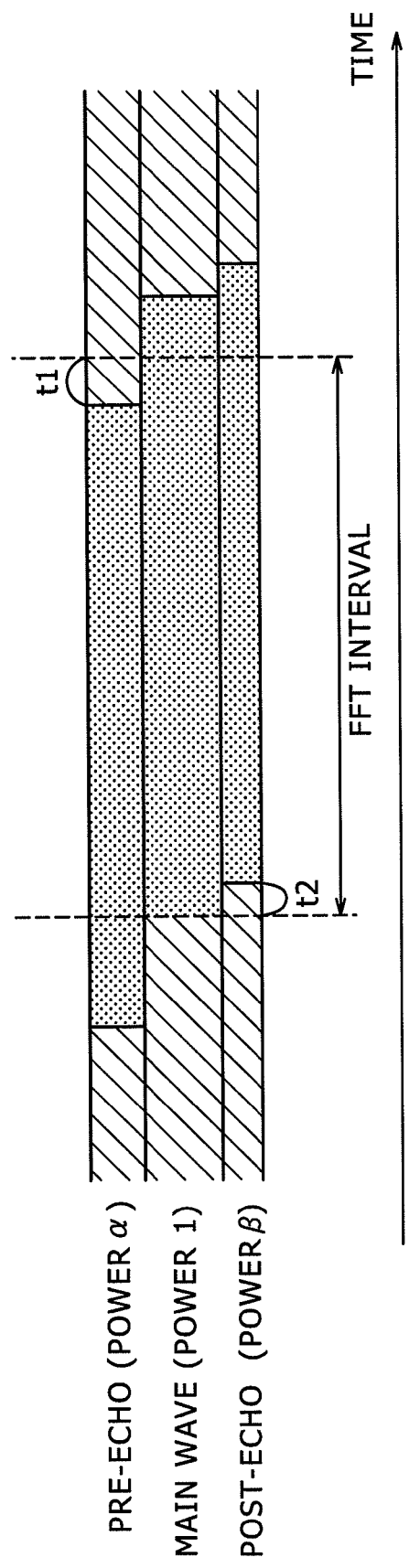
FIG. 29 is a diagrammatic view illustrating a particular example of an interference amount.

FIG. 29 illustrates a particular example of an interference amount.

The horizontal direction of FIG. 29 indicates the time direction. The zones represent, in order from above, the pre-echo, main wave and post-echo, and the width of each zone represents the power of each path. The power of the main wave is represented by 1 and the power of the pre-echo is represented by a while the power of the post-echo is represented by β.

The same symbol transmitted by different paths is represented by the same pattern applied thereto. Where the symbol indicated by dots is determined as an object of decoding and an FFT interval is set to such an interval as shown in FIG. 29 for an object of decoding, part of a symbol succeeding to a symbol transmitted by the pre-echo enters the symbol transmitted by the pre-echo by an amount corresponding to a time period t1. Part of a further symbol which precedes to the symbol which is transmitted by the post-echo enters the symbol transmitted by the post-echo by an amount corresponding to a time period t2.

The magnitude of the interference amount of the pre-echo is represented by t1×α, and the magnitude of the post-echo is represented by t2×β.

In the case of the configuration of FIG. 28 which removes interference of one wave of a pre-echo and one wave of a post-echo, the path selection circuit 351 selects one wave for each of a pre-echo and a post-echo to be determined as an object of removal of interference with reference to the interference amounts calculated in such a manner as described above.

Figure 30:
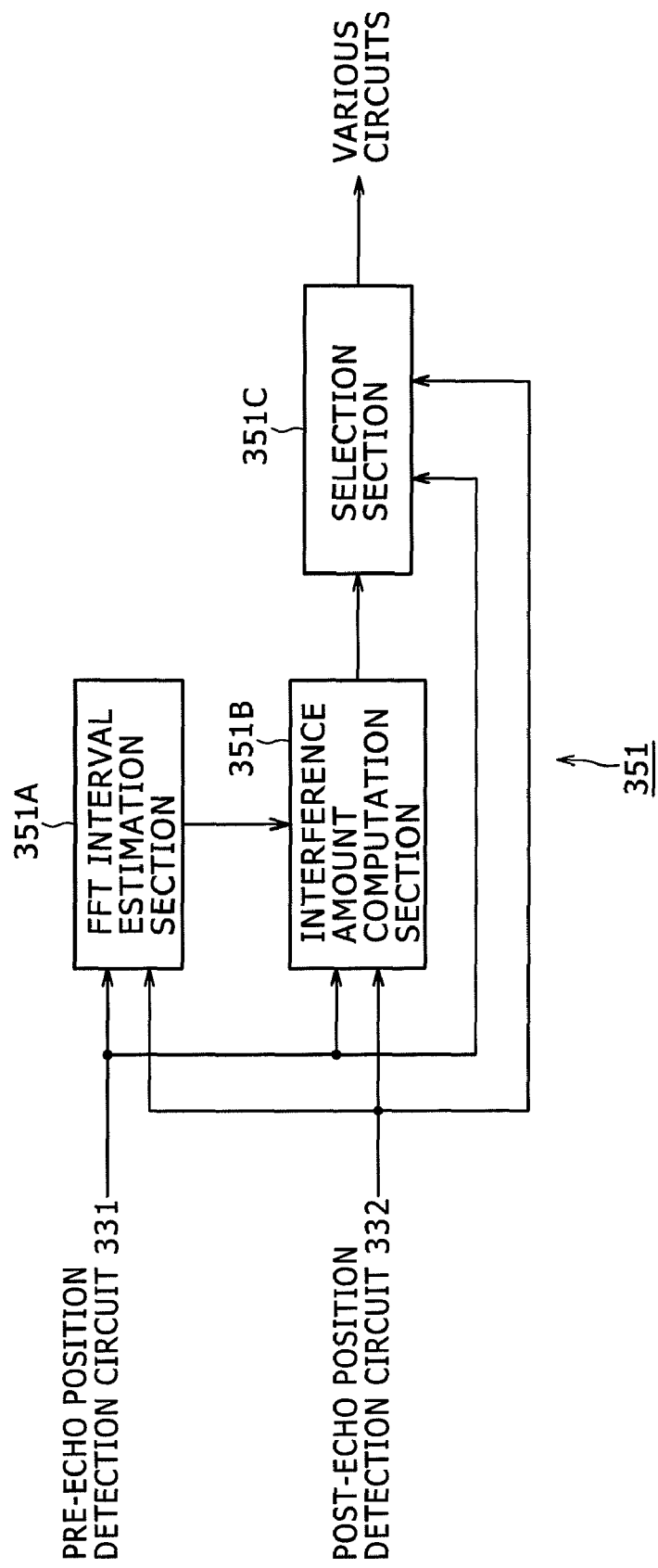
FIG. 30 is a block diagram showing an example of a configuration of a path selection circuit shown in FIG. 28.

FIG. 30 shows an example of a configuration of the path selection circuit 351.

Referring to FIG. 30, the path selection circuit 351 includes an FFT interval estimation section 351A, an interference amount computation section 351B and a selection section 351C. The information of the position, delay time period and power of each pre-echo outputted from the pre-echo position detection circuit 331 and information of the position, delay time period and power of each post-echo outputted from the post-echo position detection circuit 332 are inputted to the FFT interval estimation section 351A, interference amount computation section 351B and selection section 351C.

The FFT interval estimation section 351A estimates an FFT interval set in the FFT mathematic operation at the succeeding stage from the configuration of the path.

Figure 31:
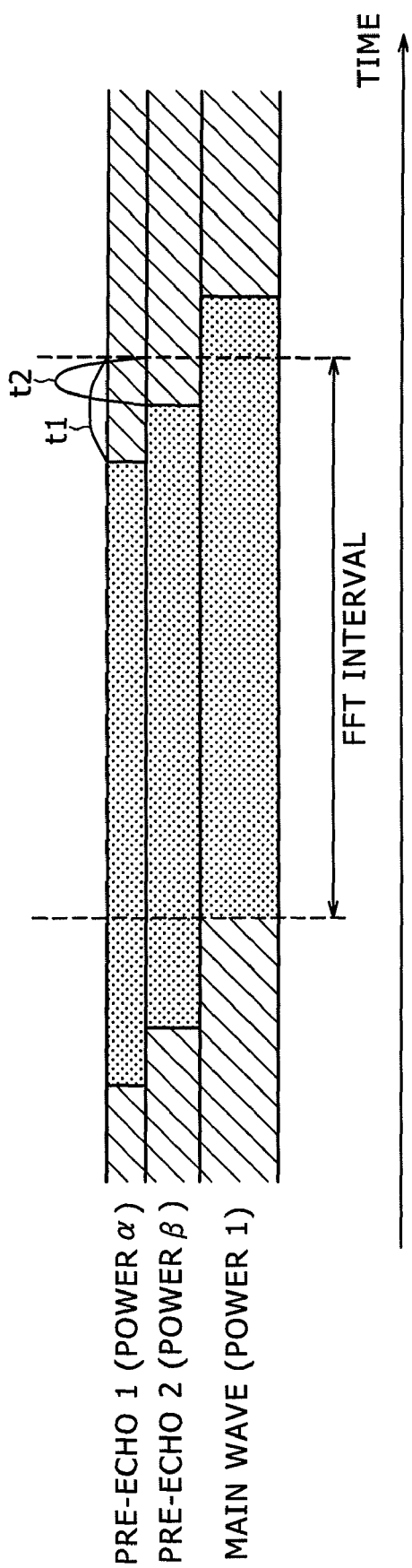
FIGS. 31, 32 and 33 are different examples of an FFT interval.

FIG. 31 illustrates an example of an FFT period estimated where the configuration of the path is formed only from a pre-echo and the main wave.

In the example of FIG. 31, two waves of pre-echoes are involved. The power of the pre-echo 1 is represented by $\alpha$, and the power of the pre-echo 2 is represented by $\beta$.

In this instance, as seen in FIG. 31, an interval earliest in time within a range within which a different symbol transmitted by the main wave, that is, a symbol other than the symbol of the object of modulation, does not interfere is estimated as an FFT interval. The start point of the GI becomes same as the start position of the FFT interval.

Figure 32:
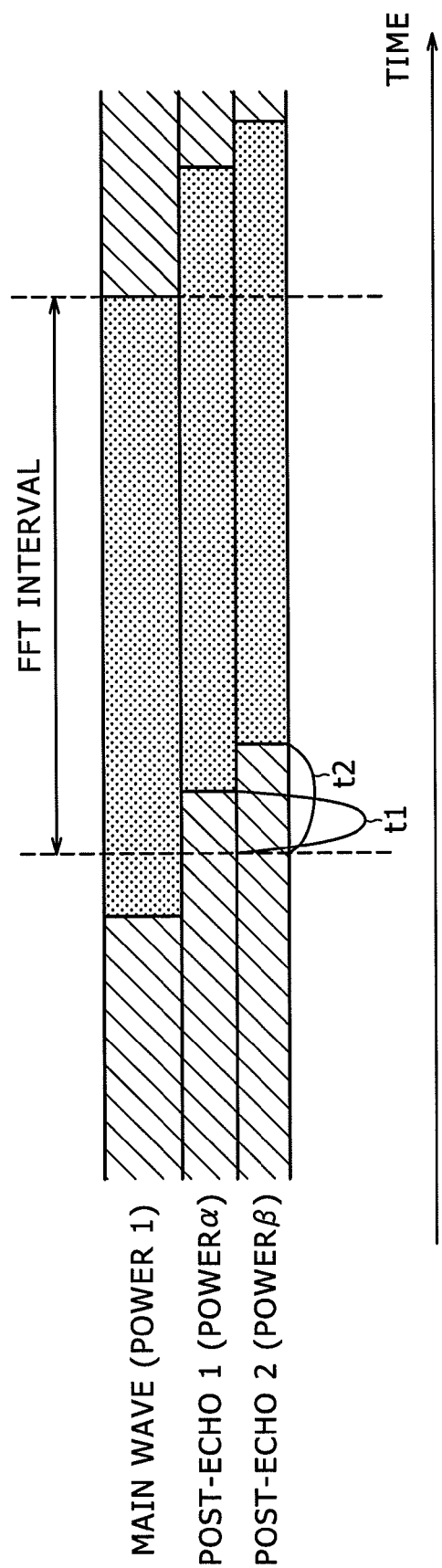

FIG. 32 illustrates an example of the FFT interval estimated where the configuration of the path is formed only from a post-echo and the main wave.

In the example of FIG. 32, two waves of post-echoes are involved. The power of the post-echo 1 is represented by $\alpha$, and the power of the post-echo 2 is represented by $\beta$.

In this instance, as seen in FIG. 32, an interval latest in time within a range within which a different symbol transmitted by the main wave does not interfere is estimated as an FFT interval. The boundary position with respect to the directly succeeding symbol becomes same as the end position of the FFT interval.

Figure 33:
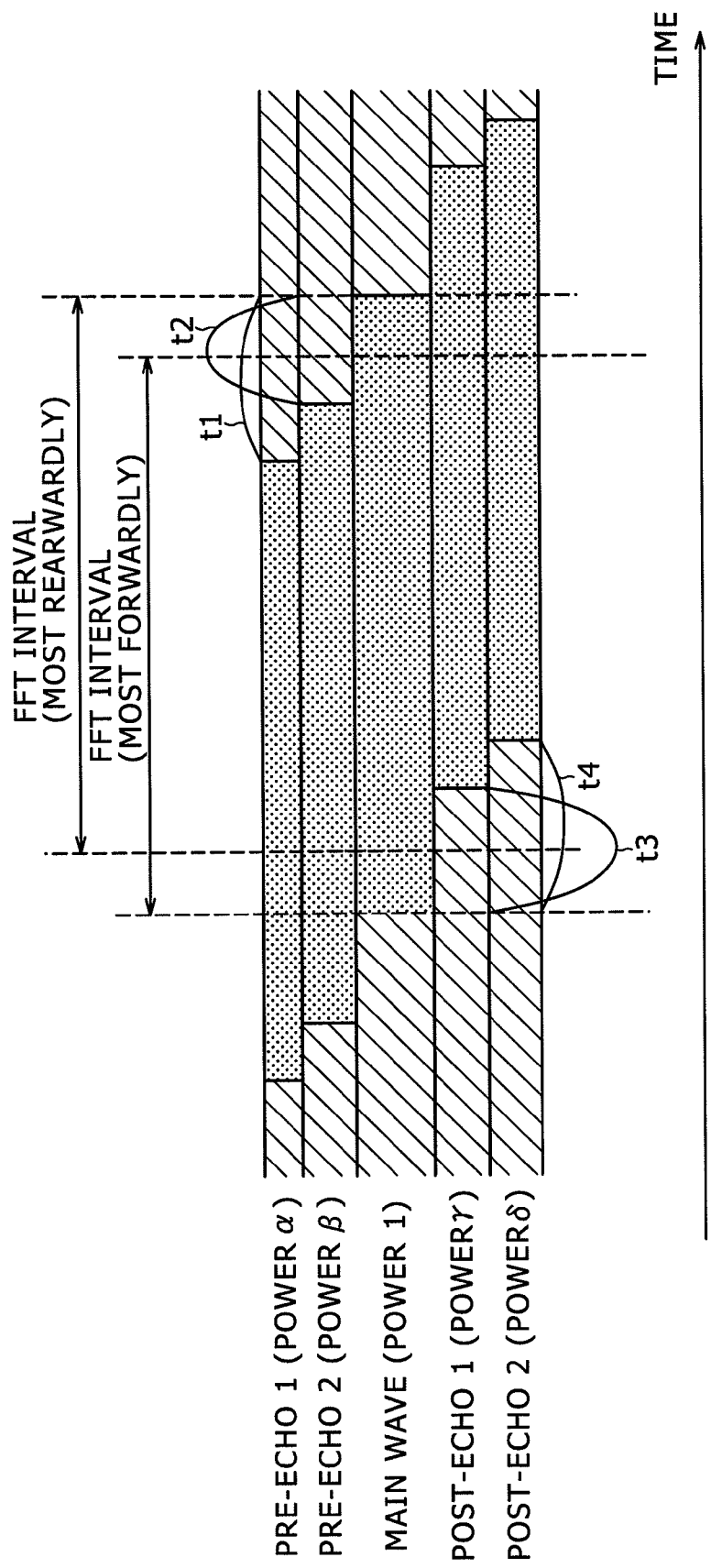

FIG. 33 illustrates an example of an FFT period estimated where the configuration of the path includes a pre-echo, the main wave and a post-echo.

In the example of FIG. 33, two waves of pre-echoes and two waves of post-echoes are involved. The power of the pre-echo 1 is represented by $\alpha$, and the power of the pre-echo 2 is represented by $\beta$. Meanwhile, The power of the post-echo 1 is represented by $\gamma$, and the power of the post-echo 2 is represented by $\delta$.

In this instance, since only it can be estimated that a different symbol transmitted by the main wave is set within a range within which it does not interfere, an interval within which the interference amount in the worst case is calculated for each of the pre-echoes and the post-echoes is estimated as an FFT interval.

In particular, as seen in FIG. 33, as regards the pre-echoes, an interval latest in time within a range within which any other symbol transmitted by the main wave does not interfere is estimated as an FFT interval.

Meanwhile, as regards the post-echoes, an interval earliest in time within a range within which any other symbol transmitted by the main wave does not interfere is estimated as an FFT interval.

The FFT interval estimation section 351A outputs a signal representative of the FFT interval estimated in such a manner as described above.

The interference amount computation section 351B calculates the interference amount of each multi-path based on the FFT interval estimated by the FFT interval estimation section 351A and the information supplied from the pre-echo position detection circuit 331 and the post-echo position detection circuit 332. The interference amount computation section 351B outputs information representative of the calculated interference amounts to the selection section 351C.

The selection section 351C selects one wave of a pre-echo and one wave of a post-echo which exhibit a comparatively great interference amount as multi-paths of an object of inference removal with reference to the interference amounts calculated by the interference amount computation section 351B.

For example, if the configuration of the path is formed only from a pre-echo and the main wave and an interval earliest in time within a range within which a different symbol transmitted by the main wave does not interfere is estimated as an FFT interval as seen in FIG. 31, the interference amount of the pre-echo 1 is calculated as $t1 \times \alpha$. Meanwhile, the interference amount of the pre-echo 2 is calculated as $t2 \times \beta$.

The selection section 351C compares the interference amounts $t1 \times \alpha$ and $t2 \times \beta$ and selects that one of the pre-echo 1 and the pre-echo 2 which exhibits the greater interference amount as a pre-echo of an object of interference removal.

Meanwhile, if the configuration of the path is formed only from a post-echo and the main wave and an interval latest in time within a range within which a different symbol transmitted by the main wave does not interfere is estimated as an FFT interval as seen in FIG. 32, the interference amount of the post-echo 1 is calculated as $t1 \times \alpha$. Meanwhile, the interference amount of the post-echo 2 is calculated as $t2 \times \beta$.

The selection section 351C compares the interference amounts $t1 \times \alpha$ and $t2 \times \beta$ and selects that one of the post-echo 1 and the post-echo 2 which exhibits the greater interference amount as a post-echo of an object of interference removal.

Where the configuration of the path is formed from a pre-echo, the main wave and a post-echo and an interval latest in time within a range of the pre-echo within which a different symbol transmitted by the main wave does not interfere is estimated as an FFT interval as seen in FIG. 33, the interference amount of the pre-echo 1 is calculated by $t1 \times \alpha$ and the interference amount of the pre-echo 2 is calculated by $t2 \times \beta$.

Meanwhile, where an interval earliest in time within a range within which a different symbol transmitted by the main wave does not interfere is estimated as an FFT interval, the interference amount of the post-echo 1 is calculated as $t3 \times \gamma$, and the interference amount of the post-echo 2 is calculated as $t4 \times \delta$.

The selection section 351C compares the interference amounts $t1 \times \alpha$ and $t2 \times \beta$ and selects that one of the pre-echoes 1 and 2 which exhibits the greater interference amount as a pre-echo of an object of interference removal.

The selection section 351C compares the interference amounts $t3 \times \gamma$ and $t4 \times \delta$ and selects that one of the post-echoes 1 and 2 which exhibits the greater interference amount as a post-echo of an object of interference removal.

The positions and the delay time periods of the multi-paths selected in such a manner as described above are outputted from the selection section 351C. The position of the pre-echo outputted from the selection section 351C is supplied to the signal extraction circuits 335 and 336 while the delay time is supplied to the variable length delay circuits 331, 332, 337 and 338. The position of the post-echo outputted from the selection section 351C is supplied to the signal extraction circuit 342 while the delay time is supplied to the variable length delay circuits 328, 345 and 347.

Since both of the powers of the paths and the arriving time differences from the main wave are utilized to select a multi-path and interference is removed preferentially beginning with a component of the selected multi-path, interference can be removed efficiently.

If it is assumed otherwise that multi-paths are successively selected in the descending order of power, then when the power of a multi-path having a great arriving time difference is low, such a situation may occur that, when the power of a multi-path which exhibits a great arriving time difference, it is more efficient to select another multi-path which exhibits high power although the arriving time difference is small. However, this situation can be prevented by such preferential removal as described above.

Further, where it is assumed that multi-paths are successively selected in the descending order of power, when the arriving time difference between a multi-path having high power and the main wave is small, it is more efficient to select another multi-path which exhibits a great arriving time difference although the power is low. However, also this situation can be prevented by such preferential removal as described above.

While the foregoing description relates to a case wherein it is assumed to remove interference of one wave of a pre-echo and one wave of a post-echo, also where the circuit configuration is increased in scale so as to remove interference of two or more waves, it is possible to similarly select a multi-path to be determined as an object of interference removal.

For example, where the circuit configuration is intended for removal of two waves of pre-echoes and three or more waves of pre-echoes are involved, the pre-echoes are successively selected in the ascending order of the interference amount as a pre-echo of an object of interference removal.

Meanwhile, where the circuit configuration is intended for removal of two waves of post-echoes and three or more waves of post-echoes are involved, the post-echoes are successively selected in the ascending order of the interference amount as a post-echo of an object of interference removal.

Furthermore, while, in the foregoing description, an FFT period is estimated by the path selection circuit 351 itself to calculate the interference amount of each multi-path, an FFT interval may not be estimated by the path selection circuit 351 but may be conveyed from the FFT circuit 216 (FIG. 9) at the succeeding stage.

The path selection circuit 351 carries out selection of a multi-path based on the FFT interval conveyed from the FFT circuit 216 and the information supplied from the pre-echo position detection circuit 331 and the post-echo position detection circuit 332.

Figure 34:
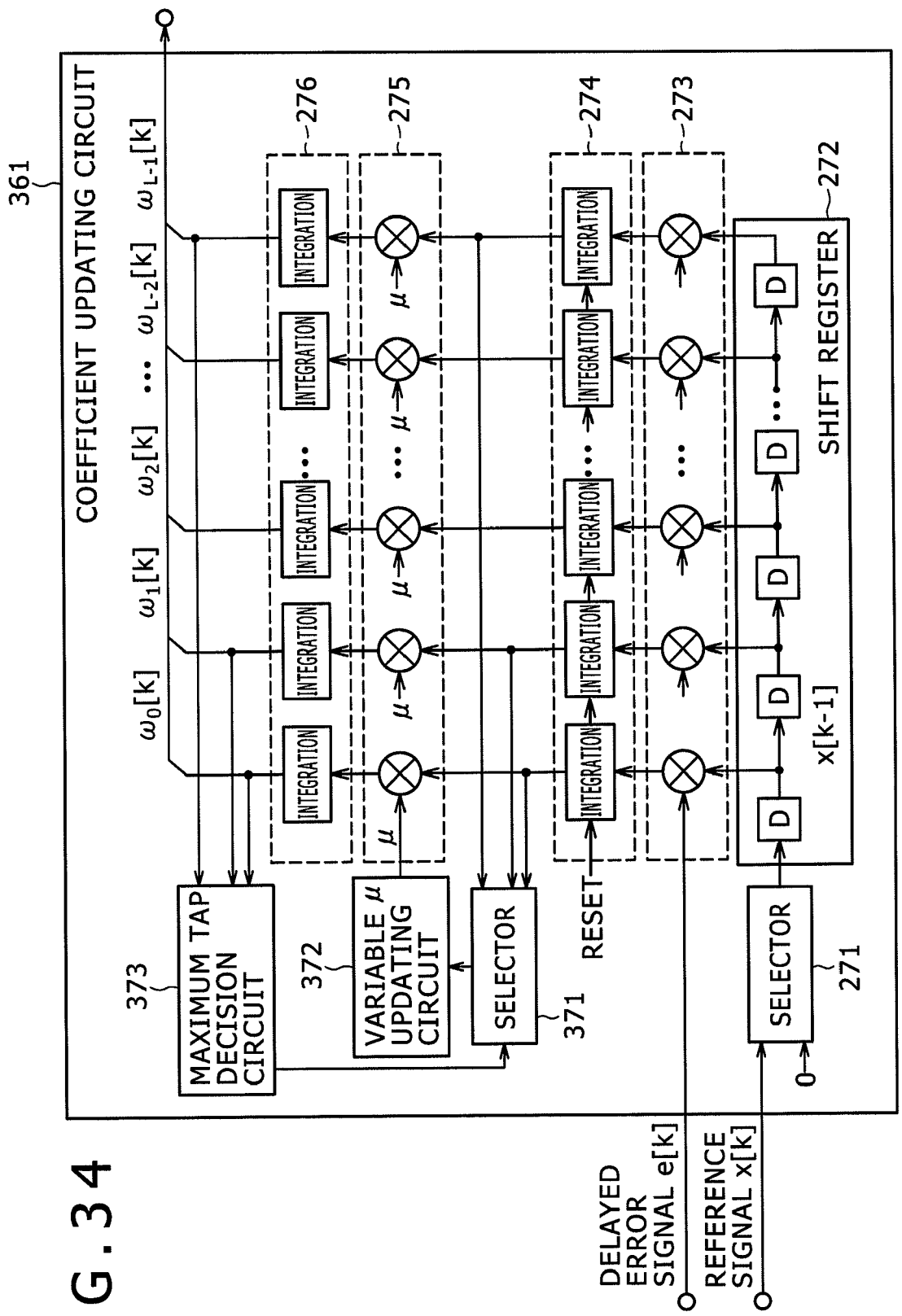
FIG. 34 is a block diagram showing an example of a configuration of a coefficient updating circuit.

FIG. 34 shows another example of a configuration of the coefficient updating circuit.

A circuit having a configuration same as the configuration shown in FIG. 34 is provided as the coefficient updating circuits 256 and 259 in the adaptive equalization filter 231 of FIG. 10. The circuit may be provided as the coefficient updating circuits 305 and 310 in the adaptive equalization filter 231 of FIG. 24, or may be provided as the coefficient updating circuits 339, 340 and 348 in the adaptive equalization filter 231 of FIG. 28.

Usually, it is demanded to set the step size $\mu$ to a high value when the error signal indicates a great error such as when the OFDM signal is pulled in or the transmission line suffers from fluctuation but set the step size $\mu$ to a low value for stabilization after the error signal converges. Although the VSS-LMS algorithm is available as a method which satisfies the demand, it is difficult to adjust the step size $\mu$ in a similar manner as in the method described because the error signal inputted to the coefficient updating circuit 256 shown in FIG. 12 includes many noise terms as described above.

Accordingly, a coefficient updating circuit 361 of FIG. 34 carries out adjustment of the step size $\mu$ not in response to the error signal but in response to the sample correlation value. This makes it possible to carry out adjustment of the step size $\mu$ stably.

Referring to FIG. 34, the coefficient updating circuit 361 further includes a selector 371, a variable $\mu$ updating circuit 372 and a maximum tap decision circuit 373.

The selector 371 extracts a sample correlation value based on which a coefficient to be set to a tap having a tap number decided by the maximum tap decision circuit 373 is based from among the sample correlation values after the noise term removal outputted from the integrators of the integration circuit 274. The selector 371 outputs the extracted sample correlation value to the variable $\mu$ updating circuit 372.

The variable $\mu$ updating circuit 372 carries out computation in accordance with the expression (5) or (6) given hereinabove to update the step size $\mu$. The sample correlation value extracted by the selector 371 is used in place of the error signal represented by e[k] in the expression (5) or (6).

The maximum tap decision circuit 373 decides a tap number with which the tap coefficient is maximum based on the outputs of the integrators of the integration circuit 276 and outputs a signal representative of the tap number to the selector 371.

Consequently, the step size $\mu$ can be adjusted appropriately in response to a sample correlation value which suffers from smaller fluctuation than the error signal.

While the series of processes described above can be executed by hardware, it may otherwise be executed by software. Where the series of processes is executed by software, a program which constructs the software is installed from a program recording medium into a computer incorporated in hardware for exclusive use or, for example, a personal computer for universal use which can execute various functions by installing various programs.

FIG. 35 shows an example of a hardware configuration of a computer which executes the series of processes described hereinabove in accordance with a program.

A CPU (Central Processing Unit) 501, a ROM (Read Only Memory) 502 and a RAM (Random Access Memory) 503 are connected to each other by a bus 504.

Further, an input/output interface 505 is connected to the bus 504. An inputting section 506 including a keyboard, a mouse, a microphone and so forth, an outputting section 507 including a display unit, a speaker and so forth, a storage section 508 formed from a hard disk, a nonvolatile memory or the like, a communication section 509 including a network interface and so forth, and a drive 510 for driving a removable medium 511 such as an optical disk or a semiconductor memory are connected to the input/output interface 505.

In the computer configured in such a manner as described above, the CPU 501 loads a program stored, for example, in the storage section 508 into the RAM 503 through the input/output interface 505 and the bus 504 and then executes the program to carry out the series of processes described above.

The program to be executed by the CPU 501 is, for example, recorded in and provided together with the removable medium 511 or provided through a wired or wireless transmission medium such as a local area network, the Internet or digital broadcasting, and is installed into the storage section 508.

It is to be noted that the program to be executed by the computer may be of a type wherein processes are executed in a time series in the order as described in the present specification or of another type wherein processes are executed in parallel or executed at a necessary timing such as when it is called.

While preferred embodiments of the present invention have been described using specific terms, such description is for illustrative purposes only, and it is to be understood that changes and variations may be made without departing from the spirit or scope of the following claims.

What is claimed is:

1. A reception apparatus, comprising:
   orthogonal frequency division multiplexing signal reception means for receiving an orthogonal frequency division multiplexing signal;
   first filter means having a predetermined number of taps to which a variable first coefficient is set for applying an adaptive filter to the orthogonal frequency division multiplexing signal in the time domain received by said orthogonal frequency division multiplexing signal reception means to remove a pre-echo component from the orthogonal frequency division multiplexing signal to produce a pre-echo equalized signal;
   subtraction means for subtracting a signal of a post-echo component from the pre-echo equalized signal produced by said first filter means to produce an equalized signal;
   second filter means having a predetermined number of taps to which a variable second coefficient is set for applying an adaptive filter to the equalized signal produced by said subtraction means;
   coefficient production means for producing the first and second coefficients based on the orthogonal frequency division multiplexing signal in the time domain received by said orthogonal frequency division multiplexing signal reception means and the pre-echo equalized signal produced by said first filter means; and
   Fast Fourier Transformation mathematic operation means for carrying out Fast Fourier Transformation mathematic operation for the equalized signal produced by said subtraction means to produce an orthogonal frequency division multiplexing signal in the frequency domain,
   wherein said coefficient production means includes:
   delay profile estimation means for estimating a delay profile based on the orthogonal frequency division multiplexing signal in the time domain;
   post-echo detection means for detecting a predetermined position of the post-echo based on the delay profile estimated by said delay profile estimation means;
   first extraction means for extracting a signal within a period which includes a guard interval of a main wave from the pre-echo equalized signal;
   third filter means for applying an adaptive filter to the signal extracted by said first extraction means using a coefficient same as the second coefficient to produce a dummy signal of a post-echo component;
   error signal production means subtracting the dummy signal produced by said third filter means from a signal within an interval which includes a guard interval of the post-echo extracted from the pre-echo equalized signal in accordance with the position detected by said post error detection means to produce an error signal representative of an error of the second coefficient;
   second extraction means for extracting a signal within an interval which includes a copy source of the guard interval of the main wave from the pre-echo equalized signal and outputting the extracted signal as a reference signal; and
   post-echo coefficient updating means for updating the second coefficient based on a correlation value between the error signal produced by said error signal production means and the reference signal extracted by said second extraction means.

2. The reception apparatus according to claim 1, wherein said coefficient production means further includes:
   third extraction means for extracting a signal within the interval which includes the copy source of the guard interval of the main wave from the orthogonal frequency division multiplexing signal in the time domain and outputting the extracted signal as a reference signal; and
   pre-echo coefficient updating means for updating the first coefficient based on a correlation value between the reference signal extracted by said third extraction means and the signal within the period which includes the guard interval of the main wave from within the pre-echo equalized signal.

3. The reception apparatus according to claim 1, wherein said coefficient production means further includes:
   pre-echo detection means for detecting a predetermined position of the pre-echo based on the delay profile estimated by said delay profile estimation means;
   third extraction means for extracting a signal within an interval which includes a copy source of the guard interval of the main wave and outputting the extracted signal as a reference signal;
   fourth extraction means for extracting a signal within the interval which includes the guard interval of the pre-echo from the pre-echo equalized signal in accordance with the position detected by said pre-echo detection means; and
   pre-echo coefficient updating means for updating the first coefficient based on a correlation value between the reference signal extracted by said third extraction means and the signal extracted by said fourth extraction means.

4. The reception apparatus according to claim 1, wherein said post-echo detection means further detects the power of the post-echo and the delay time of the post-echo with respect to the main wave while said pre-echo detection means further detects the power of the pre-echo and the delay time of the pre-echo with respect to the main wave, and said reception apparatus further comprises:
   calculation means for calculating the amount of interference of the post-echo included in the Fast Fourier Transformation interval based on the position and the power of the post-echo and the delay time of the echo with respect to the main wave detected by said post-echo detection means and calculating the amount of interference of the pre-echo included in the Fast Fourier Transformation interval based on the position and the power of the pre-echo and the delay time of the pre-echo with respect to the main wave detected by said pre-echo detection means; and
   selection means for selecting at least one of the post-echo and the pre-echo which exhibits a comparatively great one of the amounts of interference calculated by said calculation means as a multi-path of an object of removal of interference.

5. The reception apparatus according to claim 4, further comprising,
estimation means for estimating the Fast Fourier Transformation interval from a configuration of a path,
said calculation means calculating the amount of interference of the post-echo and the amount of the pre-echo included in the Fast Fourier Transformation period estimated by said estimation means.

6. The reception apparatus according to claim 5, wherein said estimation means estimates, where the configuration of the path is formed from the pre-echo and the main wave, an interval which is earliest in time within a range within which any other symbol transmitted by the main wave does not interfere and which has a length equal to that of the Fast Fourier Transformation interval.

7. The reception apparatus according to claim 5, wherein said estimation means estimates, where the configuration of the path is formed from the post-echo and the main wave, an interval which is latest in time within a range within which any other symbol transmitted by the main wave does not interfere and which has a length equal to that of the Fast Fourier Transformation interval.

8. The reception apparatus according to claim 5, wherein said estimation means estimates, where the configuration of the path is formed from the pre-echo, main wave and post-echo, an interval which is earliest in time within a range within which any other symbol transmitted by the main wave does not interfere and which has a length equal to that of the Fast Fourier Transformation interval and an interval which is latest in time within a range within which any other symbol transmitted by the main wave does not interfere and which has a length equal to that of the Fast Fourier Transformation interval.

9. The reception apparatus according to claim 4, wherein said calculation means calculates the amount of interference of the post-echo and the amount of interference of the pre-echo included in the Fast Fourier Transformation interval conveyed from said Fast Fourier Transformation mathematic operation means.

10. A reception method, comprising the steps of:
receiving an orthogonal frequency division multiplexing signal;
applying an adaptive filter having a predetermined number of taps to which a variable first coefficient is set to the received orthogonal frequency division multiplexing signal in the time domain to remove a pre-echo component from the orthogonal frequency division multiplexing signal to produce a pre-echo equalized signal;
subtracting a signal of a post-echo component from the produced pre-echo equalized signal to produce an equalized signal;
applying an adaptive filter having a predetermined number of taps to which a variable second coefficient is set to the produced equalized signal;
producing the first and second coefficients based on the received orthogonal frequency division multiplexing signal in the time domain and the pre-echo equalized signal; and
carrying out Fast Fourier Transformation mathematic operation for the produced equalized signal to produce an orthogonal frequency division multiplexing signal in the frequency domain,
wherein said step of producing the first and second coefficients includes:
estimating a delay profile based on the orthogonal frequency division multiplexing signal in the time domain;
detecting a predetermined position of the post-echo based on the delay profile estimated by said delay profile estimation means;
extracting a signal within a period which includes a guard interval of a main wave from the pre-echo equalized signal;
applying an adaptive filter to the signal extracted by said first extraction means using a coefficient same as the second coefficient to produce a dummy signal of a post-echo component;
subtracting the dummy signal produced by said third filter means from a signal within an interval which includes a guard interval of the post-echo extracted from the pre-echo equalized signal in accordance with the position detected by said post error detection means to produce an error signal representative of an error of the second coefficient;
extracting a signal within an interval which includes a copy source of the guard interval of the main wave from the pre-echo equalized signal and outputting the extracted signal as a reference signal; and
updating the second coefficient based on a correlation value between the error signal produced by said error signal production means and the reference signal extracted by said second extraction means.

11. A program for causing a computer to execute a process comprising the steps of:
receiving an orthogonal frequency division multiplexing signal;
applying an adaptive filter having a predetermined number of taps to which a variable first coefficient is set to the received orthogonal frequency division multiplexing signal in the time domain to remove a pre-echo component from the orthogonal frequency division multiplexing signal to produce a pre-echo equalized signal;
subtracting a signal of a post-echo component from the produced pre-echo equalized signal to produce an equalized signal;
applying an adaptive filter having a predetermined number of taps to which a variable second coefficient is set to the produced equalized signal;
producing the first and second coefficients based on the received orthogonal frequency division multiplexing signal in the time domain and the pre-echo equalized signal; and
carrying out Fast Fourier Transformation mathematic operation for the produced equalized signal to produce an orthogonal frequency division multiplexing signal in the frequency domain,
wherein said step of producing the first and second coefficients includes:
estimating a delay profile based on the orthogonal frequency division multiplexing signal in the time domain;
detecting a predetermined position of the post-echo based on the delay profile estimated by said delay profile estimation means;
extracting a signal within a period which includes a guard interval of a main wave from the pre-echo equalized signal;
applying an adaptive filter to the signal extracted by said first extraction means using a coefficient same as the second coefficient to product a dummy signal of a post-echo component;
subtracting the dummy signal produced by said third filter means from a signal within an interval which includes a guard interval of the post-echo extracted from the pre-echo equalized signal in accordance with the position detected by said post error detection means to produce an error signal representative of an error of the second coefficient;

extracting a signal within an interval which includes a copy source of the guard interval of the main waive from the pre-echo equalized signal and outputting the extracted signal as a reference signal; and updating the second coefficient based on a correlation value between the error signal produced by said error signal production means and the reference signal extracted by said second extraction means.

12. A reception apparatus, comprising:

an orthogonal frequency division multiplexing signal reception section configured to receive an orthogonal frequency division multiplexing signal;

a first filter section having a predetermined number of taps to which a variable first coefficient is set for applying an adaptive filter to the orthogonal frequency division multiplexing signal in the time domain received by said orthogonal frequency division multiplexing signal reception section to remove a pre-echo component from the orthogonal frequency division multiplexing signal to produce a pre-echo equalized signal;

a subtraction section configured to subtract a signal of a post-echo component from the pre-echo equalized signal produced by said first filter section to produce an equalized signal;

a second filter section having a predetermined number of taps to which a variable second coefficient is set for applying an adaptive filter to the equalized signal produced by said subtraction section;

a coefficient production section configured to produce the first and second coefficients based on the orthogonal frequency division multiplexing signal in the time domain received by said orthogonal frequency division multiplexing signal reception section and the pre-echo equalized signal produced by said first filter section; and a Fast Fourier Transformation mathematic operation section configured to carry out Fast Fourier Transformation mathematic operation for the equalized signal produced by said subtraction section to produce an orthogonal frequency division multiplexing signal in the frequency domain, wherein said coefficient production section includes:

delay profile estimation section for estimating a delay profile based on the orthogonal frequency division multiplexing signal in the time domain;

post-echo detection section for detecting a predetermined position of the post-echo based on the delay profile estimated by said delay profile estimation section;

first extraction section for extracting a signal within a period which included a guard interval of a main wave from the pre-echo equalized signal;

third filter section for applying an adaptive filter to the signal extracted by said first extraction section using a coefficient same as the second coefficient to produce a dummy signal of a post-echo component;

error signal production section for subtracting the dummy signal produced by said third filter section from a signal within an interval which includes a guard interval of the post-echo extracted from the pre-echo equalized signal in accordance with the position detected by said post error detection section to produce an error signal representative of an error of the second coefficient;

second extraction section for extracting a signal within an interval which includes a copy source of the guard interval of the main wave from the pre-echo equalized signal and outputting the extracted signal as reference signal; and post-echo coefficient updating section for updating the second coefficient based on a correlation value between the error signal produced by said error signal production section and the reference signal extracted by said second extraction section.

* * * * *